(12) United States Patent
Gillingham et al.

(10) Patent No.: US 8,404,021 B2
(45) Date of Patent: Mar. 26, 2013

(54) PULSE JET AIR CLEANER SYSTEM; COMPONENTS; AND, METHODS

(75) Inventors: Gary R. Gillingham, Prior Lake, MN (US); Fred H. Wahlquist, Bloomington, MN (US); Thomas R. Olson, Prior Lake, MN (US); Charles D. Jensen, Webster, MN (US); Ervin P. Fuchs, Farmington, MN (US); Eugene D. Wilson, Prior Lake, MN (US); Robert Widerski, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 446 days.

(21) Appl. No.: 12/308,601

(22) PCT Filed: Jun. 18, 2007

(86) PCT No.: PCT/US2007/014187
§ 371 (c)(1),
(2), (4) Date: Sep. 27, 2010

(87) PCT Pub. No.: WO2007/149388
PCT Pub. Date: Dec. 27, 2007

(65) Prior Publication Data
US 2011/0011042 A1 Jan. 20, 2011

Related U.S. Application Data

(60) Provisional application No. 60/814,744, filed on Jun. 19, 2006, provisional application No. 60/848,320, filed on Sep. 29, 2006, provisional application No. 60/921,173, filed on Mar. 30, 2007.

(51) Int. Cl.
*B01D 46/04* (2006.01)
(52) U.S. Cl. .................. 95/26; 55/283; 55/302; 55/428; 95/280; 96/428

(58) Field of Classification Search .............. 55/283, 55/302, 284, 318, 321, 322, 287, 467, 294; 95/20, 278, 279, 280; 96/403, 427; 60/295, 60/296, 300, 303, 311; 366/18, 26, 30
See application file for complete search history.

(56) References Cited

U.S. PATENT DOCUMENTS

| 1,751,982 | A | 3/1930 | Dunham |
| 2,044,221 | A | 6/1936 | Myers et al. |
| 2,853,153 | A | 9/1958 | Sexton |
| 2,966,959 | A | 1/1961 | Neumann |

(Continued)

FOREIGN PATENT DOCUMENTS

| DE | 33 38 730 | 5/1985 |
| DE | 202 07 755 | 8/2002 |

(Continued)

OTHER PUBLICATIONS

Declaration of Randall A. Engelland and Charles D. Jensen (with Exhibits A-1-A-18).

(Continued)

*Primary Examiner* — Duane Smith
*Assistant Examiner* — Minh-Chau Pham
(74) *Attorney, Agent, or Firm* — Merchant & Gould P.C.

(57) ABSTRACT

Pulse jet air cleaner systems components and methods are described. The features relate to air cleaner housings that include a cartridge receiving section. Features described relate to a possible two-stage construction, a pulse jet accumulator section, pulse jet equipment for cleaning a filter cartridge positioned within the air cleaner; evacuation valve arrangements for projection of dust from the air cleaners; and other example features. Methods of assembly and use are also provided.

19 Claims, 25 Drawing Sheets

U.S. PATENT DOCUMENTS

| | | | |
|---|---|---|---|
| 3,383,841 A | 5/1968 | Olson et al. | |
| 3,402,531 A | 9/1968 | Farr | |
| 3,434,269 A | 3/1969 | Hyatt | |
| 3,576,095 A | 4/1971 | Rivers | |
| 3,593,503 A | 7/1971 | Andrews | |
| 3,816,982 A | 6/1974 | Pierre | |
| 4,204,846 A | 5/1980 | Brenholt | |
| 4,214,882 A | 7/1980 | Brenholt | |
| 4,247,315 A | 1/1981 | Neümann | |
| 4,298,474 A | 11/1981 | Sillers, Jr. | |
| 4,331,459 A | 5/1982 | Copley | |
| 4,334,900 A | 6/1982 | Neumann | |
| 4,359,330 A | 11/1982 | Copley | |
| 4,364,251 A | 12/1982 | Nishihara et al. | |
| 4,388,091 A | 6/1983 | Khosropour | |
| 4,395,269 A | 7/1983 | Schuler | |
| 4,452,616 A | 6/1984 | Gillingham et al. | |
| 4,498,914 A | 2/1985 | Ericksen | |
| 4,504,293 A | 3/1985 | Gillingham et al. | |
| 4,509,960 A | 4/1985 | Engel | |
| 4,560,396 A | 12/1985 | O'Dell | |
| RE32,185 E | 6/1986 | Copley | |
| 4,600,415 A | 7/1986 | Barton | |
| 4,622,995 A | 11/1986 | Gillingham | |
| 4,650,506 A | 3/1987 | Barris et al. | |
| 4,765,810 A | 8/1988 | Wetzel | |
| 4,822,386 A | 4/1989 | Duchesneau | |
| 4,826,512 A * | 5/1989 | Fuller | 55/283 |
| 4,836,834 A * | 6/1989 | Steele | 95/279 |
| 5,042,999 A | 8/1991 | Ernst et al. | |
| 5,207,811 A | 5/1993 | Buonpastore | |
| 5,223,011 A | 6/1993 | Hanni | |
| 5,338,325 A * | 8/1994 | Stanelle | 96/400 |
| 5,512,074 A | 4/1996 | Hanni et al. | |
| 5,562,746 A | 10/1996 | Raether | |
| 5,575,826 A | 11/1996 | Gillingham et al. | |
| 5,616,171 A | 4/1997 | Barris et al. | |
| 5,622,537 A | 4/1997 | Kahlbaugh et al. | |
| 5,672,399 A | 9/1997 | Kahlbaugh et al. | |
| 5,693,109 A | 12/1997 | Coulonvaux et al. | |
| 5,762,689 A * | 6/1998 | Hunziker | 95/280 |
| 5,797,973 A | 8/1998 | Dudrey et al. | |
| 5,897,676 A | 4/1999 | Engel et al. | |
| 6,129,852 A | 10/2000 | Elliott et al. | |
| D455,826 S | 4/2002 | Gillingham et al. | |
| 6,485,538 B1 | 11/2002 | Toyoshima | |
| 6,517,919 B1 | 2/2003 | Griffin | |
| 6,638,344 B2 * | 10/2003 | Horton et al. | 95/280 |
| 6,676,721 B1 | 1/2004 | Gillingham et al. | |
| 6,872,237 B2 | 3/2005 | Gillingham et al. | |
| 6,908,494 B2 | 6/2005 | Gillingham et al. | |
| 7,090,711 B2 | 8/2006 | Gillingham et al. | |
| 7,947,099 B2 * | 5/2011 | Valentini | 55/283 |
| 2009/0308034 A1 | 12/2009 | Olson et al. | |
| 2010/0031616 A1 | 2/2010 | Gillingham et al. | |

FOREIGN PATENT DOCUMENTS

| | | |
|---|---|---|
| EP | 0 078 678 | 5/1983 |
| GB | 1 450 573 | 9/1976 |
| WO | 82/01325 | 4/1982 |
| WO | WO 82/01325 | 4/1982 |

OTHER PUBLICATIONS

International Search Report from PCT/US2007/014187.
Written Opinion from PCT/US2007/014187.

* cited by examiner

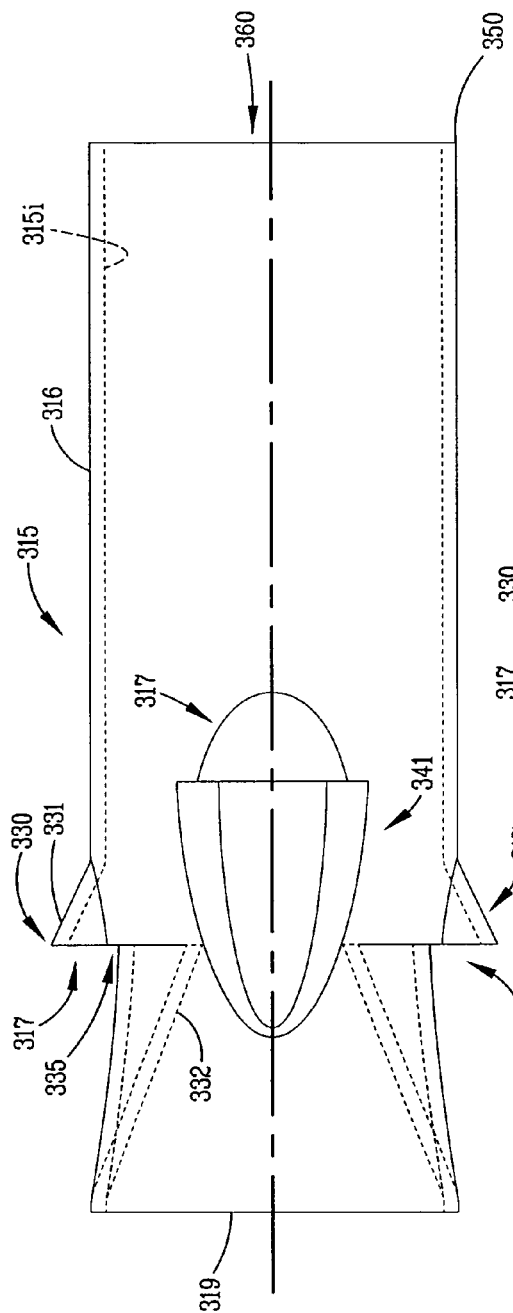

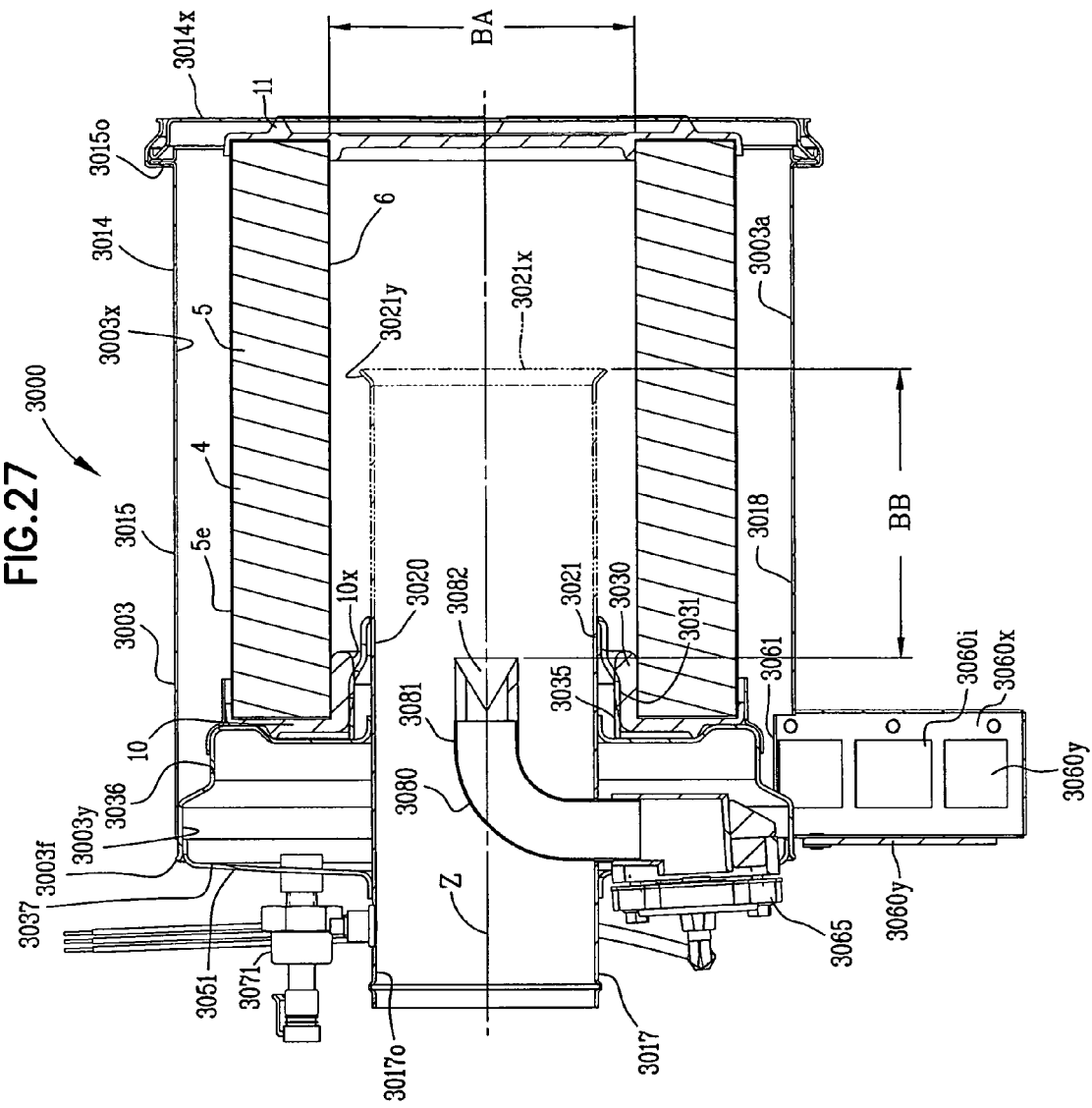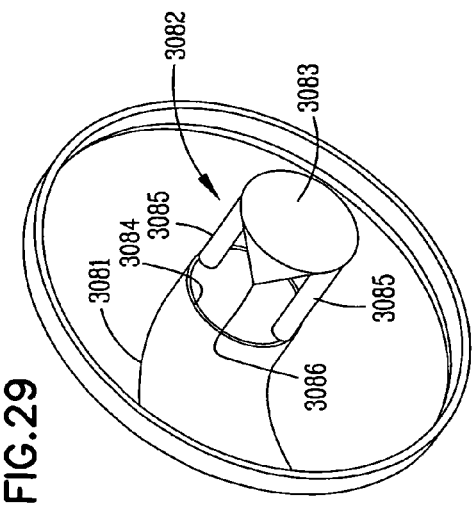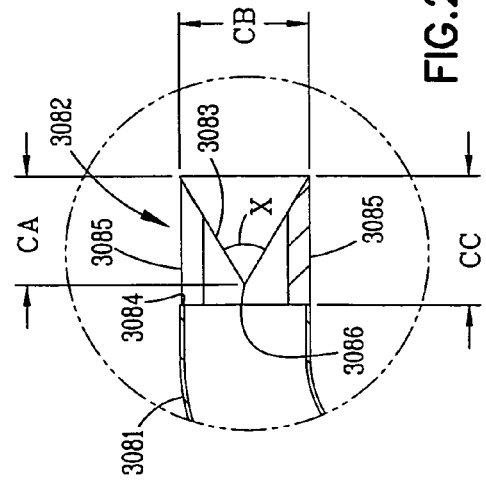

FIG.33
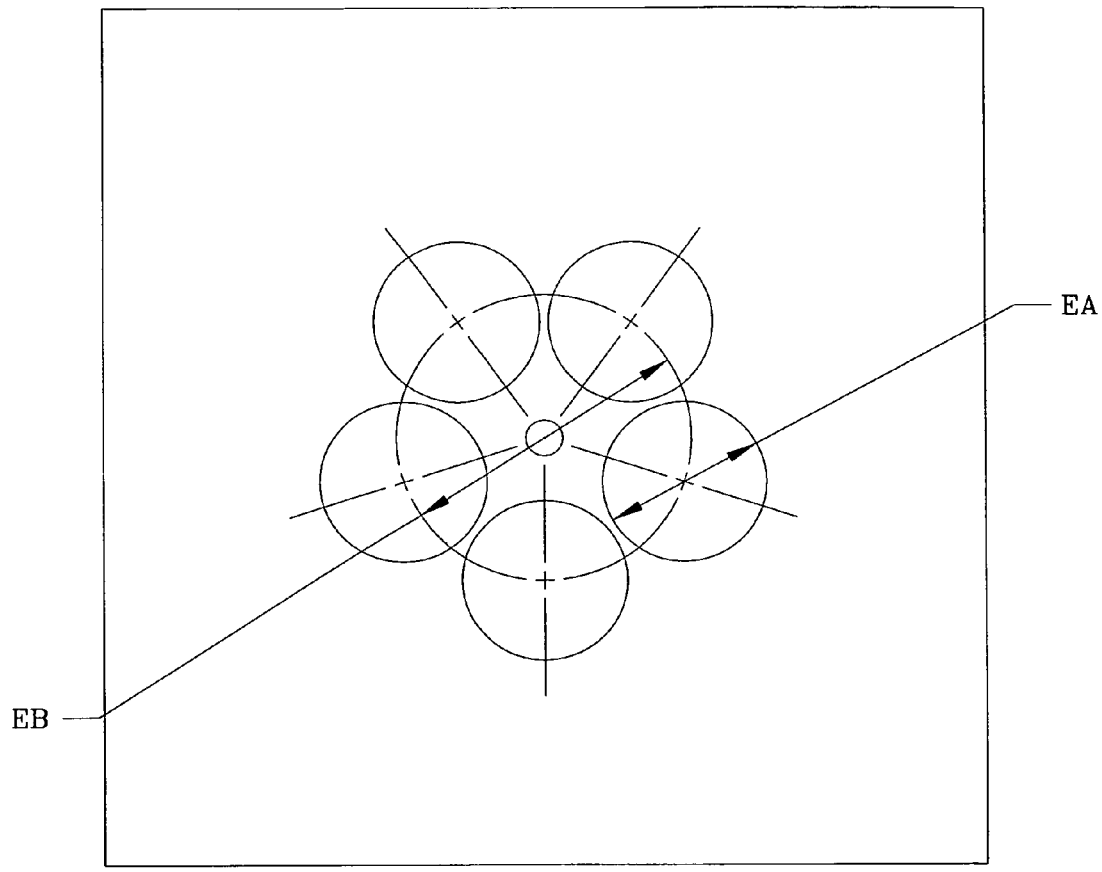
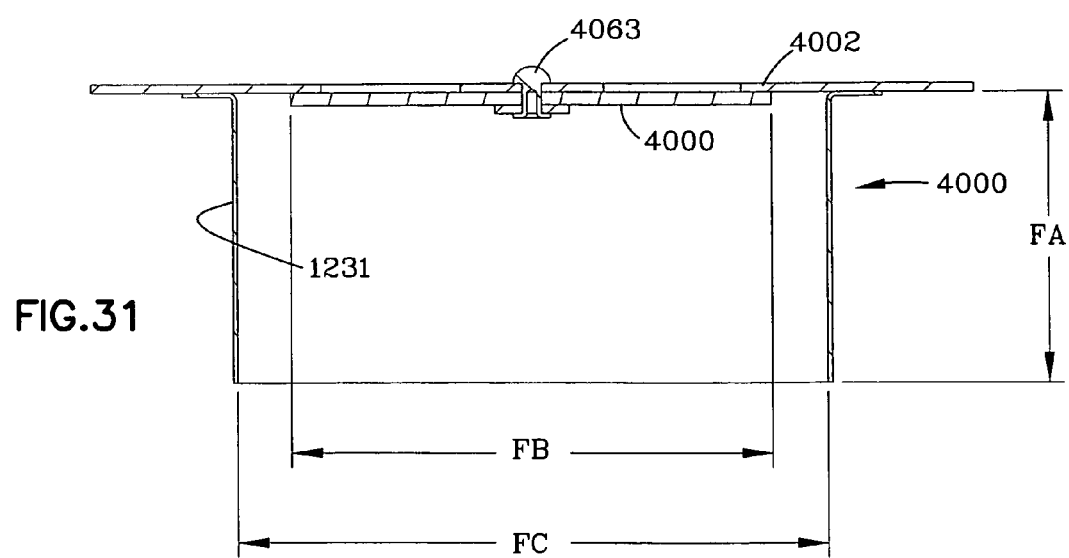
FIG.31

US 8,404,021 B2

PULSE JET AIR CLEANER SYSTEM; COMPONENTS; AND, METHODS

This application is being filed on 18 Dec. 2008 as a National Stage of PCT/US2007/014187, filed 18 Jun. 2007 in the name of Donaldson Company, Inc., a U.S. national corporation, applicant for the designation of all countries except the US, and Gary R. Gillingham, Fred H. Wahlquist, Thomas R. Olson, Charles D. Jensen, Ervin P. Fuchs, Eugene D. Wilson, and Robert Paul Widerski, all citizens of the U.S., applicants for the designation of the US only, and claims benefit of U.S Provisional Ser. No. 60/814,744, filed 19 Jun. 2006, and U.S. Provisional Ser. No. 60/848,320, filed 29 Sep. 2006, and U.S. Provisional Ser. No. 60/921,173, filed 30 Mar. 2007. To the extent appropriate, a claim of priority is made to each of the above disclosed applications.

CROSS-REFERENCE TO RELATED PROVISIONAL APPLICATION

The present application includes information contained in, and depicted in, U.S. Provisional Applications 60/814,744, filed Jun. 19, 2006; and, 60/848,320, filed Sep. 29, 2006. The complete disclosures of 60/814,744 and 60/848,320 are incorporated herein by reference, to the extent consistent with the present disclosure.

FIELD OF DISCLOSURE

The present disclosure relates to air cleaner arrangements. It particularly concerns serviceable air cleaners, with at least one removable and replaceable filter cartridge, for example useable on vehicles and other equipment. The air cleaner features characterized relate to utilization with pulse jet cleaning arrangements.

BACKGROUND

The present disclosure relates to air cleaner arrangements, used for example on vehicles and other equipment. It particularly concerns air cleaners with pulse jet systems, allowing for selected pulse jet cleaning of serviceable filter cartridges therein. This allows for an extended service life of filter cartridge and operating life for the vehicle or other equipment before servicing is needed.

A variety of systems for pulse jet air cleaning are known. Examples described in U.S. Pat. Nos. 5,401,285; 5,575,826; 5,683,479, are pulse jet air cleaning systems for vehicles such as the M1 tank. Others described in U.S. Pat. Nos. 6,676,721; 6,872,237; 6,908,494, are pulse jet air cleaner of a media pack useable in heavy duty equipment such as mining equipment or ore haulers. Each of U.S. Pat. Nos. 5,401,285; 5,575,826; 5,683,479 and 6,676,721; 6,872,237; 6,908,494, is incorporated herein by reference. Further examples of such arrangements are described in U.S. Provisional Application 60/666,781, filed Mar. 31, 2005; U.S. Provisional Application 60/678,092, filed May 5; 2005 and PCT Application US 06/12071 filed Mar. 30, 2006, each of these three references being incorporated herein by reference.

SUMMARY

The present disclosure relates to pulse jet air cleaner assemblies and features thereof. Numerous features and variations of features are shown and described. There is no specific requirement that a pulse jet air cleaner assembly include all of the features characterized herein, to obtain some advantage.

In one general aspect, the disclosure concerns provision of a pulse jet air cleaner assembly which includes a housing having an outer wall defining an interior filter cartridge receiving section and a separate compressed gas (typically air) accumulator tank section. The filter cartridge receiving section, in selected examples, is configured to receive at least one serviceable filter cartridge typically having media surrounding an open interior; and, the air cleaner assembly includes a pulse jet cleaning arrangement constructed and arranged to direct a pulse of compressed gas (typically air) from the accumulator tank through the filter cartridge, in an in-to-out flow pattern, at selected times. An advantageous evacuation (or vac) valve arrangement for selective evacuation of dust and other matter from the evacuation arrangement, is described.

It will be understood that the arrangements described herein typically relate to what are sometimes termed "two stage" air cleaners. One of the stages (typically referred to as the second stage), is represented by the at least one removable and replaceable (i.e., serviceable) filter cartridge. That is, the filter cartridge is one of the stages of dust separation. Another stage (sometimes referred to as the first stage or precleaner stage), is provided by the nature of the flow inlet, and the presence of the evacuation valve arrangement. In particular, the air flow inlet is typically accompanied by an arrangement configured to direct air flow into a cylindrical, helical, or cyclonic pattern, in an air flow annulus around the filter cartridge. This will lead to some dust separation (precleaning or pre-separation); the separated dust being directed into the evacuation valve.

In another aspect of the present disclosure, a method of operating an air cleaner assembly is provided. The method generally involves utilizing one or more of the arrangements described, charging the compressed gas accumulator tank with compressed gas; actuating pulse jet control valve arrangement to direct a pulse of compressed gas from the gas accumulator tank through a pulse distribution arrangement into a central interior of a serviceable service cartridge; waiting a selected period of time and after the selected period of time again actuating the pulse jet control valve arrangement. Between the pulses, the compressed gas accumulator tank is typically recharged.

According to an aspect of the present disclosure, an air cleaner assembly is provided which includes an air flow inlet, an air flow outlet and an interior including a filter cartridge receiving section. The housing can also include a gas accumulator tank section therein. The housing is openable for service access to an internally received serviceable filter cartridge, which cartridge is generally removable from the air cleaner housing and comprises filter media surrounding an open, central, interior. The media can be pleated. The pulse jet distribution arrangement is configured to direct a pulse of compressed gas into the open, central, interior of the filter cartridge. Further, an evacuation valve arrangement is mounted to receive ejected dust from the filter cartridge.

In this example an arrangement, the evacuation valve arrangement includes a rigid frame arrangement with a flexible valve member arrangement. The rigid frame arrangement defines a dust exit aperture arrangement extending therethrough. The flexible valve member arrangement comprises at least one flexible valve member positioned over an associated portion of the dust exit aperture arrangement. The flexible valve member is preferably one that does not include a movable mount or connector, and includes no biasing spring thereon. The flexible valve member is mounted such that when a pulse of compressed air is directed into the cartridge, the flexible valve member flexes to an open position to allow dust ejection; and, when the air cleaner assembly is operated without pulse distribution, the flexible valve member biases to a closed arrangement.

Two example arrangements are described: one in which the flexible valve member is circular and mounted over apertures that also act as dust ejector ports from the air cleaner interior; and, a second, in which the valve members are rectangular, triangular or both, and are mounted over aperture arrangements in a frame piece that itself is mounted over a dust ejector port in the housing.

The assembly can be configured for either vertical center line operation or horizontal center line operation.

In another aspect, the air cleaner assembly can be generally as described, with the evacuation valve arrangement defined as including a rigid frame arrangement in a valve member arrangement, the rigid frame member defining a dust exit aperture arrangement therethrough with an open area of at least 4 sq. inch, the valve member comprising a flat valve member with no openable dust exit aperture therethrough. In another aspect, the air cleaner assembly is provided with a housing, a serviceable filter cartridge, a pulse jet distribution arrangement and an evacuation valve arrangement; the pulse jet distribution arrangement including a conical distributor member thereon.

Variations in air cleaner assemblies or arrangements are described and shown. Also methods of operation and assembly are described. Advantageous components and subcomponents are characterized.

Again, there is no specific requirement that an air cleaner arrangement or selected components therefor, include all of the features described herein, to obtain advantage in accord with the present disclosure. Indeed, a variety of techniques are described.

BRIEF DESCRIPTION OF THE DRAWINGS

in FIG. 1 portions being broken away to show internal detail.

FIG. 5 is an enlarged schematic view of a component of the air cleaner of FIG. 4.

FIG. 6 is a schematic end elevational view of the component depicted in FIG. 5.

in FIG. 7, a pulse jet control valve arrangement not being shown in cross-section.

in FIG. 9, the feature being shown in an inlet air flow blocking position or orientation.

FIG. 27 is a schematic, cross-sectional view of the air cleaner assembly depicted in FIG. 26.

FIG. 28 is a schematic, enlarged, view of a portion of FIG. 27.

FIG. 29 is a schematic, enlarged, perspective view of the portion of the assembly of FIG. 27 depicted in FIG. 28, but not shown in cross-section.

FIG. 31 is a schematic, enlarged, fragmentary, cross-sectional view of a portion of the assembly depicted in FIG. 21.

FIG. 33 is a plan view of a component depicted in FIG. 32.

DETAILED DESCRIPTION

I. Selected General Features for Pulse Jet Air Cleaners Having Serviceable Filter Cartridges Including Media Packs Comprising Media Surrounding an Open Interior A. Selected Example Air Cleaner Assemblies, FIGS. 1, 2 and 3.

Figure 1:
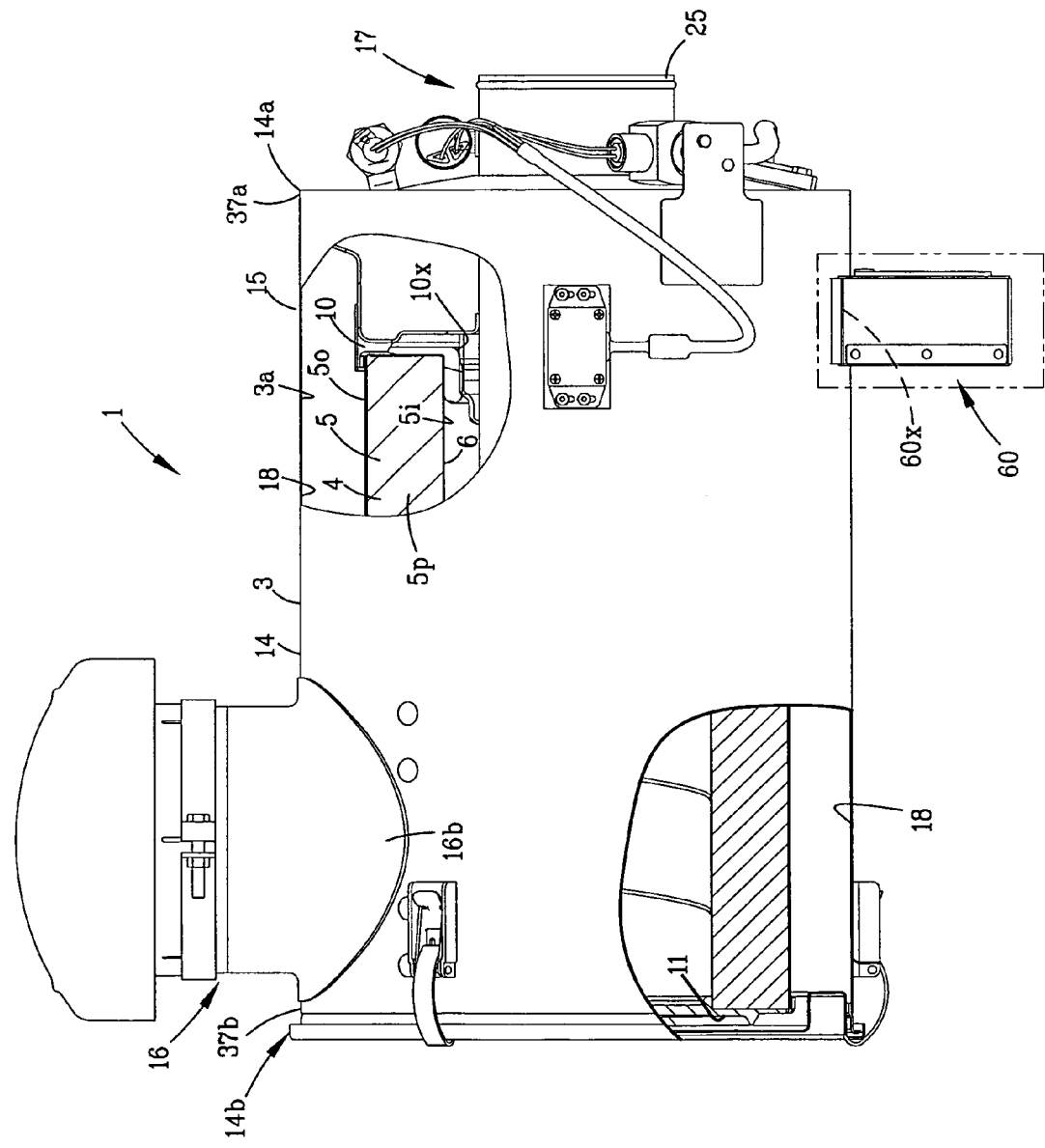
FIG. 1 is a schematic side elevational view of an air cleaner assembly including selected features according to the present disclosure.
Figure 2:
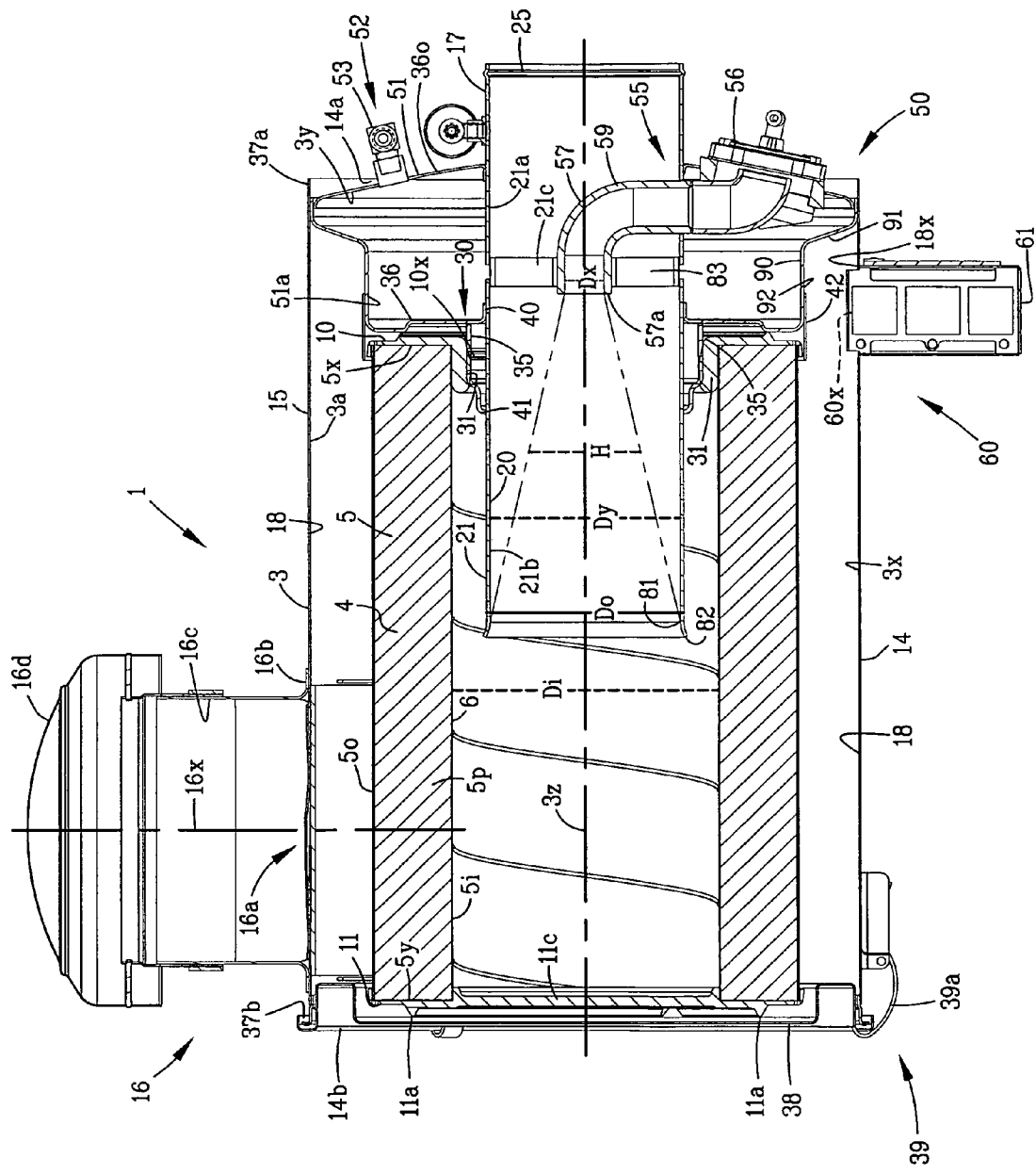
FIG. 2 is a schematic side cross-sectional view of the air cleaner assembly depicted in FIG. 1, with a pulse jet control valve arrangement not shown in cross-section.

The reference numeral 1, FIG. 1, depicts a schematic view of an air cleaner assembly including selected features according to the present disclosure. In FIG. 1, the air cleaner assembly 1 is depicted in side elevational view, with selected portions depicted broken away. In FIG. 2, the same air cleaner is generally depicted in cross-sectional view, with certain features not in cross-section.

Referring to FIG. 1, air cleaner assembly 1 generally comprises a housing 3 and an interiorly received, removable, replaceable, (i.e., serviceable) filter cartridge 4. The particular filter cartridge 4 depicted, comprises a media pack 5 surrounding and defining an open interior 6. The media pack 5 extends between first and second, opposite, end caps 10, 11 (see also FIG. 2).

The filter cartridge 4 is generally a serviceable component, i.e., it can be removed from interior 3a of housing 3, for servicing. Typical servicing would involve one of: (a) replacing filter cartridge 4 with a previously unused analogous filter cartridge; (b) removing service cartridge 4 and replacing it with an analogous but previously used cartridge 4, that has been refurbished; or (c) removing filter cartridge 4, servicing (refurbishing) the filter cartridge 4, and replacing it within the air cleaner 3. With any of these three approaches or alternatives, the filter cartridge 4 removed from the air cleaner 3 will be referred to as the "used" filter cartridge; and, the filter cartridge which is installed as part of servicing, will be referred to as the "new" filter cartridge 4. It is anticipated that in many servicing operations, the cartridge 4 will be replaced with a new cartridge 4 that is a previously unused cartridge 4.

Many of the techniques described herein, and features characterized, are particularly adapted for utilization with cartridges 4 that are serviceable, and which comprise media 5 extending around (i.e., surrounding) an open interior 6. Typically the media 5 will define a circular cross-section along both an interior edge 5i and an outer or exterior edge 5o although alternate cross-sectional shapes can be accommodated. Although alternatives are possible, the media 5 will typically be pleated media 5p, with a pleat longitudinal direction or length being in extension between end caps 10 and 11 (although alternatives are possible) and with outside pleat tips defining exterior 5o and inside pleat tips defining interior 5i. A porous outer liner can be provided along exterior 5o, and/or an inner liner can be provided along interior 5i, if desired. As an example, for each of an inner support and an outer support, typically expanded metal liners would be used. Also, or as an alternative, various arrangements can be wound around interior 5i and exterior 5o, to provide appropriate pleat support to the media pack 5. As an example, adhesive beads can be used to facilitate pleat spacing and pleat support. Beads comprising adhesive impregnated with fibrous material, can also be used for media support. Wire and/or plastic band arrangements can comprise media support, as can tubular plastic construction or cylindrical sheet metal arrangements having apertures therein.

The end caps 10, 11, may individually comprise a variety of arrangements including for example: molded-in-place arrangements; metal or plastic end caps adhered to the media 5 with an adhesive or potting material; and/or composite arrangements comprising molded-in-place material and preform material together. There is no specific requirement that the two end caps 10, 11, comprise the same type of structure or material. For the particular example shown in FIG. 2, end cap 10 is a molded-in-place end cap, and end cap 11 is a molded-in-place end cap. An alternate example for end cap 11 is discussed below in connection with FIG. 18.

For the particular examples shown, end cap 10 is an "open" end cap, meaning it has an aperture 10x therein, through which gases can flow through the end cap 10. For the examples shown, end cap 11 is "closed" end cap, meaning it is closed to passage of gases (air) therethrough. While alternatives are possible with selected features described herein, such a configuration is typical.

Referring to FIG. 2, general features and operation of air cleaner assembly 1 are as follows. The housing 3 is defined by an outer wall or wall arrangement 14 including a side wall 15 surrounding interior 3a. Thus, the housing 3 is typically a self contained unit, that can be moved and mounted as an assembly. The side wall 15 typically uses a circular, interior, cross-section shape.

The housing 3 generally includes an air flow inlet arrangement 16 and an airflow outlet arrangement 17. The airflow inlet arrangement 16 is configured to direct air to be filtered, into the air cleaner housing 3. The outlet arrangement 17, allows for flow of filtered air from the housing 3, to be directed into downstream equipment, such as air being directed as combustion air to an internal combustion engine.

The inlet arrangement 16 is provided to allow flow of air to eventually be filtered being directed into interior 3a, in particular into air flow annulus 18 between side wall 15 and cartridge 4 and surrounding cartridge 4. During normal filtering, the unfiltered air from annulus 18 passes through the media pack 5, from outside in, with filtering occurring. The filtered air in interior 6 then passes into interior 20 of outlet tube 21. The filtered air eventually leaves outlet tube 21 (i.e., air cleaner outlet arrangement 17) at outlet end 25, from which it is directed into engine or other equipment for use.

The cartridge 4 is sealed within housing 3, in a manner inhibiting air flow from inlet 16 into annulus 18 from reaching interior 20 of outlet tube 21, without filtering passage through the media 5. To accommodate this: (a) the cartridge 4 is provided with a housing seal arrangement 30 thereon; in this instance adjacent end 5x of media 5; and, (b) the cartridge 4 is closed to passage of unfiltered air therein at media end 5y, by end cap 11 including closed central section 11c.

For the particular cartridge 4 depicted, housing seal arrangement 30 comprises an inwardly directed radial seal 31. When cartridge 4 is installed, inwardly directed housing radial seal 31 is pushed around housing seal support 35, forming a seal between the cartridge 4 and the housing 3 at this location. For the example shown, inwardly directed housing radial seal 31 comprises an integral portion of end cap 10; end cap 10 being molded-in-place for example from a compressible foamed polyurethane. Alternate seal arrangements and materials can be used, however.

At FIG. 2, housing radial seal 31 is depicted schematically, and is drawn with lines depicting overlap with support 35. In an actual installation, the seal region 31 would be distorted (compressed) by support 35. In FIG. 2, the amount of overlap depicted between the seal material of radial seal 31, and the support 35, indicates the compression that would occur during normal installation with such an end cap.

Referring still to FIG. 2, housing 3 includes two separated compartments: cartridge receiving compartment or section 3x; and, compressed gas (typically air) compartment, section or accumulator tank 3y; the sections 3x, 3y being defined within housing 3 as separate regions.

For the example shown, the compartments 3x, 3y are each surrounded by side wall 15, the compartments being separated by a wall structure 36. Compartment 3y is discussed below, in connection with the described pulse jet air cleaner system. From the description thus far, however, it can be understood that for the example shown, the compressed air accumulator compartment of section 3y is an integral part of the housing 3, and is not separate therefrom.

The housing outer wall 14 includes opposite ends 14a, 14b, defined adjacent side wall 15 at opposite ends 37a, 37b respectively. End 37a is generally closed by outer end wall 14a (typically comprising a wall portion 36o having an outwardly projecting domed shape and forming an end of the compressed air accumulator section 3y) with outlet tube 21 passing therethrough. Outlet end 37b is an open end, selectively closeable by end 14b comprising an operable cover or access cover 38. The access cover 38 is secured in a closed condition by latch arrangement 39, an example latch 39a being depicted. Typically two to five latches 39a are used, although the number can vary.

For servicing, latch arrangement 39 is opened, access cover 38 is removed or otherwise pivoted away to allow service access into open end 37b, and cartridge 4 is removed from interior 3a. This process will lead to disengagement of seal 31 from housing seal support 35. Installation of a new cartridge 4 would generally involve a reverse movement, i.e., through open end 37b, cartridge 4 would be installed with seal arrangement 30 pushed inwardly in the example shown, allowing radial seal 31 to push around and seal to housing seal support 35. Cover 38 would then be secured in place through latch arrangement 39. Typically, cover 38 is configured to be completely removed from the remainder of housing 3, while latch arrangement 39 is unlatched.

In more general terms, the housing 3 is openable, for service access to cartridge 4 in interior 3a. In an example system, access is through an end access cover arrangement opposite the air flow outlet 20. Alternatives are possible with application of many of the principles described herein.

Referring still to FIG. 2, the air flow inlet arrangement 16 comprises an air flow inlet aperture arrangement 16a in side wall 15, through which air can pass from exterior of air cleaner 1, into annulus 18, for eventual filtering. For the particular example shown, air flow inlet arrangement 16 includes mounting collar 16b, inlet tube 16c and rain cover 16d. A variety of inlet arrangements are possible. The particular inlet arrangement 16 depicted in FIG. 2, is of a type generally referred herein to as an "axial" inlet arrangement, since a central axis 16x of the inlet arrangement 16 is directed toward a central axis 3z of the air cleaner housing 3, i.e., a central longitudinal axis of the outer wall 15 and of cartridge 4.

Still referring to FIG. 2, in typical arrangements, appropriate structure will be provided to direct air flowing into annulus 18 from inlet arrangement 16, into a helical or cyclonic pattern, within annulus 18 and around cartridge 4. This will provide a first stage dust separation, in which some dust or particulate material within the inlet air is separated and eventually migrates to a dust ejector arrangement (evacuation or vac valve) indicated generally at 60. Typically the housing 3 is provided with a dust ejection port at 60x in side wall 15, through which the dust ejected by cyclonic separation, can pass into the dust ejection arrangement or evacuation (or vac) valve 60.

In typical assemblies, the arrangement of features that allow for an initial partial dust separation using the cyclonic pattern in combination with the dust ejector port 60x and the dust ejector arrangement 60, is referred to as a first stage separator arrangement. A variety of features can be used in the first stage separator arrangement. Some examples are described herein.

The filter cartridge 4, which removes still further dust or contaminant as the air is passed through the media 5, is sometimes referred to as a second stage filtration or separation unit. It is noted that in some instances the filter arrangement at the second stage, may comprise more than one filter cartridge, for example a main filter cartridge such as cartridge 4 and a separate filter cartridge, discussed below, positioned interiorly over the main cartridge and typically identified as a safety or secondary filter.

Referring still to FIG. 2, to avoid leakage of unfiltered air into outlet tube 21, a variety of structural arrangements can be used, typically comprising welds when the structural materials for the housing 3 and selected relevant components are made from metal. An example would be a welding of the tube 21 at seam 40, to other structure of the air cleaner 1, in this case to a flange of wall 36 of accumulator tank arrangement 3y discussed below. Other attachments that can be used to facilitate avoidance of undesirable leakage are located at 41 and 42, again welds being useable at these locations to avoid leakage if desired.

For the particular example shown, end cap 11 is a molded-in-place closed end cap, typically comprising foamed polyurethane, although alternatives are possible. Projections 11a provide for a cushion against access cover 38.

The air cleaner assembly 1 includes a pulse jet cleaning arrangement, for selected pulse jet cleaning of cartridge 4. The pulse jet cleaning arrangement is indicated generally at 50. The pulse jet cleaning arrangement 50 includes a compressed gas (i.e., typically compressed air) accumulator tank 51. For the example shown in FIG. 2, the accumulator tank 51 comprises the compressed gas accumulator tank arrangement 3y. The accumulator tank 51 depicted, is defined in a ring shape around outlet tube 21, with the tank 51 generally defined by: outer, domed, end wall 36o; inner flange 36; a radial outer wall 51a; and, a radial inner wall defined by tube 21. For the example shown, the tube 21 comprises inner and outer sections 21b, 21a respectively, with collar or bracket 21c therebetween. (Typically, end wall 36o which will form an outer wall for the compressed gas tank 51 discussed below, is formed with a dome shape to facilitate a secure strong construction with a relatively thin gauge material.)

The accumulator tank 51 is configured to receive compressed gas (typically air) therein, from a compressor system of the vehicle or other equipment involved. A control valve or tap arrangement (not shown) for example in region 52, FIG. 2, for charging the accumulator tank 51 would be used. Also in FIG. 2, at 53, a solenoid control valve or switch, to operate or actuate valve arrangement 56 is shown.

Typically the tank 51 will be configured to store therein pressurized air at a selected pressure value, often within the range of 60 to 150 psi (4.1-10.3 bar), and more often 80-120 psi (5.5-8.3 bar); with typical examples being 100 psi (6.9 bar). The volume of the accumulator tank can be varied and it will typically be at least 100 cubic inches (1.64 liters), often 130 to 200 cubic inches (2.1-3.3 liters), especially for example arrangements in which the cartridge 4 has a diameter of 10-13 inches (25.4-33 cm) and a length of 13-25 inches (33-63.5 cm).

The pulse assembly 50 further includes a compressed gas (air) discharge arrangement 55, FIG. 2. The compressed gas (air) discharge arrangement 55 generally includes a control valve or pulse valve arrangement 56 and a pulse jet distribution arrangement 57. The compressed gas (air) discharge arrangement 55 would also typically include a solenoid control valve 53, for actuation or operation of the pulse valve arrangement 56. It is noted that in FIG. 2, the pulse valve arrangement 56 is not depicted in cross-section, for convenience.

In operation, pulse valve arrangement 56 is selectively operable to direct a pulse of compressed gas (typically air) from accumulator tank 51 into distribution arrangement 57. The gas (air) pulse is then directed from distribution arrangement 57 into interior 6 of cartridge 4, causing a back flush of gases (air) through media 5 from interior 5i to exterior 5o. The back flush of gases (air) will create air (gas) movement to dislodge material deposited on an upstream surface of the media 5. This material will then generally discharge from interior 3a of housing 3, through evacuation (or vac) valve arrangement 60.

It is anticipated that for many typical arrangements, cartridge 4 will have: an axial length, i.e., length between end caps 10 and 11, of at least 300 mm, usually within the range of 350 to 500 mm; an interior diameter defined at 5i of at least 100 mm usually within the range of 110 to 250 mm; and an exterior diameter defined at 5o of at least 200 mm usually 200 to 350 mm. Although variations are possible, the pulse of gas (air) will typically be a 0.1 second pulse, of compressed air from tank 51. The pulse of air will reduce the pressure within the tank 51. In many instances, the arrangement will be configured so that a single pulse (for example the 0.1 second pulse characterized) will reduce the pressure within the tank 51 down to a point at which a useful second pulse is not feasible, until the tank has been recharged. Typically such a reduction of pressure within the tank, for many arrangements, will be to no more than 30 psi (2.07 bar), usually to no more than 25 psi (1.72 bar), for example 10-25 psi (0.69-1.72 bar) although alternatives are possible.

Control logic and equipment for implementing the control logic, for managing the pulsing of the jet of compressed air are discussed herein below, in connection with FIGS. 19 and 20.

Typically the pulse jet will be conducted while the vehicle or other equipment is operating. In some instances, it may be desirable to briefly inhibit air entering inlet 16 from passing into annulus 18, during the brief period of the pulse (typically 0.1 second). Arrangements to accommodate this are discussed below, in connection with FIGS. 9-12.

Referring to FIG. 2, in a typical installation, evacuation (or vac) valve 60 would be mounted with end 61 remote from housing 3 directed downwardly. Thus, gravity will assist in removing particulate material pulsed off cartridge 4 (and also in removal of material separated by the first stage cyclonic separation in annulus 18 described above, from interior 3a.)

In the particular example shown in FIG. 2, pulse jet control valve arrangement 56 is mounted on an exterior of tank 51. The valve arrangement 56 would include an arrangement for receiving compressed air from tank 51, passing it through the valve arrangement 56, and then into conduit 59 for transfer to nozzle outlet 57a. Alternates are possible, as discussed below.

An issue with respect to arrangements such as air cleaner 1 which include: (a) a pulse jet assembly 50; and, (b) a primary filter cartridge 4 having media 5 surrounding an open interior 6, is accomplishing appropriate distribution of air or displacement of air from interior 6 through the media 5 toward annulus 18, during pulsing operation. A variety of distribution arrangements, operating in accord with a variety of selected principles, can be applied to accomplish this.

In the example air cleaner 1 of FIG. 2, distribution of the pulse of compressed gases (air) from accumulator tank 51 into interior 6, is conducted in a manner to accomplish desirable reverse pulsing and thus cleaning or refurbishing of cartridge 4. A distributor arrangement 57, comprising a blow pipe 59 with a discharge end or nozzle 57a, provides for inlet pulse distribution. End 57a is generally adjacent to or axially outside of end cap 10, although alternatives are possible.

In more general terms, it is typical to have the outlet end 57a of the distributor arrangement 57, positioned exterior to the cartridge 4 when housing dimensions and other limitations allow. However, in some instances, especially with limited space requirements, it will be desirable to configure the distributor arrangement 57 such that a portion thereof projects to a location within the interior 6 of the cartridge 4.

Upon discharge of air from end 57a, for the example shown in FIG. 2, the pulse is directed into tube 21, in particular outlet extension 21b. Outlet tube 21 projects through cap 10 and extends a distance of at least 35%, usually at least 40%, and typically 40% to 60% of an axial length of the cartridge 4 between end caps 10 and 11, into interior 6, although alternatives are possible. (This axial length is sometimes referred herein as length X.) Further, tube 21 (in the example shown extension 21b) is provided, at discharge end 81, with an outward bell, bell mouth or flared tip 82. The flared end 82 facilitates collection of filtered air from region 6 for direction to outlet 25.

Still referring to FIG. 2, region 83 is an annular flow region around end 57a of tube 59, through which outlet flow occurs from end 81 of outlet flow tube 21 toward outlet end 25.

For the example shown, an interior cross-sectional shape at outlet 57a is circular, and an interior cross-sectional shape of tube 21 in the region surrounding outlet 57a is also circular, although alternatives are possible. Also, although alternatives are possible, typically an interior diameter Dx (largest inside cross section if outlet 57a is not circular) of outlet 57a is no more than 40% and typically no more than 35%, and usually 15% to 30%, of an internal diameter (largest cross section if not circular) Dy of tube section 21b surrounding outlet 57a. Alternately stated, an open area in region Dx, referenced herein as Ax, is typically no more than about 16% of an area Ay corresponding to the region across section of which is indicated at Dy; typically no more than 12%, and typically within the range of 2-9%.

In general terms, if the outlet tube is too small, relatively high restriction will result. If the outlet tube is too close to the filter cartridge diameter, it will tend to restrict flow in the overlapped area of the filter media.

In typical arrangements, exterior diameter Do (smallest cross-section dimension if not circular) of outlet tube section 21b (discounting bell 82) is no more than 80% and usually no more than 76%, of an internal diameter Di (smallest cross-section if not circular) of region 6. Typically outer diameter Do is at least 65% of diameter Di.

When the regions indicated at Do and Di are not circular, reference can be made to the cross-sectional area. Typically the cross-sectional area of the region indicated at Do is no more than 64%, and usually no more than 58% and usually at least 42%, of the area at cross section Di.

In a typical example, with an 11 inch (27.9 cm) diameter air cleaner, the diameter of outlet tube 20 would typically be about 4 inches (10.1 cm). By "11 inch diameter air cleaner" in this context, it is meant that the air cleaner has a circular interior of a side wall surrounding cartridge 4 of about 11 inches. In such an example, the end 57a of blow pipe or nozzle 57, is typically about 1 inch (2.54 cm) diameter, and the pulse jet control valve arrangement 56 would typically be a 1 inch (2.54 cm) valve.

It has been found that a distance from outlet end 57a of flow distribution arrangement 57, to end 81 (disregarding bell 82) of tube section 21b is a variable of interest, in accomplishing desirable distribution. Referring to FIG. 2, angle H defines an interior conical angle between opposite sides (or diameter) of opening 57a, and opposite sides of end 81. Typically the distance between end 57a and end 81 will be selected, so that the internal conical angle H is no more than 30° and preferably no more than 27°, and often not more than 25°. This has been found to provide a desirable expansion of a gas pulse exiting nozzle 57a, as it extends through tube 21 to end 81, for pulse jet operation. (Angle H will sometimes be referred to herein as the conical angle between the pulse exit end of the pulse distribution arrangement and the tip (i.e., discounting bell 82) of the first (inner) section of the outlet tube 21. Although smaller angles for angle H can be used, in some typical examples of the type depicted, angle H is within the range of 22°-27°.

For the particular air cleaner 1 depicted in FIG. 2, the housing 3 is configured so that when installed, axis 3z is generally horizontal and the inlet arrangement 16 is positioned at or adjacent end 37b of housing 3, i.e., adjacent axis cover 38. This latter will be typical for arrangements configured for horizontal mounting, and usually in such instances inlet aperture arrangement 16a will be positioned in overlap with media pack 5 at a location on the media pack 5 adjacent a location remote from an end of the housing at which evacuator valve 60 is located.

As referenced above, the air cleaner 1 includes an evacuation or vac valve arrangement 60, that provides for ejection of dust from annulus 18 during a pulse jet operation. The vac valve arrangement 60 is oriented in an overlap with an aperture arrangement (or dust ejector port) 60x in housing 3, typically in side wall 15. The aperture arrangement 60x allows dust to leave interior 3a, i.e. to leave annulus 18. The dust aperture arrangement 60x is typically spaced axially as far as reasonable toward end 37a from center line 16x of inlet arrangement 16; and, radially opposite a direction of projection of inlet arrangement 16 outwardly from side wall 15, when an axial inlet arrangement is used. (When a tangential inlet arrangement is used (FIG. 3) typically the dust aperture arrangement 60x should be spaced at least 200° around the housing in the flow direction of air, from a center line of the inlet.)

In certain selected applications of principles described herein, with horizontally mounted housings, typically the dust aperture arrangement 60x (in side wall 15 in communication with evacuation or vac valve arrangement 60) is positioned axially adjacent to, or axially beyond, end cap 10 of cartridge 4; "axially beyond" in this context is it meant in a direction opposite end cap 11. Also typically and preferably dust aperture arrangement 60x in side wall 15 in communication with evacuation or vac valve arrangement 60 is positioned adjacent shoulder region 90 in accumulator tank 51; shoulder region 90 including radially inwardly directed extension 91 and axial extension 92, and, axial extension 92 being spaced inwardly from outer wall 15 of housing 3 and in overlap with dust evacuation aperture 60x.

Although alternatives are possible in some instances, in certain other horizontally mounted air cleaner arrangements, evacuation or vac valve 60 can be positioned radially in overlap with cartridge 4, at a location adjacent end cap 10, or positioned along (and spaced from) cartridge 4 at a location in overlap with cartridge 4. When this is done, it is typically no more than 20% of a distance from end cap 10 and end cap 11. Thus, inlet arrangement 16 is typically positioned axially along air cleaner 1, with respect to annulus 18, as far as reasonably possible, from vac valve arrangement 60; and, vac valve arrangement 60 is positioned underneath a remainder of the air cleaner assembly 1.

In typical preferred arrangements that are configured for horizontal operation, vac valve 60 will be positioned in flow communication with annulus 18 at a location adjacent an end of annulus 18 opposite access cover 38; for the example shown this end 18x of annulus 18 being defined generally by shoulder 90 in accumulator tank 51. As a result of this location of the evacuation or vac valve 60, dust moving in annulus 18 toward accumulator assembly 51, under inlet flow of air from inlet arrangement 16, will be directed into the vac valve 60 for discharge from interior 3a. The example vac valve 60 depicted is discussed further below in section IB.

Figure 3:
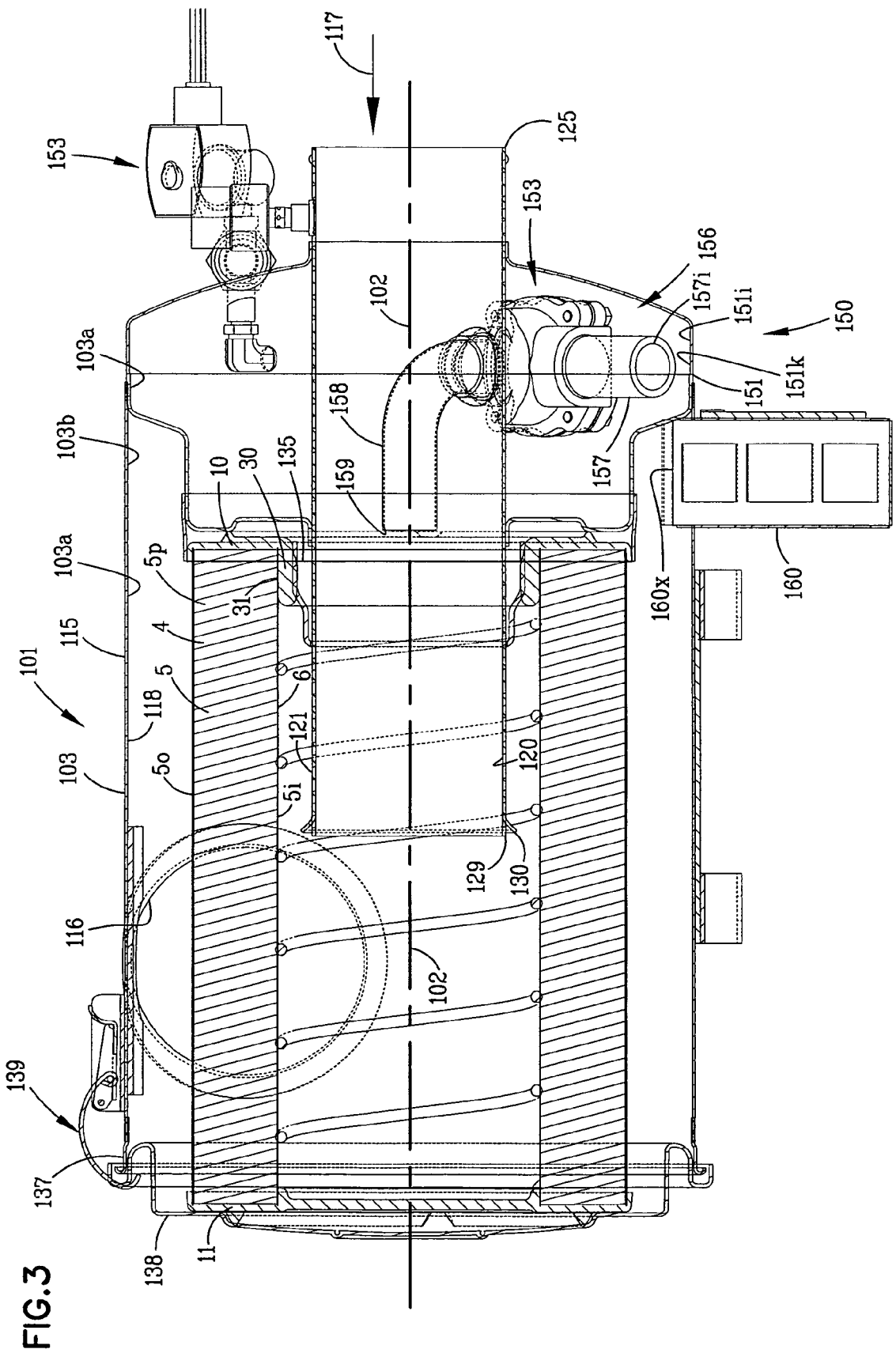
FIG. 3 is a schematic side cross-sectional view of an alternate air cleaner assembly to the one depicted in FIGS. 1 and 2.

Attention is now directed to FIG. 3, in which an alternate arrangement to that depicted in FIGS. 1 and 2 is depicted, in a cross-sectional view generally analogous to the view of 2. Like reference numerals are meant to refer to analogous components, with functions analogous to those previously discussed. In addition, similarly identified features and structures are meant to have analogous general functions to those previously discussed for the embodiment of FIGS. 1 and 2.

Referring to FIG. 3, air cleaner 101 is depicted comprising a housing 103 defining an interior 103a. Within the interior 103a is positioned a filter cartridge 4: comprising media 5 surrounding an interior region 6; and, having an outer perimeter 5o and an inner perimeter 5i, for the example shown each being circular. The media 5 can comprise pleated media 5p extending between opposite end caps 10, 11. At end cap 10 a housing seal arrangement 30 is provided, in the example shown configured for providing an inside radial seal 31 when pushed around housing seal support 135. Also, for the example shown, the housing 103 includes an open end 137 closed by access cover 138, the access cover 138 being secured in a closed position by latch arrangement 139. The cartridge 4 can be inserted in, and be removed from, interior 103a, when latch arrangement 139 is adjusted to permit access cover 38 to be removed from or pivoted away from open end 137.

Still referring to FIG. 3, the air cleaner 101 includes an inlet arrangement 116 configured to direct air flow into annulus 118 between housing side wall 115 and cartridge 4, and extending completely therearound.

For the example shown, inlet 116 is a tangential inlet, i.e., air flow into annulus 118 is generally in a direction tangential to a longitudinal center line 102 of the housing 103 and cartridge 4. This differs from the specific example discussed for FIGS. 1 and 2, although a tangential inlet could be used with such an arrangement. For the particular example shown in FIG. 3, inlet arrangement 116 is configured to direct air flow into a helical pattern around cartridge 4, in a counter-clockwise direction, when viewed from the orientation of arrow 117.

Air cleaner 101 further includes outlet tube 121 having interior 120, into which air filtered from passage through the media 5 flows, to be removed at outlet end 125 (to be directed into equipment on which the air cleaner 101 is mounted for use).

Air cleaner 101 further includes a pulse jet air cleaning arrangement 150 comprising: a compressed gas (air) accumulator tank 151; a charging valve arrangement (not shown) a solenoid valve 153 for control of pulse jet control valve arrangement 156; and, a pulse jet arrangement 153 including a pulse jet control valve (or pulse valve) arrangement 156. A difference from the air cleaner 1, FIGS. 1 and 2, is that the pulse jet valve or control valve 156 is depicted mounted within interior 151i of tank 150. The principles with respect to air cleaner 103 can be implemented with a pulse control valve mounted exterior to tank 151; and, the principles of air cleaner 1, FIGS. 1 and 2, can be implemented with a control valve mounted interior of tank 51.

Still referring to FIG. 3, evacuation or vac valve arrangement 160 is mounted analogous to, and operated analogously to, vac valve arrangement 60, FIG. 1, and mounted to receive dust through aperture 160x in sidewall 115.

Still referring to air cleaner 101, FIG. 3, from the above description it will be understood that housing 103 is divided into two sections: compressed gas (typically air) accumulator tank section 103a; and, filter cartridge receiving (and filtering) section 103b.

The pulse jet arrangement 153 includes a discharge arrangement 158 including nozzle end 159.

Relative dimensions and locations of the outlet 159, and tube 120 in cartridge interior 103a, can be generally analogous to those as discussed above for the embodiment of FIGS. 1 and 2.

In general operation and function, parts characterized with respect to FIG. 3 in analogous terms to those used for FIGS. 1 and 2 perform analogous functions, except as discussed. One selected difference relates to the observation that pulse valve arrangement 156 is secured inside of accumulator tank 151. Also, valve arrangement 156 includes an inlet pipe 157 directed generally downwardly, toward region 151k of interior 151i. It is into region 151k, that, under gravity influence, condensed moisture within tank 150 will tend to drain. Thus, a proximity between inlet end 157i of pipe 157, and region 151k; will ensure that moisture collected within an interior 151i will be pulsed out through distribution tube 158, during operation of pulse jet valve arrangement 156.

Distributor arrangement 158, analogously to arrangement 57, FIGS. 1 and 2, includes outlet end 159 for selective directing of a pulse flow into interior 120 of tube 121, in a manner facilitating cleaning collected dust off of an exterior of filter media 5. Also, to facilitate air flow into tube 121, end 129 of tube 121 includes an outer bell or flange 130 as depicted.

As an example, for an 11 inch (279.4 mm) diameter, 420 standard cubic feet per minute (198.2 liter/sec), air cleaner, it has been determined that an accumulator volume (accumulator tank volume) about 150 cubic inches (2.46 liter) is adequate, when using a one inch pulse valve. By the term "420 standard cubic foot per minute air cleaner" it is meant an air cleaner designed to accommodate an air flow of 420 cubic feet per minute. Again by the term "11 inch diameter air cleaner," reference is meant to a diameter of a portion of the air cleaner or sidewalls surrounding the cartridge 4.

B. The Vac Valve Arrangements 60, 160.

With respect to evacuation or vac valve arrangement 60, sometimes called an evacuator, attention is directed to FIGS. 13-17. Vac valve arrangement 160 would be analogous.

Figure 13:
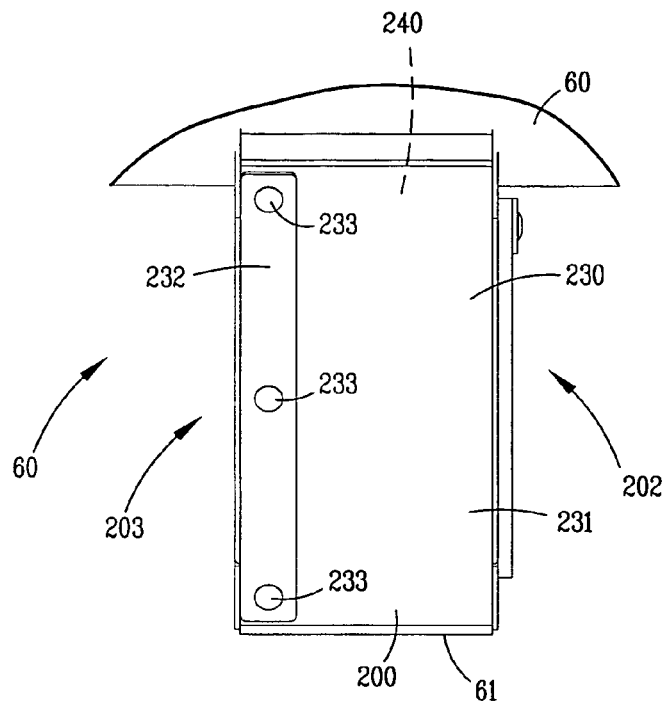
FIG. 13 is an enlarged schematic fragmentary view of a portion of FIG. 1.

Referring first to FIG. 13, vac valve arrangement 60 is shown in a fragmentary side elevational view (see FIG. 1 for orientation). The vac valve 60 includes: a first side 200; a second, opposite, typically mirror image, side 201 (FIG. 14); a front end 202; and, a second, opposite, rear end 203. Referring first to FIGS. 1 and 2, second or rear end 203 is generally a surface directed toward end 37b of housing side wall 15 on which access cover 38 is positioned; i.e. toward inlet arrangement 16. In the example shown, second or rear end 203 is typically a featureless end with respect to air flow; by having no flow apertures or valve arrangements thereon.

Figure 14:
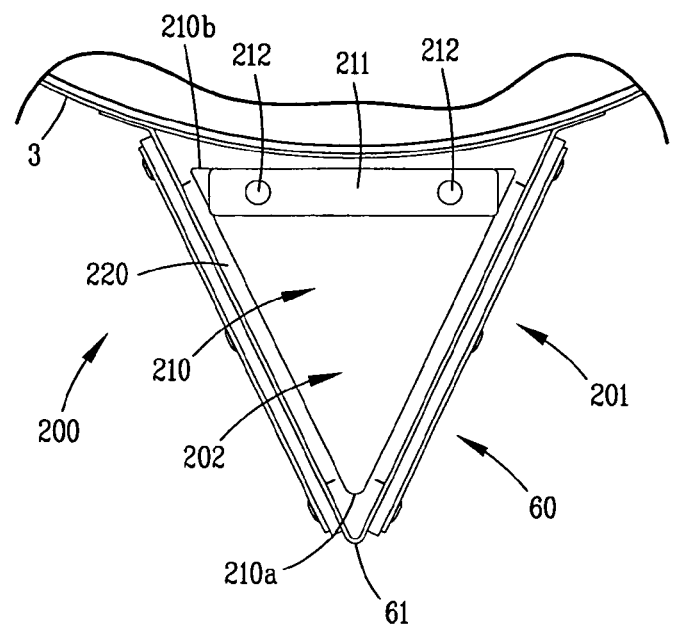
FIG. 14 is an enlarged fragmentary first end view of the portion of FIG. 1 depicted in FIG. 13.

Referring to FIG. 14, first or front end 202, opposite end 203, is typically an end directed away from access cover 38 of air cleaner 1. First or front end 202 of vac valve arrangement 60 generally comprises a valve member arrangement 210 secured in position, in the example shown by securing bar 211, although alternatives are possible. Valve member 210 is generally a flexible piece of material, in this instance triangular with a tip 210a pointed downwardly. Bar 211 is shown (in FIG. 14) secured in place by rivets, bolts or other attachment arrangements 212, along a perimeter edge section of valve member 210. Thus, tip 210a of valve member 210 can flex toward the viewer relative to the orientation shown in FIG. 14. Referring still to FIG. 14, the particular valve member 210 depicted, is a single piece having a triangular shape with tip or corner 210a directed downwardly.

Figure 17:
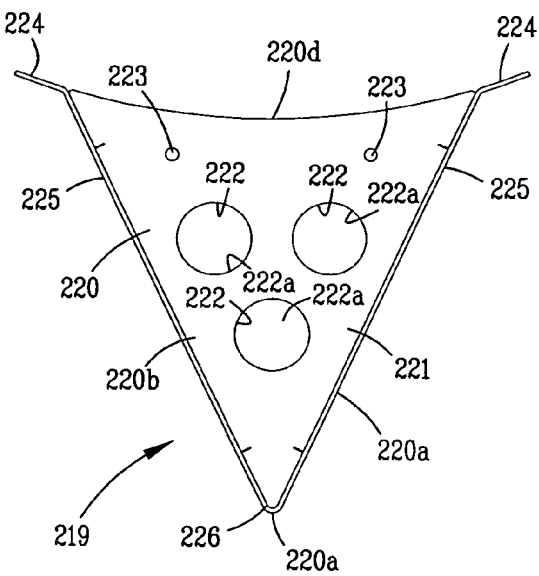
FIG. 17 is a schematic elevational view of a second subcomponent of the componentry depicted in FIG. 13.

Referring to FIG. 17, a frame arrangement 219 including support 220 for valve member 210 is depicted. The support 220 is positioned underneath valve 210, FIG. 14. The support 220 generally has a region 221 with a downwardly directed tip 210a and with opposite edges 220b, 220c diverging toward tip 220a. The support 220 includes flow aperture arrangement 222 therein. For the example shown, the flow aperture arrangement comprises three flow apertures 222a, oriented in a triangular pattern, with two adjacent one another and a third located underneath the first two. At 223 apertures for securing bar 211 in place with rivets, bolts or other attachments 212 is shown.

Still referring to FIG. 17, it is noted that support 220 has a generally triangular shape with a downwardly directed point 220a and two opposite straight sides 220b, 220c, which diverge toward one another at point or tip 220a, away from upper arced side 220d. Side or edge 220d is arced to a radius corresponding to an outside surface of the air cleaner housing wall 15, for mounting. Flanges 224 are provided to assist in mounting.

Typically, end piece 220 is mounted on a frame comprising flanges 224, and sides 225, the sides being joined at tip 226.

In operation, when pressure inside of vac valve 60 is increased, for example during a pulse jet operation, valve member 210 can bias away from apertures 222, allowing dust ejection through aperture arrangement 222. On the other hand, during a normal operation of air cleaner 1, without the pulse jet arrangement 50 being actuated, pressure within interior 3a will generally be reduced, relative to ambient. This will tend to bias flexible valve member 210 against apertures 222, closing them.

Vac valve arrangement 60 is configured to allow a rapid release of pressure from interior 3a, under pulse jet cleaning operation, to rapidly eject dust from interior 3a. To facilitate this, additional ejection apertures and valve arrangements are provided in vac valve 60. With respect to this, attention is directed to FIG. 13. In FIG. 13, side 200 of vac valve arrangement 60 is depicted. Side 200 includes a valve arrangement 230 thereon, comprising a flexible valve member 231, in the sample shown secured in place by bar 232 and attachment arrangements 233, although alternatives are possible. For the example shown, valve member 231 is a flexible member generally rectangular in configuration, with bar 232 extending along a longer side (perimeter edge section) of the rectangular shape.

Figure 16:
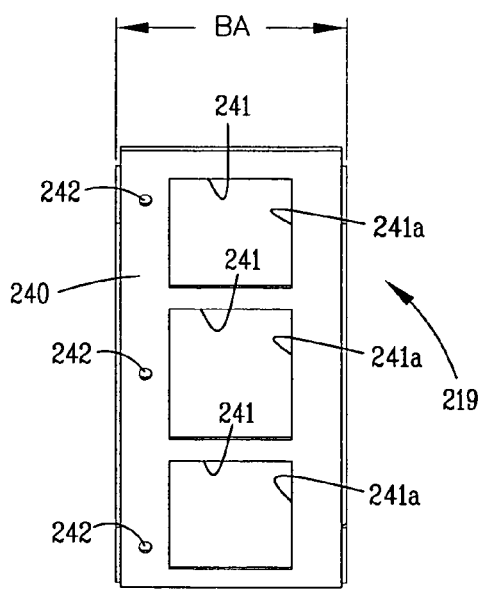
FIG. 16 is a schematic side elevational view of a subcomponent of the componentry depicted in FIG. 13.

Referring to FIG. 16, frame arrangement 219 (with side piece 240, which would be positioned underneath flap valve 231) is viewable. Side piece 240 includes an aperture arrangement 241, in this example comprising three apertures 241a. The number and shape of apertures 241a can be varied; for the particular example three, vertically spaced, rectangular apertures 241a being depicted.

Apertures 242 are for attachment of attachment members 233, for securing bar 232 in place. Analogously to operation of valve member 210, FIG. 14, when pressure builds up in interior 3a of air cleaner 1, during a pulse jet operation, flexible valve member 221, FIG. 13, will bias sufficiently to open apertures 241, FIG. 16, to air pulse and dust ejection therethrough. However, when the pulse jet air cleaning system is not operating to direct a cleaning pulse into cartridge 4, air flow within interior 3a will generally provide for a reduction in pressure relative to ambient, and flexible valve member 231 will generally press against frame piece 240, closing apertures 241.

For the particular example vac valve 60 depicted, at side 201, FIGS. 13 and 14, a structure analogous to that described in FIG. 13 for side 200 would be positioned, allowing for release of compressed air and dust through side 201, when a pulse jet system is operated.

Figure 15:
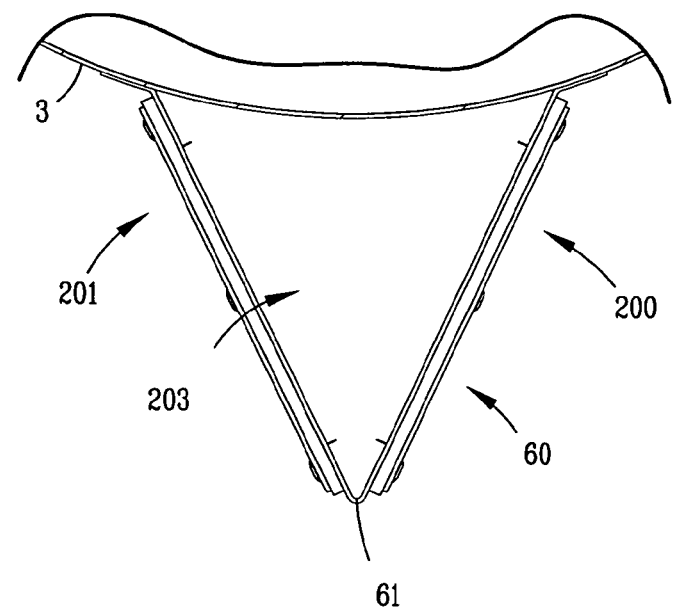
FIG. 15 is an enlarged schematic second end view of the component depicted in FIG. 13.

Typically, sides 201 and 202 of the vac valve arrangement 60, together comprise a frame arrangement including two sides analogous to frame piece 240, FIG. 16, which comprise two downwardly directed straight sections joined to one another at tip 61, FIG. 15. The two sections can be mounted in place on an air cleaner, by flanges 224, FIG. 17. End piece 203, and support piece 220 are secured to the frame pieces 240. The flexible valve members 210, 230 are secured in place as described.

In a typical system, the longer length (i.e., height) of the rectangular valve member 230 would be at least 20 cm, typically 20 cm to 30 cm; the width of member 230 would be at least 11 cm, typically 11-18 cm; and the distance between tip 210*a* and opposite edge 210*b* of flexible valve member 210, FIG. 14, would be on the order of at least about 6.5 cm typically with the range of 7 cm to 13 cm. A length of edge 210*b* would typically be within the range of 6.5 cm to 12 cm, inclusive. The total open area in side piece 240 and the opposite side piece, would typically be at least 40% of a peripheral area of side piece 240 and usually 50 to 70% of that peripheral area. The same would be true for the opposite piece of side piece 240. As to side piece 220, typically the aperture arrangement 222 therein would have an area of at least 4%, usually a value within the range of 5 to 40% inclusive, of a total perimeter area of piece 270.

Vac valve 160, FIG. 3, can be made with an analogous structure to that shown for vac valve arrangement 60. Indeed in some systems, identical vac valve arrangements can be used.

The material from which the flexible valve members 210, 230 are made, would typically be a flexible rubber or rubber like material, of appropriate impermeability. One useable material comprises a Hypalon material having a durometer Shore A of 65, and a thickness of about 0.125 inch (3.2 mm).

With respect to example dimensions, it is noted that with an evacuation or vac valve in accordance with vac valve 60 or 160, it has been found that an open area for exit apertures from the vac valve on the order of about 13.5 square inches (87.1 square cm) has been known to perform well in an 11 inch (27.9 cm) diameter air cleaner having a primary air flow of 420 standard cubic feet per minute. By the term 11 inch diameter air cleaner, it is again meant that the air cleaner side wall has an outer diameter of 11 inches. For many examples according to the present disclosure, an open area on the order of about 11 square inches (71 sq. cm) to 15 square inches (97 sq. cm) will be useful, in air cleaners of the size typical for equipment with which it is desirable to use a two stage pulse jet air cleaner with a cylindrical cartridge, although alternatives are possible.

II. Alternate Flow Distribution Arrangements, FIGS. 4-6

For the examples described above in connection with FIGS. 1-3, the pulse jet of air from the accumulator tank (51, 151), is depicted directed from a flow distribution arrangement (57, 158) into an outlet tube 21, 121 which itself is directed into the cartridge 4 a distance (typically) of at least 35% of a length of the cartridges from end cap 10 toward end cap 11. In some systems it may be desirable to avoid an extended outlet tube analogous to tubes 21, 121. When this is the case, alternate pulse jet distribution arrangements can be used. An example is shown and described in FIGS. 4-6.

Figure 4:
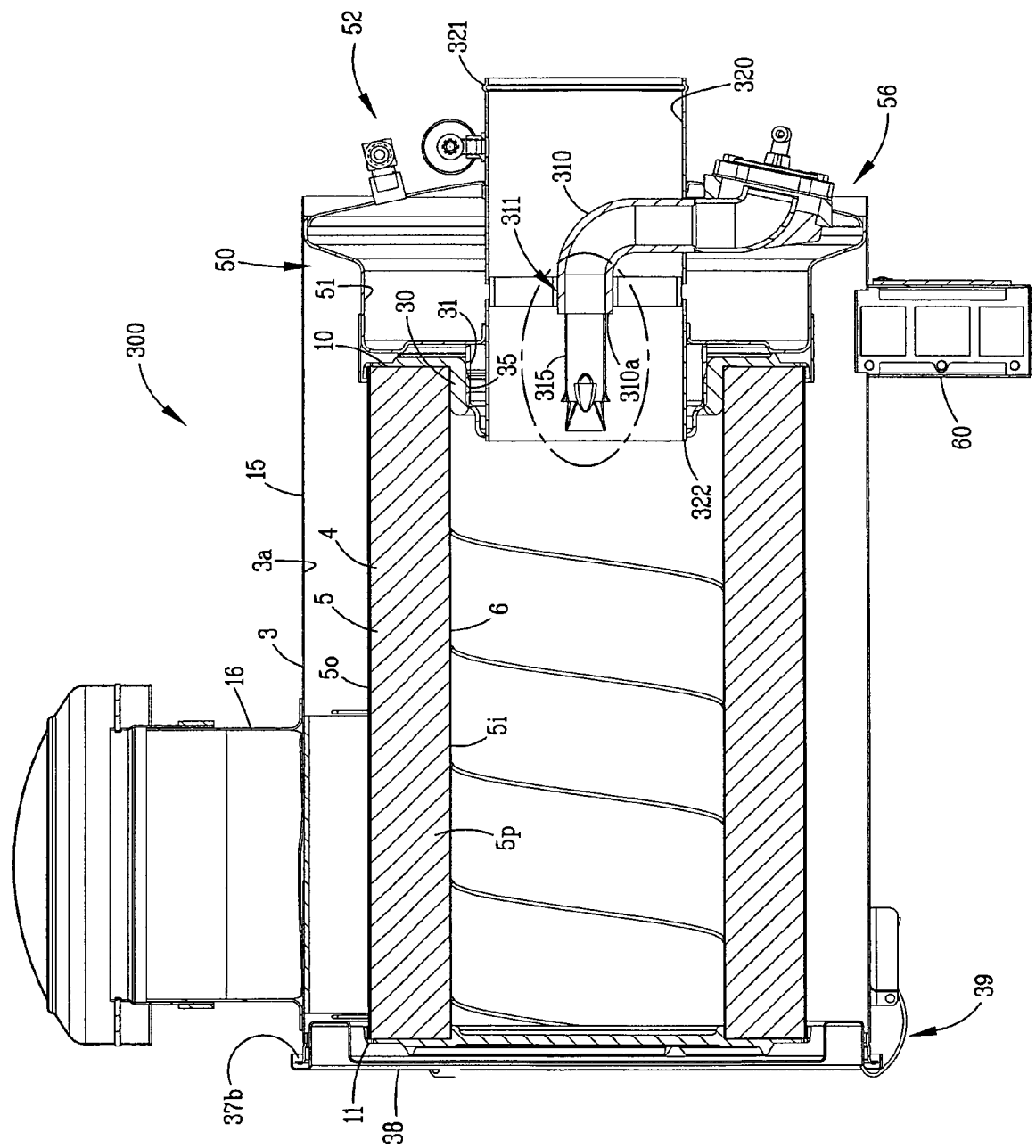
FIG. 4 is a schematic side cross-sectional view of a second alternate air cleaner assembly to the ones depicted in FIGS. 1-3.

Referring to FIG. 4, air cleaner 300 is depicted. Air cleaner 300 is generally analogous to air cleaner 1, FIG. 1, except for features relating to the flow distribution discussed herein below. It is noted that the analogous features discussed for flow distribution with respect to air cleaner 300, can also be applied in a modified version of air cleaner 101, FIG. 3.

Referring to FIG. 4, air cleaner 300 includes housing 3 defining interior 3*a* with inlet arrangement 16. The side wall 15 includes an open end 37*b* closed by access cover 38 which is secured in place by latch arrangement 39. Within interior 3*a* is positioned cartridge 4 comprising media 5 extending between end caps 10 and 11. The cartridge 5 comprises, in this instance, pleated media 5*p* defining an interior 5*i* and an exterior 5*o* surrounding interior space 6. End cap 10 includes housing seal arrangement 30 thereon, in this instance forming a radial seal 31 around support 35.

The air cleaner 300 includes a pulse jet air cleaner arrangement 50 including a compressed gas (air) accumulator tank 51. Selected features of accumulator tank charging arrangement 52 are depicted. Also depicted is a control valve arrangement 56 for providing a pulse jet of air from interior of accumulator tank 51 through conduit 310 to distribution arrangement 311. For the example shown in FIG. 4, outlet tube 320, for selected air flow from interior 6 into downstream equipment through outlet 321 is depicted. Although alternatives are possible, for the example shown, the outlet tube 320 has an end 322 that does not project further than 25% of axial length of cartridge 4 (typically not more than 20% of this distance and usually not more than 15% of this distance) into cartridge 4, from end cap 10. Mounted adjacent end 310*a* of tube 310 is provided, as part of distribution arrangement 311, distributor nozzle 315. For the sample shown, the distributor nozzle 315 projects into cartridge 4 from conduit 310 and is depicted, schematically, in more detail, in FIGS. 5 and 6.

Referring to FIG. 5, distributor nozzle 315 includes a conduit member 316 with at least one and usually a plurality of side air release arrangements 317 thereon. For the example shown there are four side release arrangements 317 radially spaced (in the example shown evenly radially spaced) around an outer periphery of conduit 316, although alternative numbers and locations are possible. In addition, conduit 316 includes an open end 319 through which a portion of compressed gas (air) pulse can release.

Attention is directed to side air release arrangement 330, which comprises one of the four side arrangements 317, FIG. 5. Release arrangement 330 includes an upstream (with respect to pulse jet flow) section 331 and a downstream, with respect to pulse jet flow, section 332. For the examples shown, end 332 flares inwardly, and end 331 flares outwardly. This creates an opening for side distribution arrangement 330 at location 335, for a portion of air flowing down a region of tube 316 to escape through a side of tube 316 without reaching end 319. Opposite arrangement 330, FIG. 5, is provided at analogous arrangement 340 positioned the same distance from upstream end 350 of nozzle 315. Side release arrangements 341, 342, FIGS. 5 and 6 are analogously configured, but each is positioned further upstream with respect to pulse jet flow i.e., toward end 350, than are arrangement 330, 340.

In FIG. 6, a view looking in the opposite direction of arrow 360, FIG. 5, is provided. It is noted that arrow 360 generally shows the pulse jet flow direction through nozzle 315.

One can see, from FIGS. 5 and 6, that air pressure passing down interior 315*i* will spread with a portion exiting the side of tube 316 at outlets 330, 340, 341, and 342, and with a portion exiting end 319. This will help to radially distribute the pulse flow as it spreads into the cartridge 4, to facilitate pulse jet cleaning of cartridge 4. In more general terms, the downstream inward flares 332 each form an air funnel or scoop, collecting a portion of a pulse jet directed down interior 315i, and directing that pulse jet out through a side of nozzle 316. Outward upstream flares 331 facilitate increase in the size or amount of the sidewardly directed pulse.

It is noted that an alternate number of side outlet arrangements 317, from the four depicted in FIGS. 5 and 6, can be used. Further, an alternate arrangement or shape of these, along an extension of nozzle 315 can be used. The particular arrangement depicted, however, exemplifies a principle for defining outward radial expansion of the pulse around a 360° radius, to match region 6, in the example shown cartridge 4 having a circular cross section.

It is noted that in some examples, a downstream inner flare can be used in the absence of an upstream outer flare, to get some side distribution. In addition, alternative shapes and location of the side arrangements 317 can be used.

III. Inlet Flow Arrangements

A. Features of an Example Axial Inlet Flow Arrangement, FIGS. 7 and 8.

Figure 7:
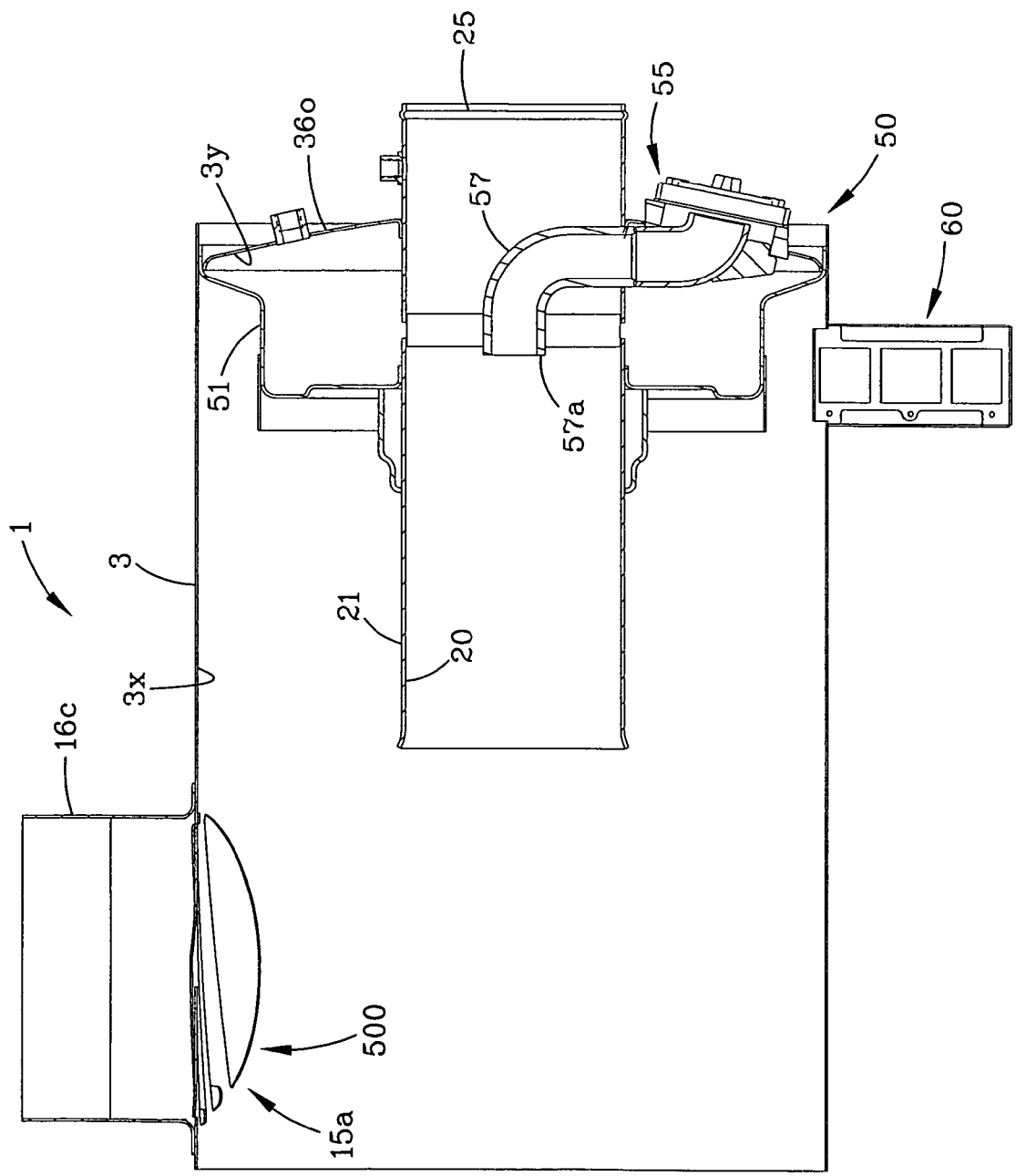
FIG. 7 is a schematic cross-sectional view of selected componentry of the assembly depicted in FIGS. 1 and 2.

Referring to FIG. 1, for the example air cleaner 1 depicted, the inlet arrangement 16 is an axial inlet, in that air flow through inlet arrangement 16 is generally directed toward a central axis 3 of the housing 3. Features to facilitate flow are shown in FIG. 7. In FIG. 7, the portions of air cleaner 1 depicted are shown with collar 16b, rain cover 16d, cartridge 4 and end cover 38 removed. Also, FIG. 7 is schematic, and does not depict detail features.

Referring to FIG. 7, it can be seen that mounting tube 16c directs air in an axial entrance, toward a central axis of housing 3. For the variation shown in FIG. 7, side wall 15, includes, underneath directing tube 16c, an inlet arrangement 15a comprising a vane or louver arrangement 500, to facilitate directing the air into a circular pattern around cartridge 4, FIGS. 1 and 2.

Figure 8:
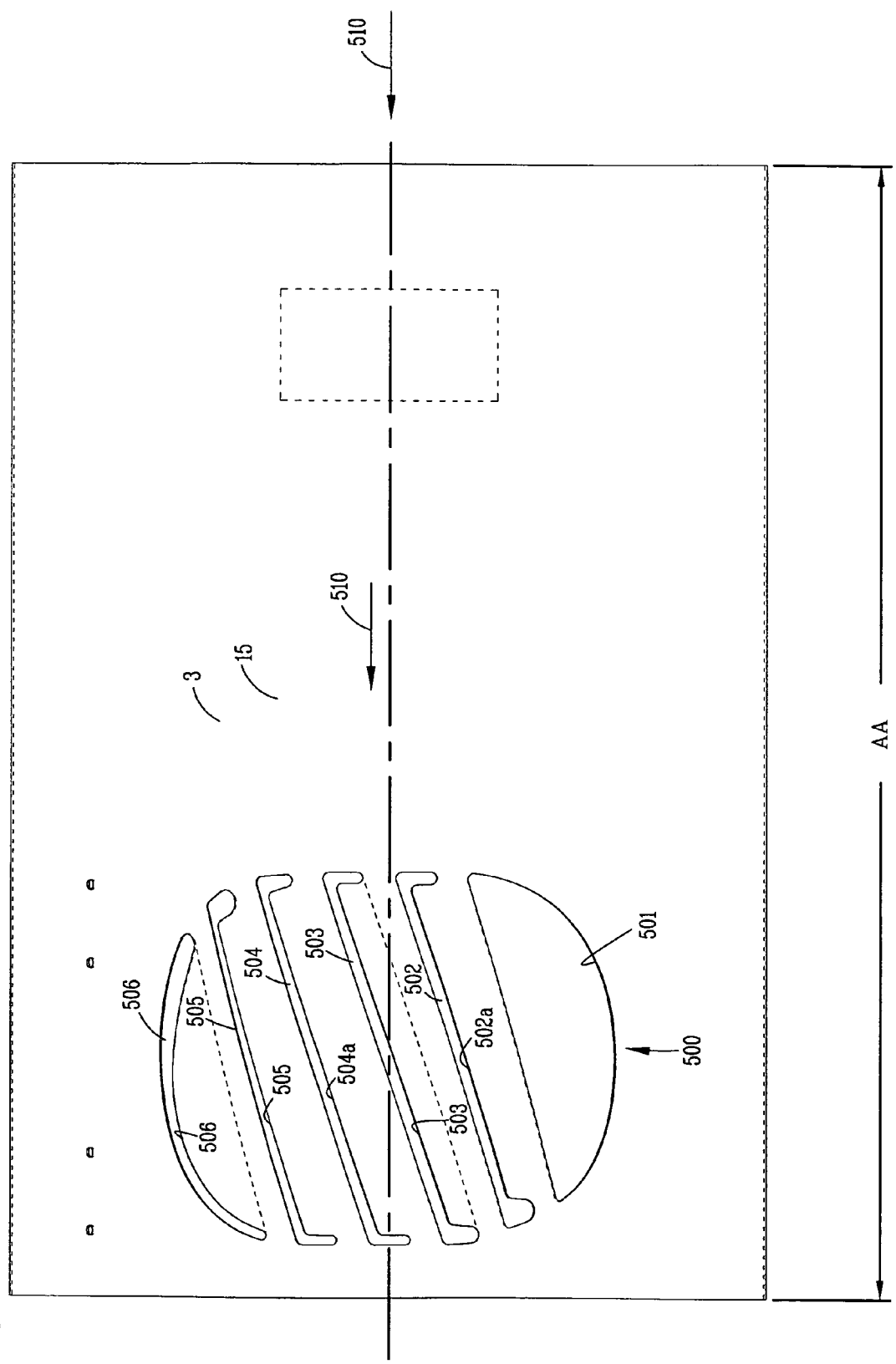
FIG. 8 is a schematic top plan view of a selected portion of the componentry depicted in FIG. 7.

The vane or louver arrangement 500 can be seen in FIG. 8, in which side wall 3 is depicted with tube 16c removed. The vane or louver arrangement 500 comprises a plurality of openings, in this instance openings or cuts 501, 502, 503, 504, 505, and 506, in side wall 15. The openings or cuts in the side wall 15, are formed with tips 502a, 503a, 504a, 505a, and 506a bent into housing 3 (away from the viewer in FIG. 8). As air enters through tube 16c, FIG. 7, vane or louver arrangement 500 will start circulating the air in a circular pattern, around cartridge 4. For the example shown, vane or louver arrangement 500 is directed to cause the air to flow clockwise, when viewed in the direction of arrow 510, FIG. 8, although alternatives are possible.

As a result of being directed in the cyclonic or helical flow, in the example clockwise, preseparation of some particulate material or dust material within the inlet air flow will occur, with this preseparation ultimately directing the air in the direction of the evacuator or vac valve 60, FIG. 7.

It is noted that with respect to the assembly of FIG. 3, the inlet was tangentially directed. A tangential inlet can be used to provide a direction of air flow into a cyclonic or helical pattern, without the need of a vane or louver arrangement to further facilitate direction of air flow.

Referring again to FIG. 8, at dimension AA, a length dimension for the housing 3 is provided. The principles described herein can be applied in connection with housings 3 having side walls 15 of a variety of lengths. Example lengths are at least 12 inches (30.5 cm), with many within the range of 14 to 24 inches (36-61 cm) inclusive, although alternatives are possible.

B. Inlet Valving Arrangements, FIGS. 9-12

In general, it is desirable to avoid expulsion of dust through the inlet arrangement (16, 116), when the pulse jet air cleaning system is operated. A reason is because dust which ejects outwardly to the inlet, will likely be almost immediately sucked back into the air cleaner, under normal flow of inlet air. The engine is typically not shut off during a pulse jet cleaning arrangement, and thus dust ejected into the inlet, will become re-entrained in the flow of inlet air. Also, dust ejection through the inlet arrangement 16 may be to an undesirable location with respect to the vehicle or other equipment involved.

To facilitate operation of the pulse jet system, with avoidance of ejecting dust pulsed off the cartridge from being directed out the inlet arrangement, some variations in which valve members or arrangements are used to inhibit undesirable movement of the dust have been developed. Examples of these are described in the schematic depictions of FIGS. 9-12.

1. An Example Single Valve Flap Arrangement, FIGS. 9 and 10.

Figure 9:
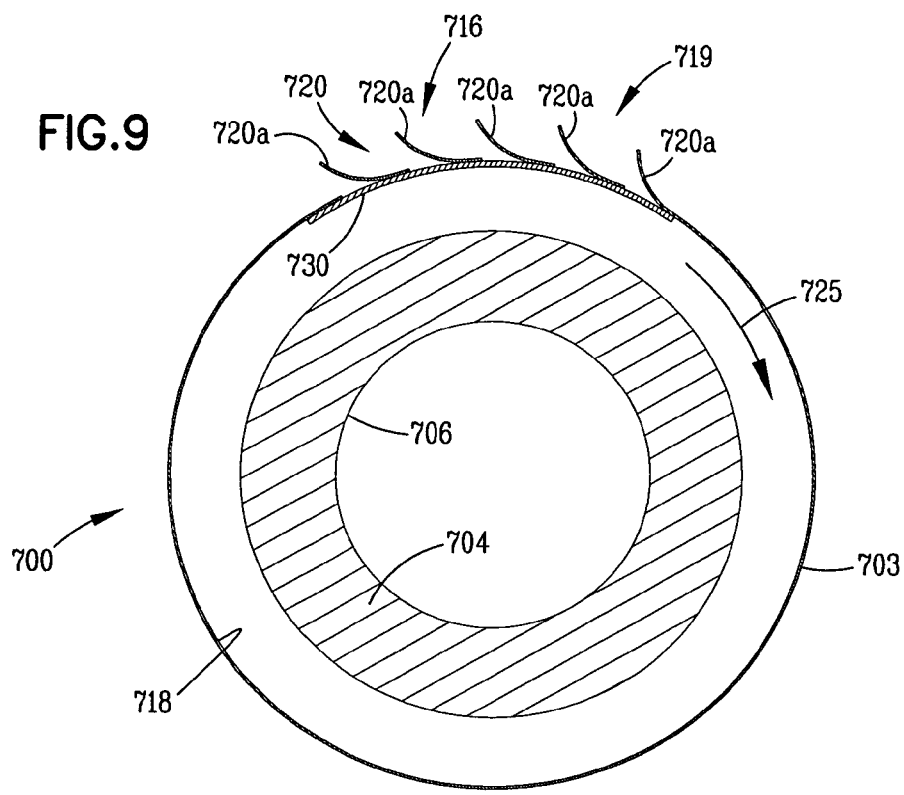
FIG. 9 is a schematic end cross-sectional view of a first inlet feature variation useable in the assemblies of FIGS. 1-4.
Figure 10:
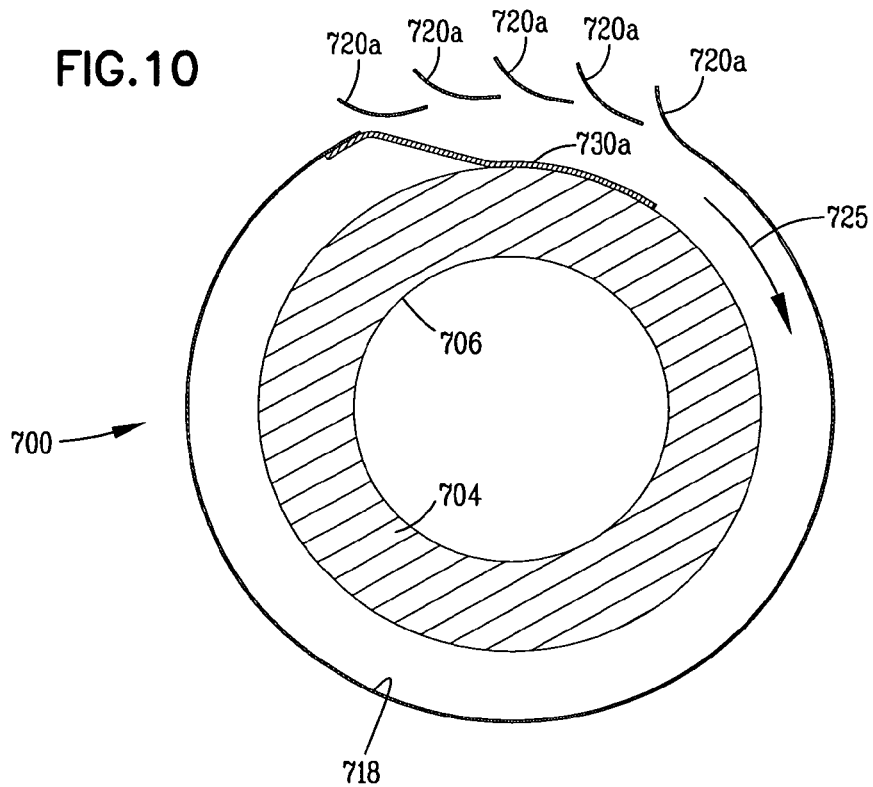
FIG. 10 is a schematic cross-sectional view depicting the inlet feature variation of FIG. 9 shown in an inlet air flow passage position or orientation.

Attention is first directed to FIGS. 9 and 10. These figures are schematic, cross-sections through an air cleaner assembly 700. Referring to FIG. 9, assembly 700 comprises a housing 703 and internally received cartridge 704 with annulus 718 therebetween. At inlet 716 a flow direction arrangement 719 is provided (in this example) in the form of inlet vane a louver arrangement 720, which is configured to direct air flow around cartridge 704 in a clockwise manner with respect to the viewer's eye, as shown by arrow 725. For the particular example shown, inlet vane arrangement 720 comprises five vanes or louvers 720a, although an alternate number and arrangement of vanes or louvers 720a is possible.

Mounted along side wall 703 is a flap valve arrangement or member 730. Flap valve arrangement or member 730 is configured to close inlet 716, selectively. This will be understood by reference to both FIGS. 9 and 10.

In FIG. 10, flap valve arrangement 730 includes a single flexible flap 730a shown biased away from inlet 716. Such a biasing of flap 730 will generally occur when inlet air pressure through inlet 716, directed by vane arrangement 719, is substantial. Referring to FIG. 10, it is noted that when in the open position, flap valve arrangement 70 also facilitates direction of air flow into the helical or cyclonic pattern represented by arrow 725.

During a pulsing, pressure within interior 706 of cartridge 704 will increase. This will bias the flap 730 back against inlet 716, FIG. 9, inhibiting dust flow out through inlet arrangement 716.

The features of FIGS. 9 and 10 are shown schematically, and the extremes depicted in FIGS. 9 and 10 are examples of extreme positioning of the flap valve 730a, between an open extreme (FIG. 10) and a closed extreme (FIG. 9). In some instances, the flap valve 730a may be configured to bias only between a partially closed and a partially open position, during normal operation. However, it is noted that in many typical preferred applications, for a brief period as a result of the pulsing of a back flush flow from interior 706 of cartridge 704 into annulus 718, flap valve 730 will be biased to a completely closed position.

The principles described in connection with FIGS. 9 and 10 can be applied with arrangements in accord with many of the general features of air cleaners depicted in any of FIGS. 1, 3 and 4. Also, flap arrangements such as flap valve arrangement 730 can help with noise control; i.e. they can provide a silencing function. Further, the flap arrangement protects media in the filter cartridge from direct impact of high velocity dust directed into the air cleaner.

A useable material for the flap valve arrangement 70, is a rubber or rubber-like material, for example a 65A durometer Hypalon material, having a thickness of about ⅛ inch (3.2 mm). Alternatives from this are possible.

2. A Multi Flap Arrangement, FIG. 11.

Figure 11:
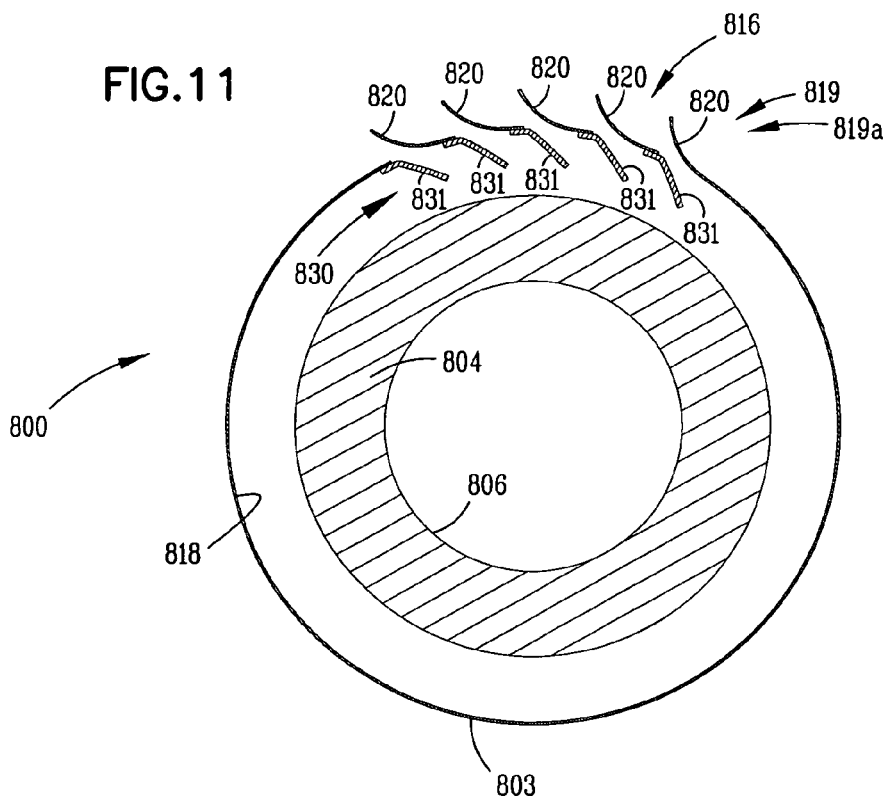
FIG. 11 is a schematic cross-sectional view depicting an alternate inlet feature variation to the feature depicted in FIG. 9.

Referring to FIG. 11 an air cleaner 800 is depicted generally schematically and analogously to air cleaner arrangement 700. Air cleaner arrangement 800 includes a housing 803 with an internally received filter cartridge 804 around an open interior 806, and defining an annulus 818 between the cartridge 804 and a wall 803. An inlet arrangement 816 comprising a flow direction arrangement 819, in this instance a vane arrangement 819a comprising a plurality of vanes 820 is depicted. A flap valve arrangement 830 is shown, positionable between an open position and a closed position, to close inlet arrangement 816. In this example the flap valve arrangement 830 comprises a plurality of flexible flaps 831, one associated with each opening associated with vanes 820. The individual flaps 831 can be operated analogous to flap 730, FIG. 10, to: (i) open under inlet flow through inlet arrangement 816; and (ii) to close during pulsing from increased pressure in region 806, to control expulsion of dust outwardly through inlet 816 during a pulse jet operation.

The flap valves 831 also facilitate helical or cyclonic flow.

3. A Flap Valve Arrangement With a Tangential Inlet, FIG. 11A.

Figure 11A:
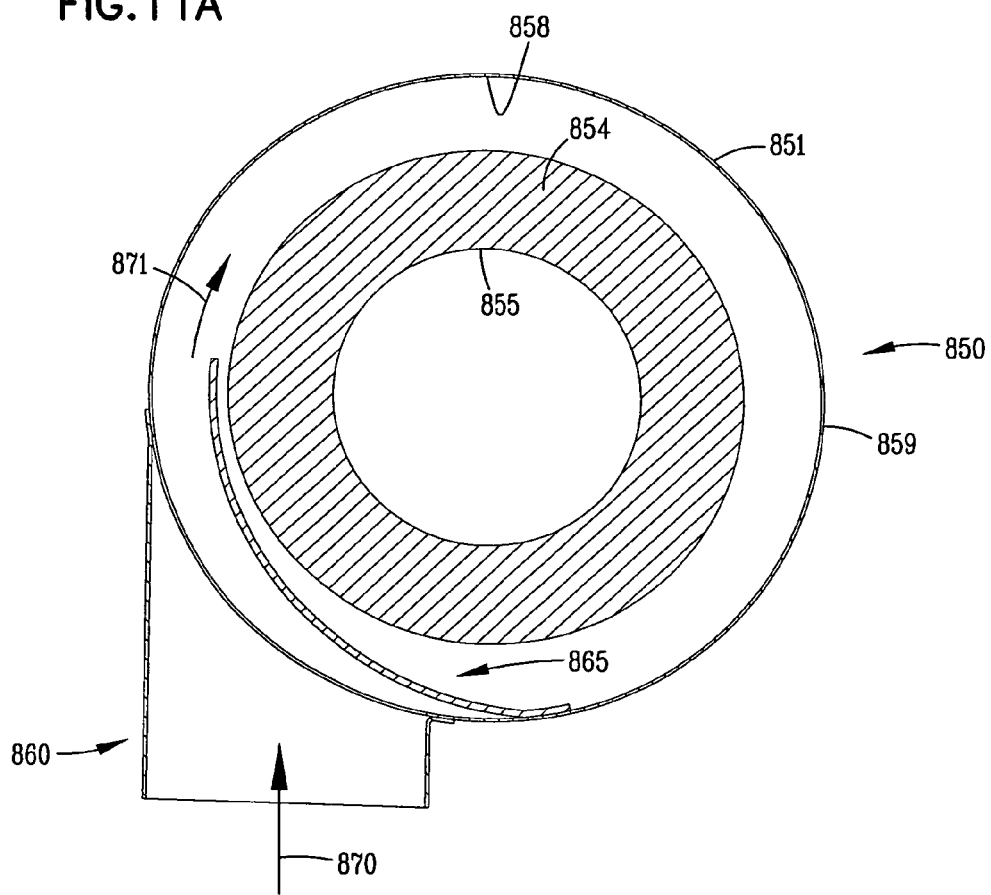
FIG. 11A is a schematic sectional view depicting a further inlet feature variation to the inlet feature variations depicted in FIGS. 9-11.

In FIG. 11A, an air cleaner 850 is depicted in schematic cross-section, comprising housing 851 with internally received cartridge 854 around an interior 855. An annulus 858 is provided between the cartridge 854 and side wall 859. Inlet arrangement 860 is depicted as a tangential inlet. Flap valve arrangement 865 is shown mounted on an interior wall 859 flexible between open and closed positions, in the example of FIG. 11A, a generally open position being shown. In the open position, air can enter inlet arrangement 860 in the direction of arrow 870, to be transferred into a generally helical or cyclonic pattern as indicated by arrow 871. When a pulse occurs to increase pressure in region 855, flap valve arrangement 865 will bias to close inlet 870 briefly, during the pulsing.

FIG. 11A, then, shows that in general the principles described above in connection with the arrangement of FIGS. 9 and 10, can be implemented with a tangential inlet arrangement.

4. A One Way Valve Arrangement, FIG. 12.

Figure 12:
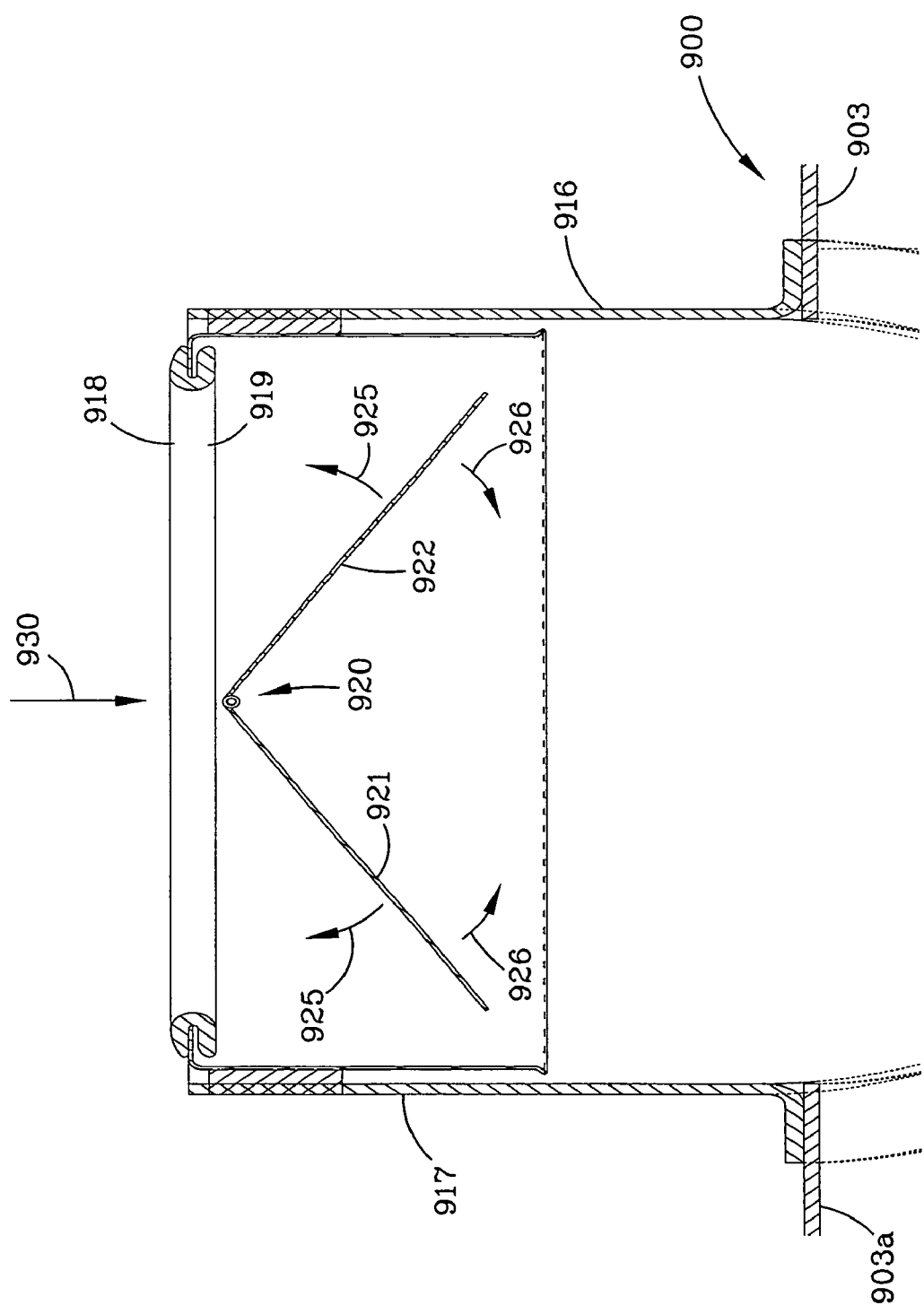
FIG. 12 is a schematic, fragmentary, cross-sectional view of a further alternate inlet feature variation to those depicted in FIGS. 9-11A.

In FIG. 12 a fragmentary cross-sectional view of yet another version of controlling dust flow at an inlet arrangement is depicted. In FIG. 12, air cleaner 900 comprising a side wall 903 with inlet section 916, is shown. In the example of FIG. 12, only the inlet section 916 and a portion of side wall 903 are depicted. The inlet section 916 comprises a tube 917 with an inlet aperture 918 provided with a seal gasket 919. Spring loaded valve arrangement 920 is depicted with valve leaves 921, 922. The valve leaves are biased under spring pressure in the direction of arrow 925 to be closed, under pressure within interior 903a of housing 903. This would be, for example, during a pulsing operation. In addition, leaves 921, 922 are biased open toward one another in the general direction of arrows 926, overcoming spring pressure, during inlet flow in the direction of arrow 930, into interior 903a. This would be a normal operation without the pulse jet initiated to open aperture 918 to inlet air flow into the air cleaner 900.

IV. Further Variations and Possible Features

A. Alternate Closed End for the Filter Cartridge, FIG. 18.

The filter cartridge 4 of FIGS. 1-3, includes a closed end cap 11, for the example shown a molded-in-place end cap. For some molded materials, central region 11c can be relatively weak. This can, in some instances, raise an issue with respect to pulsing operation potential damaging the element.

Figure 18:
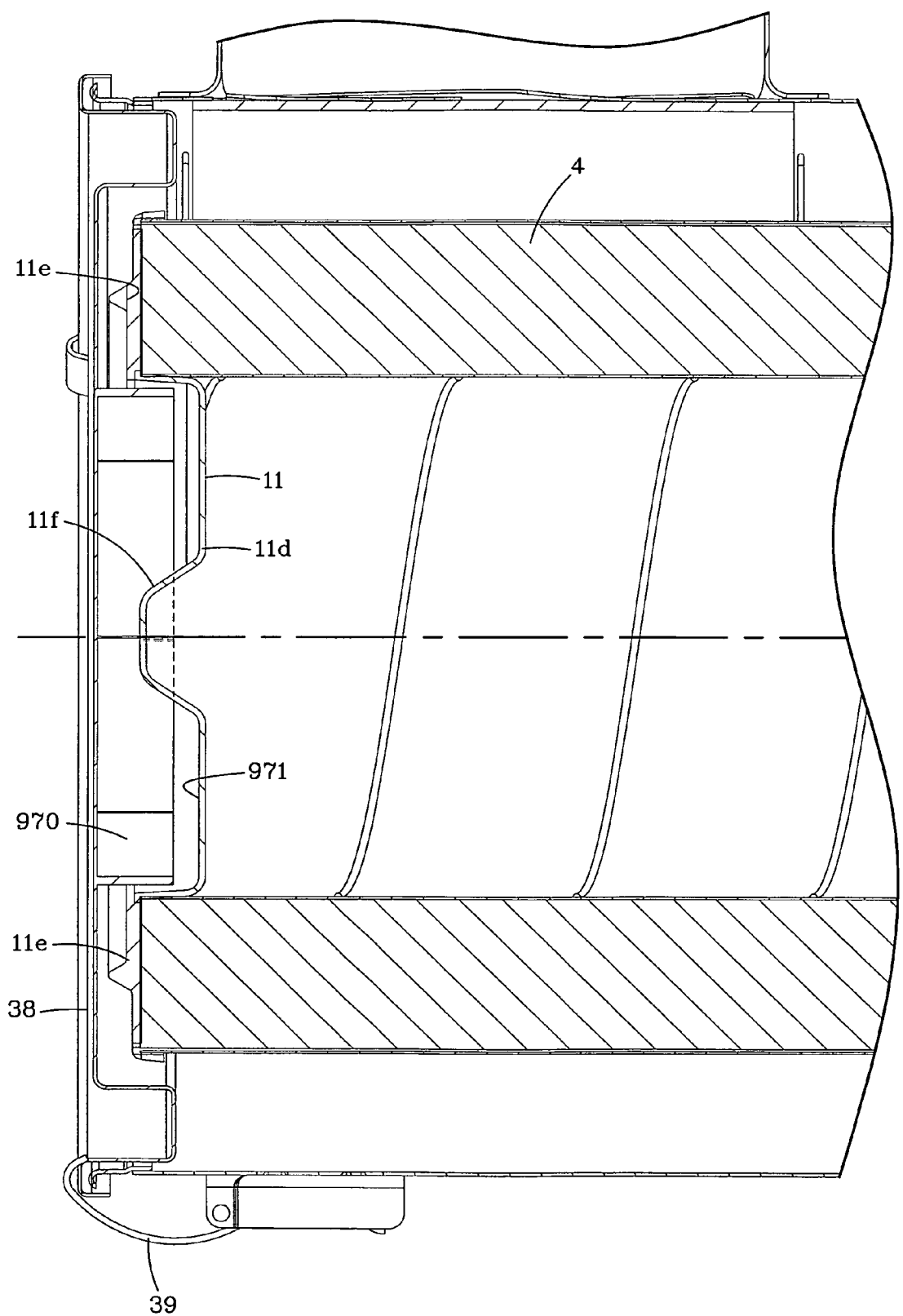
FIG. 18 is an enlarged, schematic, fragmentary cross-sectional view depicting an alternate to selected features depicted in FIGS. 1-4.

In addition, it will be understood that under typical pulse jet operations, there is a pressure biasing the cartridge 4 in a direction away from the pulse jet arrangement 55 when pulse jet operation occurs, FIG. 1 (or analogously in FIGS. 3 and 4). In FIG. 18, a variation in the cartridge housing interaction at the closed end cap 11 is depicted.

Referring to FIG. 18, a fragmentary cross-sectional view is schematically shown depicting closed end cap 11. Here closed end cap 11 includes a central member 11d comprising a rigid, for example preform plastic, member secured in place under molded ring 11e. Thus, end cap 11 is a composite end cap comprising molded-in-place material 11e with a central rigid member 11d secured in place under the molding 11e. For the example shown, rigid member 11d is provided with a central axially directed frusto-conical portion 11f, with a cone directed toward access cover 38. For the example shown, access cover 38 includes a projection 970 which projects into recess 971 around cone 11f. Rigid member 11d is not likely to flex substantially under pulsing; and, projection 970 can be configured to project against recessed ring 971 if desired (not shown) to further support the cartridge 4 even more securely.

B. Pulse Jet Control Arrangement and Logic, FIGS. 19 and 20

Figure 19:
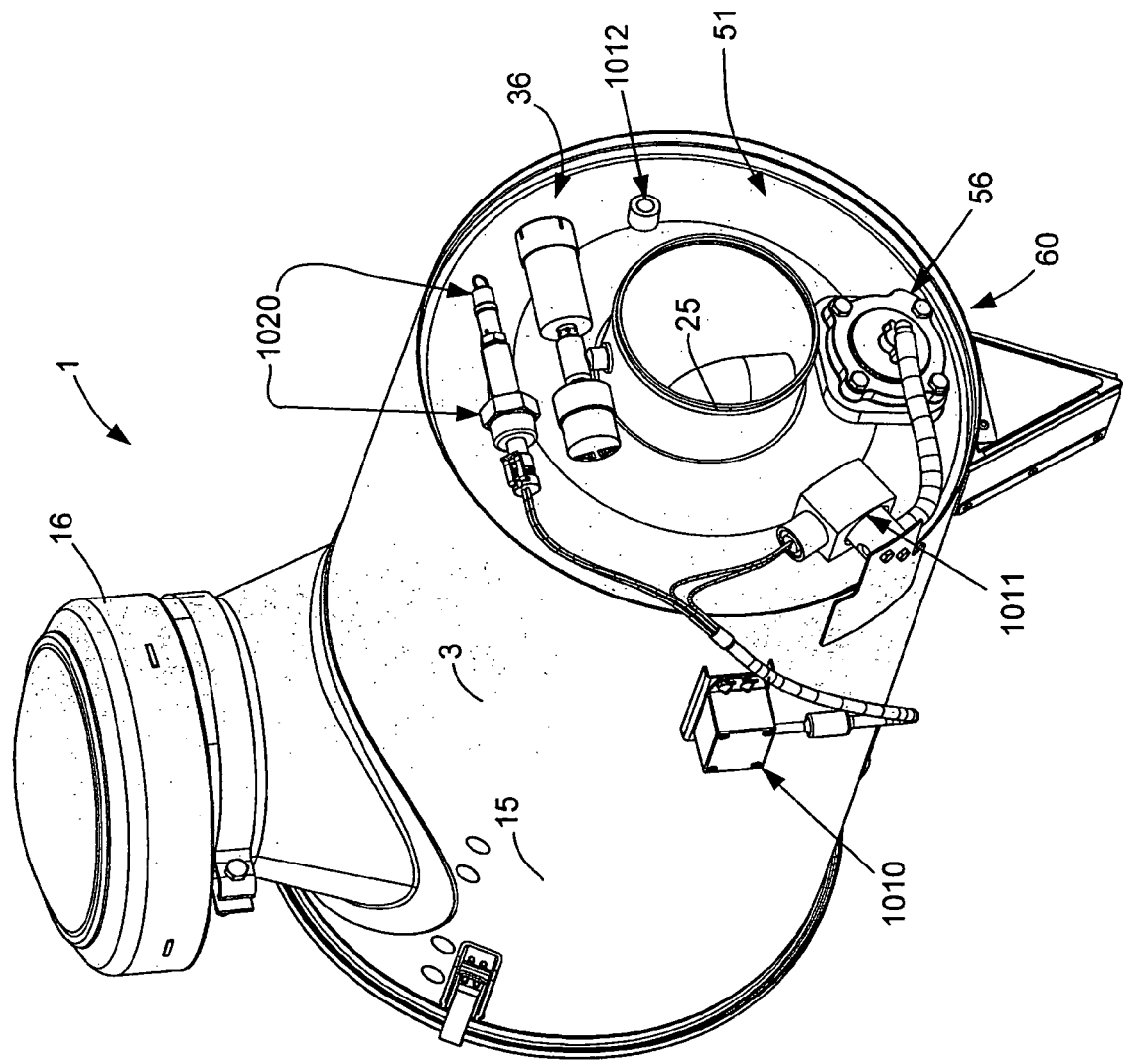
FIG. 19 is a schematic outlet end perspective view of the air cleaner depicted in FIG. 1.

In FIG. 19, air cleaner 1 is depicted in perspective view, end 36 being viewable. Various arrangements for control of pulsing are shown. For example at 1010 a control board or microprocessor arrangement is shown, for electrical control of pulsing. At 1011, solenoid switch or valve arrangement is shown, controlled by control board 1010, for operation of pulse jet control valve 56.

At 1012, the tap is provided for attachment to a compressed air line on a vehicle or other equipment, for charging the compressed gas accumulator tank 51. At 1020, an assembly for measuring pressure within tank 51 and, if necessary, bleeding pressure from tank 51, is shown.

It is noted that similar equipment can be utilized for the operation of the variations describes herein above, for example with respect to FIGS. 3 and 4.

A variety of control logic or programming approaches can be used, for a pulse jet assembly in accord with the present disclosure. An example is indicated in FIG. 20.

Figure 20:
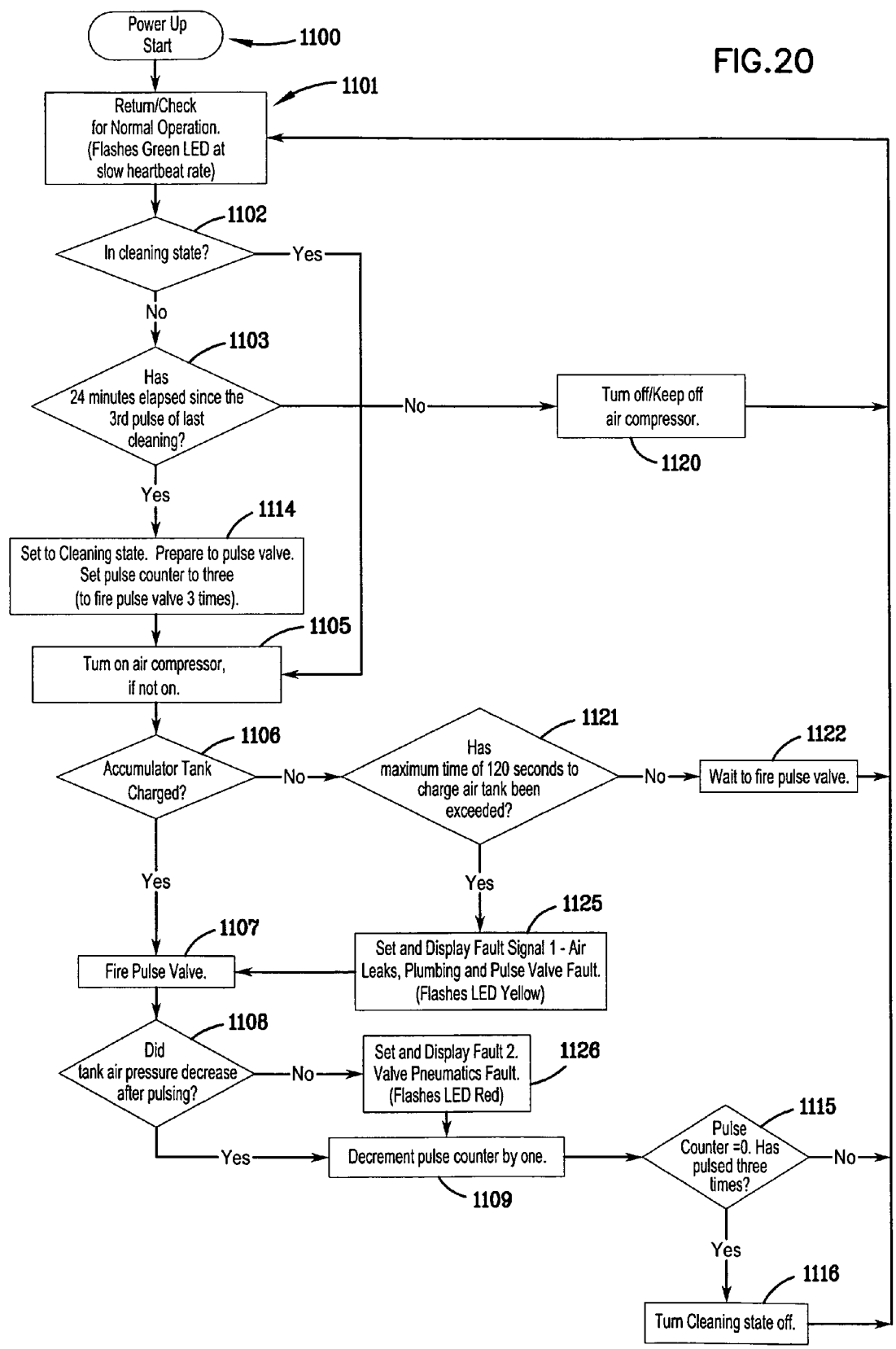
FIG. 20 is a flow chart diagram of a logic system and steps for operating air cleaners discussed with respect to the previous figures.

Referring to FIG. 20, at reference numeral 1100, an example of start up logic is shown. At 1101, a programming check to indicate proper operation is indicated. At 1102, the logic check of whether the system is in the cleaning stage is asked. For the example arrangement, the inquiry will be whether there has been an identified selected time interval since the last time the equipment was in the cleaning state. This time interval will be selected for the equipment involved, based upon the propensity of the cartridge to sufficiently load with dust, to undesirably increase the restriction of air flow to the engine of the vehicle involved. An example time period indicated at 1103 is 24 minutes. However, alternate time periods can be selected.

The basic issue assessed at step 1102, then, is whether the identified time (in the example 24 minutes) has elapsed since the final pulse of the last cleaning cycle. The particular arrangement depicted in FIG. 20, is configured for operation with three pulses during the cleaning state. Thus, the specific question indicated at 1103 is whether 24 minutes have elapsed since the final or third pulse of the last cleaning cycle.

In general terms, if at inquiry 1102, it is determined that the air cleaner is in the cleaning state, i.e., the appropriate time is passed, etc., the compressor is turned on (if not already on) as indicated at 1105. As indicated at 1106, the system will check to determine that the accumulator tank is appropriately charged. If it is, as indicated at 1107, the pulse valve will be charged, to direct the pulse into the cartridge, for cleaning. The fact that a pulse actually fired can be assessed, for example, by determining a drop in the pressure of the tank, as shown in 1108. Once an appropriate pulse has occurred, as measured by a pressure drop in the tank, the system can cycle as indicated by 1109, however many times the number of pulses is set to occur. If only a single pulse is set to occur, then the timing clock for the period since the last cleaning can be reset as indicated at 1103. On the other hand, if multiple pulses are intended, then the pulse counter can be reduced by 1, with pulse cycling until the pulse counter reduces to 0, at which point the cleaning cycle is reinitiated with a timer.

In some instances, the pressure within the tank can be monitored, to determine when follow-up pulses and a multiple pulse programming are to be undertaken. However, in an arrangement such as that suggested in FIG. 20, after an initial pulse, recharging of the accumulator tank can be set to occur, within a time period used to determine when the second pulse, etc., is undertaken. In an example system, after the first pulse, a selected interval of 1-3 minutes (for example 2 minutes) would be waited while the tank charges, with the follow-up pulse, and a further period of 1-3 minutes (for example 2 minutes) while the tank recharges, with a final pulse, and then a cycling back to the time period.

Still referring to FIG. 20, at 1114 a logic step of setting the pulse valve system to operate, and resetting the pulse counter, is indicated, after it has been determined that the time period since the last pulsing set, has occurred. At 1115, a step of assessing the pulse counter to determine whether the number of pulses set (in the example shown 3) has occurred as indicated. At 1160 is shown in logic step of turning off the cleaning state after the pulse counter has reached zero.

Still referring to FIG. 20, at 1120 is shown the logic step of turning the pulse system off, if the time period set before implementation of the pulse sequences has not passed. At 1121 is shown a logic step of checking the time period since the previous pulse, with a multi-pulse programming arrangement. In the example shown in 1121, a selected specific two minute interval (within the 1-3 minute interval discussed above) is shown. At 1122 is shown a logic step of determining not to fire the pulse valve, if the requisite time period to charge the tank after a pulse has not occurred.

At 1125 is shown a logic step relating to managing signals if the accumulator tank has not charged, but the requisite time period has passed since a previous pulse. Finally, at 1126 is shown a step of providing a fault signal, if the pressure in the tank does not appear to drop, after the electronic condition indicates that a pulse has fired.

In summary, then, the logic flow of FIG. 20 indicates, in general, a system in which a pulse sequence comprises a selected number (in the example three) pulses each separated by a selected (in the example two minute) interval, with a selected period (in the example 24 minutes) between pulse sequences. During the selected (in the example two minute) interval between the pulses of a three pulse sequence, the tank is recharged. After the selected (three) pulse sequence, the tank is also recharged.

Of course a variety of variations in the logic indicated in FIG. 20, can be made. In addition, alternate pulse jet control arrangements, utilizing different parameters than time, can be implemented.

C. Vertical Orientations, FIGS. 21-23.

Figure 22:
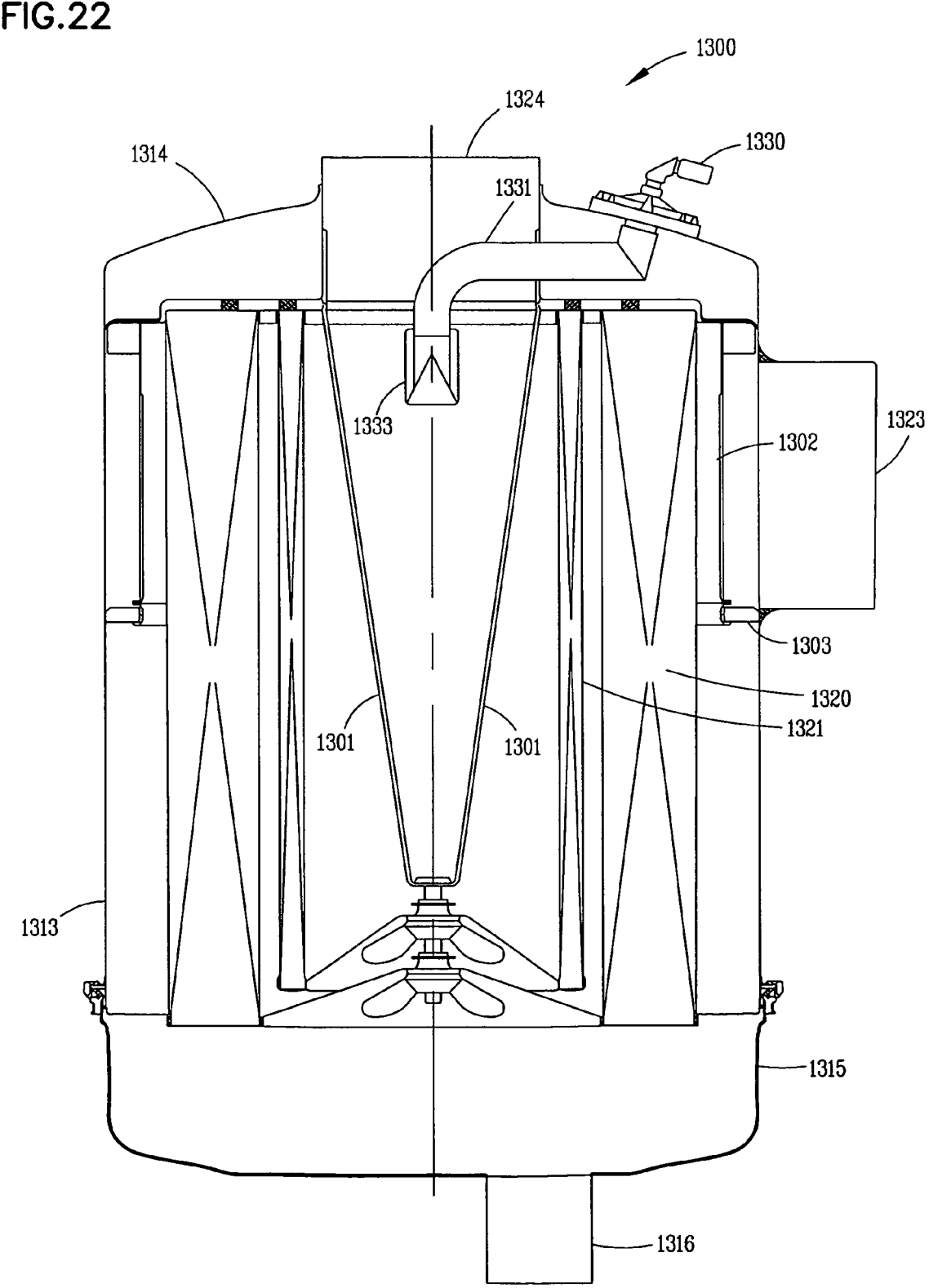
FIG. 22 is a schematic cross-sectional view of an air cleaner variation from the air cleaner of FIG. 21.
Figure 23:
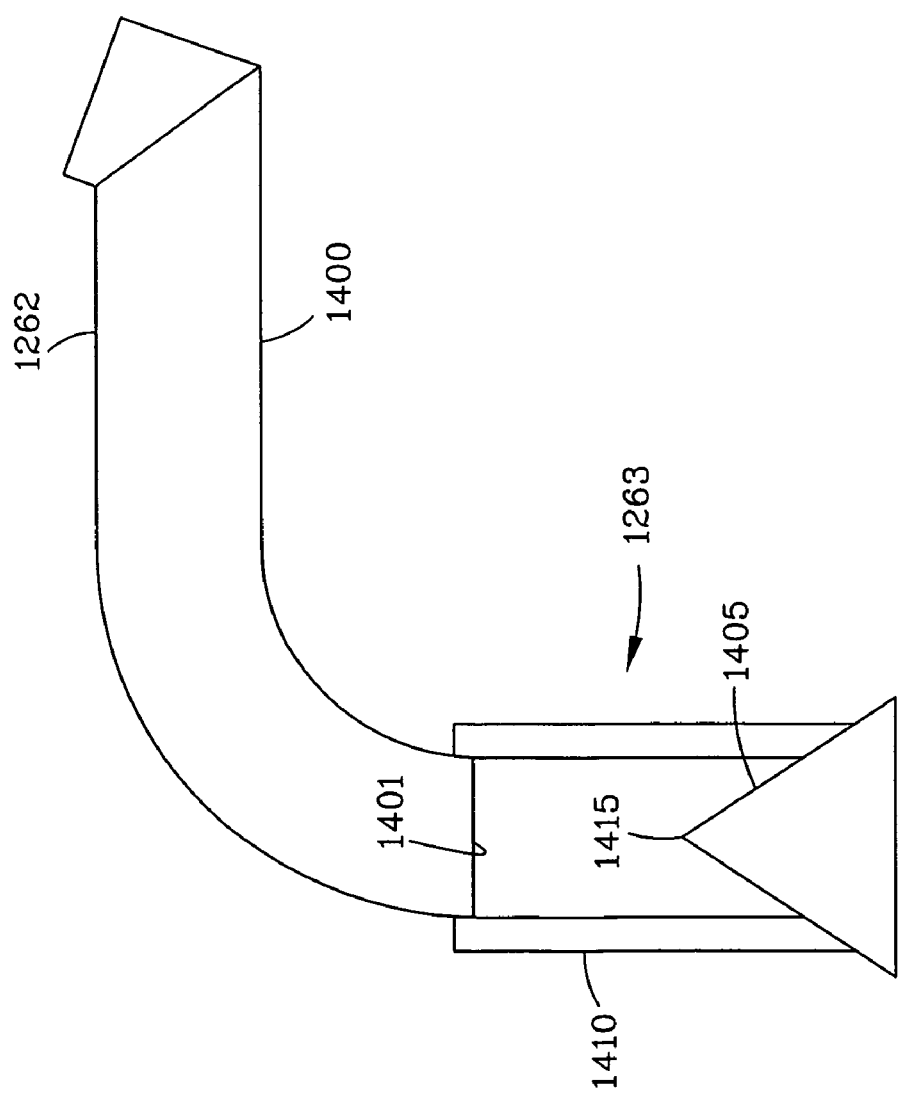
FIG. 23 is a schematic side elevational view of a component depicted in the air cleaners of FIGS. 21 and 22.

The examples of FIGS. 1-4, show an environment of an air cleaner mounted for use, with the longitudinal access of the air cleaner housing and installed cartridge extending generally horizontally. Many of the principles discussed can be applied in arrangements configured for vertical operation. Examples are shown in FIGS. 21-23.

Figure 21:
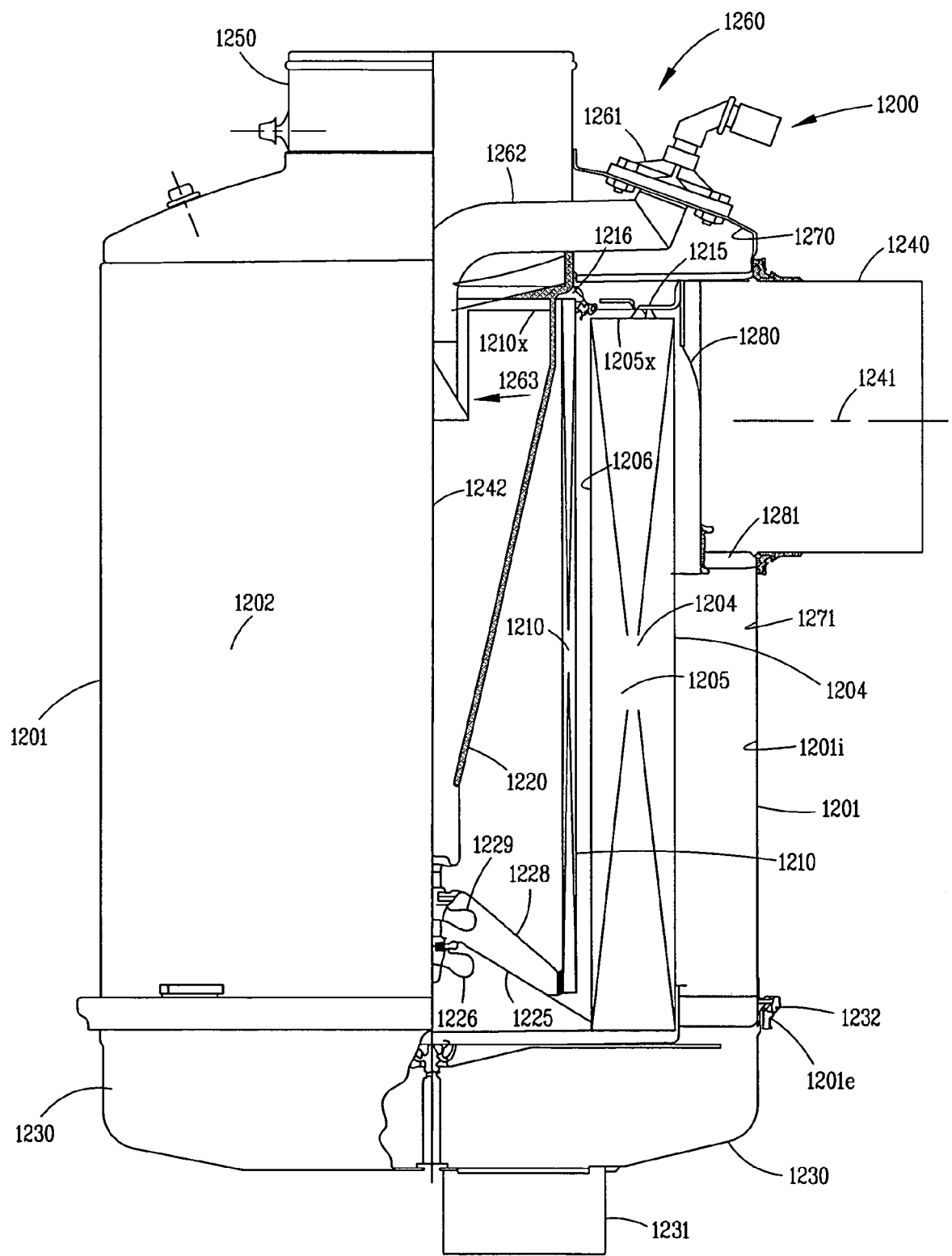
FIG. 21 is a schematic side elevational view with partial cross-sectioning, depicting an air cleaner including features according to the present disclosure, oriented in a vertical orientation.

Referring to FIG. 21, an air clearer assembly 1200 is depicted. The air cleaner assembly 1200 comprises a housing 1201 with a side wall 1202. The housing 1201 defines an interior 1201*i*, in which is received a filter cartridge 1204. Cartridge 1204 comprises filter media 1205 surrounding interior 1206. For the example shown in FIG. 21, a secondary or safety filter 1210 is shown mounted interiorly of cartridge 1205, i.e., in region 1206.

For the example shown, each of the cartridges 1204, 1210 includes an end or axial seal member, as shown at 1215, 1216 respectively, with sealing occurring under pressure applied by mounting the cartridges over central yoke 1220. In the example shown, cartridge 1204 includes end cap 1225 secured to yoke 1220 by wing nut 1226; and, cartridge 1210 includes end cap 1228 secured to yoke 1220 by wing nut 1229. Thus, as a variation from the cartridge arrangements of FIGS. 1-4, no internal radial seals are used for sealing, rather sealing occurs through axial pressure applied by wing nuts 1226, 1229 to cartridges 1204, 1210 respectively.

Still referring to FIG. 21, the vertical housing 1201 includes a bottom, removable, dust cup or dust receiver section and access cover 1230, with dust ejection outlet 1231. The cover is secured in place on end 1201*e* of housing 1201 by band 1232. The dust ejection outlet 1231 would typically be covered by an evacuation or a vac valve arrangement, not depicted in detail. A variety of arrangements can be used, including arrangements analogous to those discussed in connection with previous figures. The arrangement depicted schematically, is discussed below in connection with FIGS. 31-33.

Still referring to FIG. 21, housing 1201 includes inlet 1240, in this instance an axial inlet including a central access 1241 directed toward central access 1242 of cartridge 1204. The air cleaner 1200 further includes an outlet 1250, for flow of filtered air from interior 1206.

For the example cleaner 1200 depicted in FIG. 21, inlet 1240 is spaced from dust cover 1230 as far as reasonably possible, toward outlet 1250. Also, seal arrangements 1215, 1216 are located on end cap 1205*x*, 1210*x* respectively. End caps 1205*x*, 1210*x* would typically be open end caps, for example metal end caps potted to the media of the associated filter cartridge (1204, 1210). Also, typically end caps 1225, 1228 would comprise metal end caps, potted to the media of the associated cartridge, although alternatives are possible.

Air cleaner 1200 includes a pulse jet arrangement 1260 including a control valve 1261 and a distributor 1262 provided with nozzle 1263. These are mounted on accumulator tank section 1270 provided in air cleaner housing 1201. The accumulator tank section 1270 is separated from a cartridge receiving section 1271, by appropriate wall structures.

Referring to FIG. 21, it can be seen that general operation would involve a flow of air into inlet 1240, through cartridge 1204 and safety cartridge 1210, and then outward flow of filtered air through outlet 1250. Periodically pulse jet arrangement 1260 would be operated to direct a pulse of compressed gas (typically air) from tank section 1270 via valve arrangement 1261 into distributor 1262 and from outlet 1263 to provide a back flush to cartridge 1204. The dust from the back flush would fall into dust collector 1230 and would be removed via ejector port 123i.

Inlet 1241 is shown directing air into a cyclonic pattern by an arrangement comprising a central flange 1280 and directional vanes or louvers 1281. A variety of arrangements can be used, however, to facilitate the directional flow.

According to the arrangement of FIG. 21 can be constructed with a tangential inlet arrangement; and, various inlet valve arrangements can be utilized in association with the inlet arrangement 1240.

In FIG. 22, an analogous arrangement 1300 is shown in cross-section, with modifications being in the shape of yoke 1301 and in inlet flange 1302 and louvers 1303. Thus, cleaner 1300 includes housing 1313 defining a compressed gas accumulator tank 1314, dust cover 1315 with an evacuation port 1316; a main filter cartridge 1320, secondary safety cartridge 1321, an inlet arrangement 1323; an outlet arrangement 1324 a pulse jet control valve arrangement 1330, and a pulse jet distribution arrangement 1331 including a nozzle arrangement 1333. General construction of features would be analogous to those described for FIG. 21.

In FIG. 23, pulse direction arrangement 1262 is depicted. It can be seen to comprise a conduit 1400 having an outlet end 1401. Mounted on the outlet end 1401 is provided a nozzle or distributor arrangement 1263. For the example shown, nozzle or distributor arrangement 1263 comprises a conical splitter member 1405, spaced from outlet end 1401 by spaced struts 1410. As a pulse of compressed air exits end 1401, and is directed toward apex 1415 of conical member 1405, it will distribute in an outward pattern due to flow over conical surface 1405. The flow can extend between struts 1410, to expand the compressed air flow within region 1206, FIG. 21, for effective pulsing. Conical splitter member 1405 can be provided with a central, axial, flow conduit if desired.

Thus, the nozzle arrangement 1263, as a result of the conical member 1405, provides for a 360° expansion of gas flow, as preferred arrangements in which the cartridge includes media extending around an open interior.

An analogous nozzle arrangement to nozzle arrangement 1263 can be provided for use in a variety of alternate air cleaners arrangement, constructed in accord with the principles described herein. An example is discussed below, in connection with FIGS. 27-29.

V. Additional Variations, FIGS. 24-33

Figure 24:
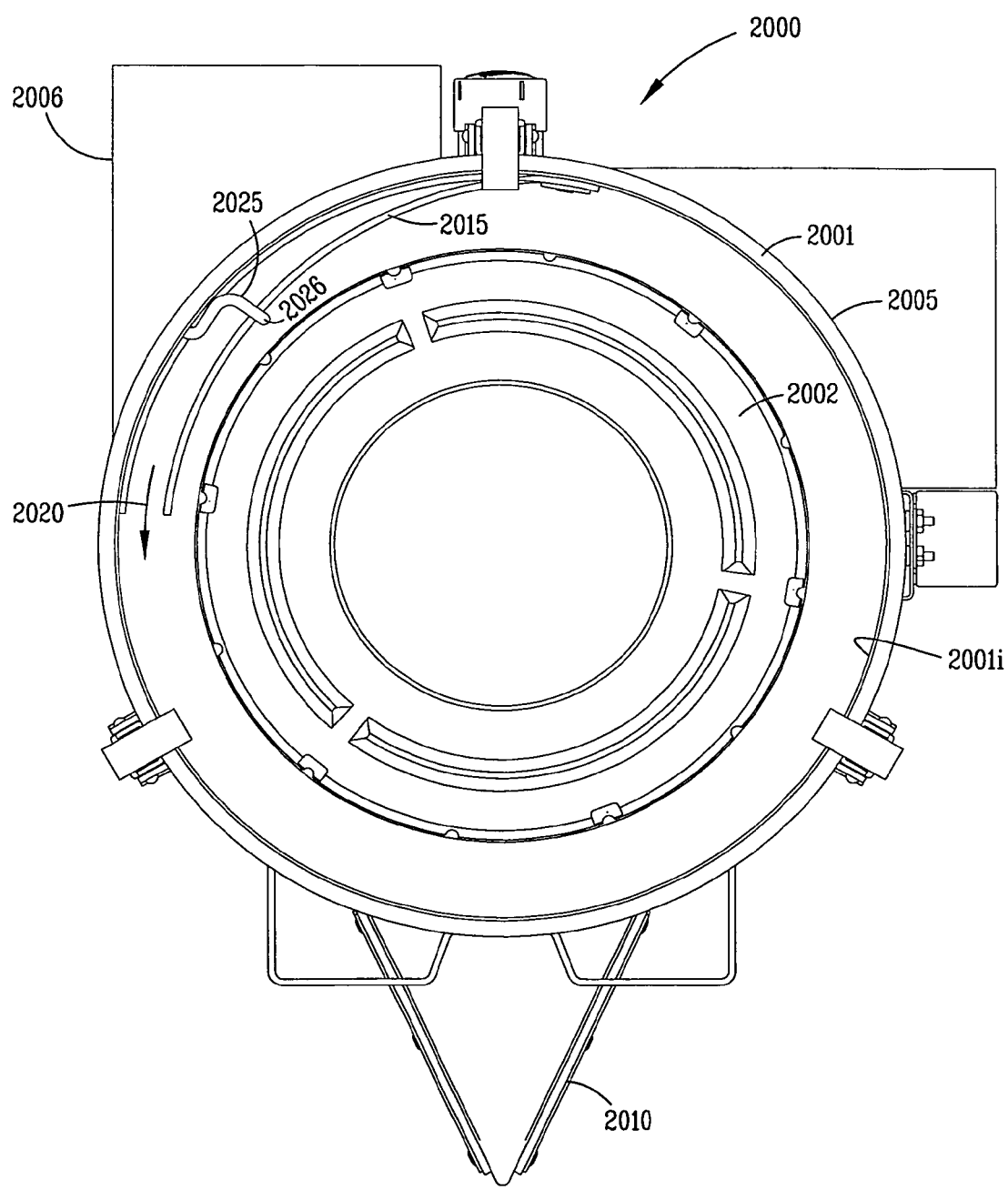
FIG. 24 is a schematic end elevational view of an air cleaner assembly generally analogous to the ones described for FIGS. 1-4, with an access cover removed.
Figure 25:
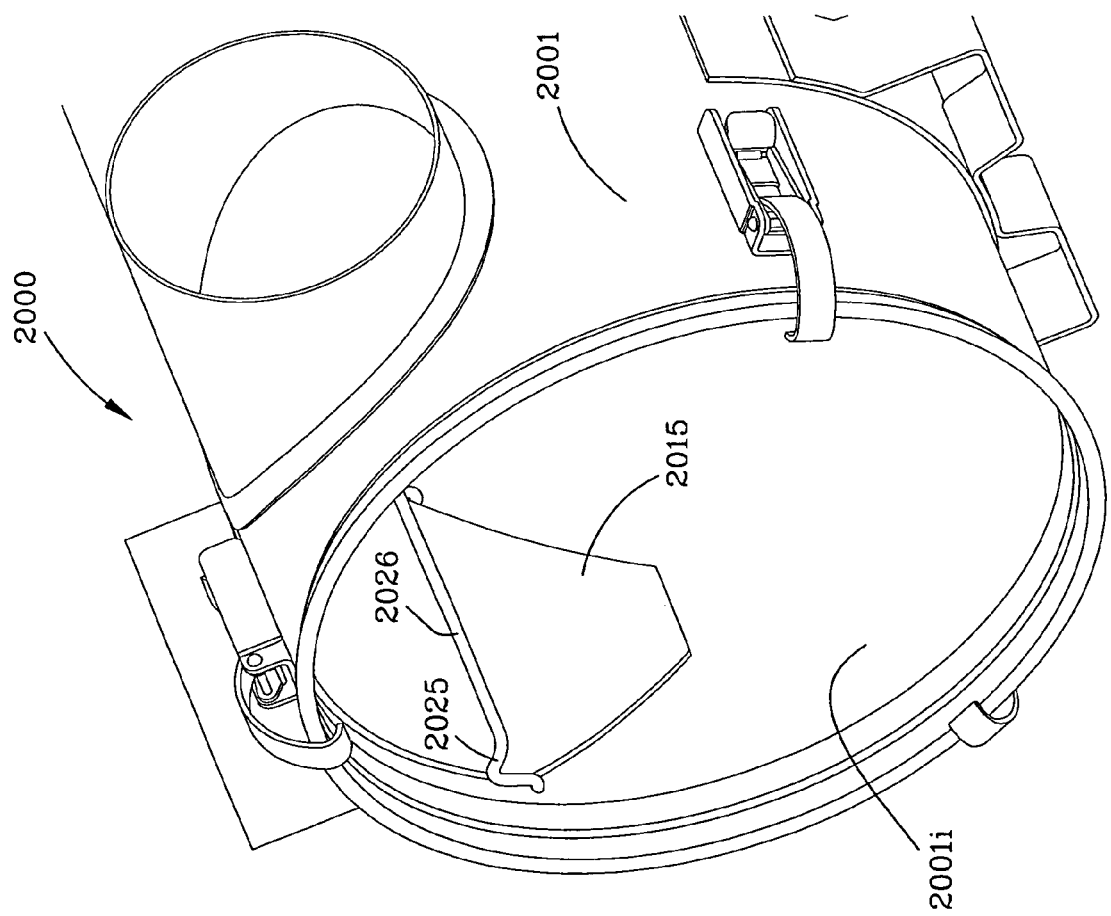
FIG. 25 is a schematic fragmentary perspective view of a portion of the assembly depicted in FIG. 24.

A. FIGS. 24 and 25; An Inlet Flap Valve Arrangement with a Support Arrangement.

For an additional variation in air cleaner arrangements according to the present disclosure, attention is directed to FIGS. 24 and 25.

In FIG. 24, air cleaner assembly 2000 is depicted comprising housing 2001 with removable and replaceable filter cartridge 2002 therein. The housing 2001 comprises a side wall 2005. A dust flow inlet arrangement 2006 is shown, as well as an ejector valve or vac valve arrangement 2010. The air cleaner assembly 2000 depicted may include features generally analogous to those in the arrangements of FIGS. 1-4. In FIG. 24, the air cleaner housing 2001 is depicted with an access cover removed, allowing a viewing of interior 2001i in cartridge 2004. Mounted in interior of housing 2001i, in overlap with inlet arrangement 2006, is flap valve or flap arrangement 2015. The flap arrangement is shown in a normal open orientation, in which air can flow into interior 2001i through inlet arrangement 2006. Thus, the flap valve arrangement 2015 is oriented in an open configuration, directing air flow in the general direction of arrow 2020, as air enters interior 2001i. To facilitate servicing, i.e., removal of cartridge 2002 during servicing, the flap valve 2015 is support by support arrangement 2025, in this instance comprising a bar 2026 supported underneath flap valve 2015. The bar 2026 prevents the flap valve 2015 from dropping against the cartridge 2002, during servicing.

In FIG. 25, a fragmentary, side, perspective view is shown, and bar 2026 can be seen extending underneath flap valve arrangement 2015. In FIG. 25, the flap valve 2015 is shown biased to a closed position.

B. FIGS. 26-30; a Further Example of Horizontal Air Cleaner.

Another variation in an air cleaner including features generally in accord with the present disclosure, is provided in FIGS. 26-30. The general operation of, and function of, parts characterized with respect to FIGS. 26-30 in analogous terms to those used for FIGS. 1 and 2, or other previously presented figures, perform analogous functions, unless otherwise stated.

Figure 26:
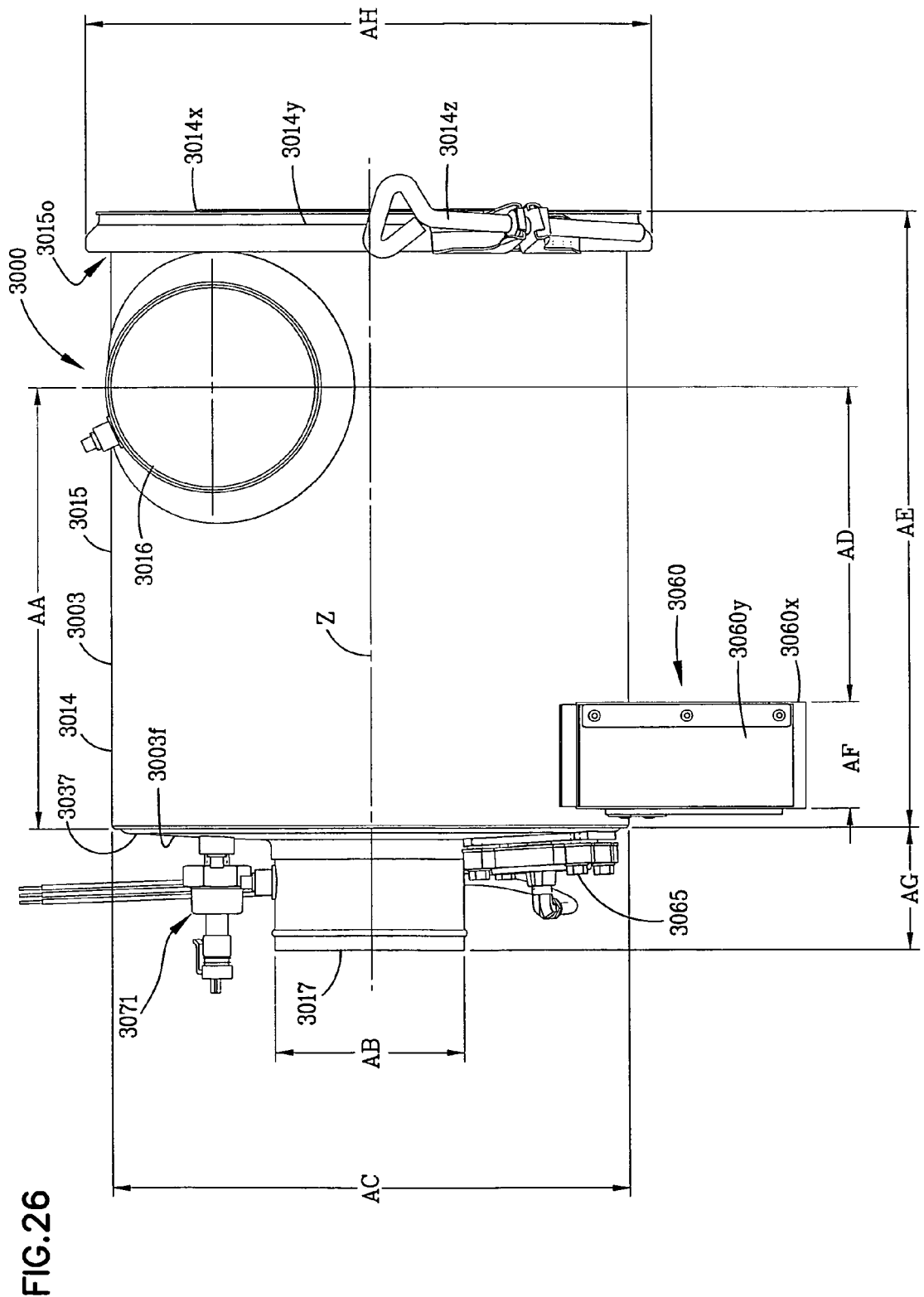
FIG. 26 is a schematic side elevational view of an alternate air cleaner assembly to the ones depicted in FIGS. 1-25.

Referring to FIG. 26, air cleaner assembly 3000 is depicted. The air cleaner assembly 3000 is mounted with a horizontal center axis Z and comprises a housing 3003 and an interiorly received, removable and replaceable (i.e., serviceable) cartridge 4, FIG. 27. Referring to FIG. 27, the cartridge 4 comprises media pack 5 surrounding axis Z and defining an open, central, interior 6. The media pack 5 extends between first and second opposite end caps 10, 11.

As with previous arrangements discussed herein, the filter cartridge 4 is a serviceable component. The particular example cartridge 4 depicted, has a generally circular cross-section, with the interior 6 being circular, and with an exterior edge 5e, of the media pack 5, defining a circular exterior. A liner arrangement (comprising one or more liners) can be provided to support the media 5, along exterior 5e, interior 6 or both. Such liners, for example, could comprise perforated or expanded metal, extending between the end caps 10, 11. Also, if pleated media is used for the media pack 5, adhesive beads can be used to facilitate pleats facing a pleat support. Further beads comprising adhesive impregnated fibrous material can be used for media support, as well as wire and/or plastic band arrangements. The media 5 can comprise pleated media.

Although a variety of alternatives are possible, for the example shown in FIG. 27, cap 10 is a molded-in-place end cap; and, end cap 11 is a molded-in-place end cap. For the example shown, end cap 10 is an open end cap with aperture 10x therethrough; and, cap 11 is a closed end cap.

Referring to FIG. 26, the housing 3003 is defined by outer wall 3014 including side wall 3015 surrounding interior 3003a, FIG. 27. The side wall 3015, for the example shown, generally has a circular, interior, cross-sectional shape.

The housing side wall 3015 generally defines an open end 3015o closed by an openable access cover 3014x; the access cover 3014x being secured in place by securing band 3014y and bolt member 3014z, FIG. 26. The band 3014y can be a metal band for strength.

When bolt member 3014z is loosened, band 3014y is loosened, and cover 3014x can be removed from end 3015o, or be pivoted away, to allow for access to interior 3003a (FIG. 27) and thus access to cartridge 4, for service.

The band 3014y and bolt member 3014z arrangement can be advantageous for strength, and robustness. The clamps, such as those depicted at 39a, FIG. 2, can, in some instances, fatigue under high internal pressures within the air cleaner, during pulse jet operation. Thus, a clamp as shown in FIG. 26 may be useful for previously described embodiments.

Figure 30:
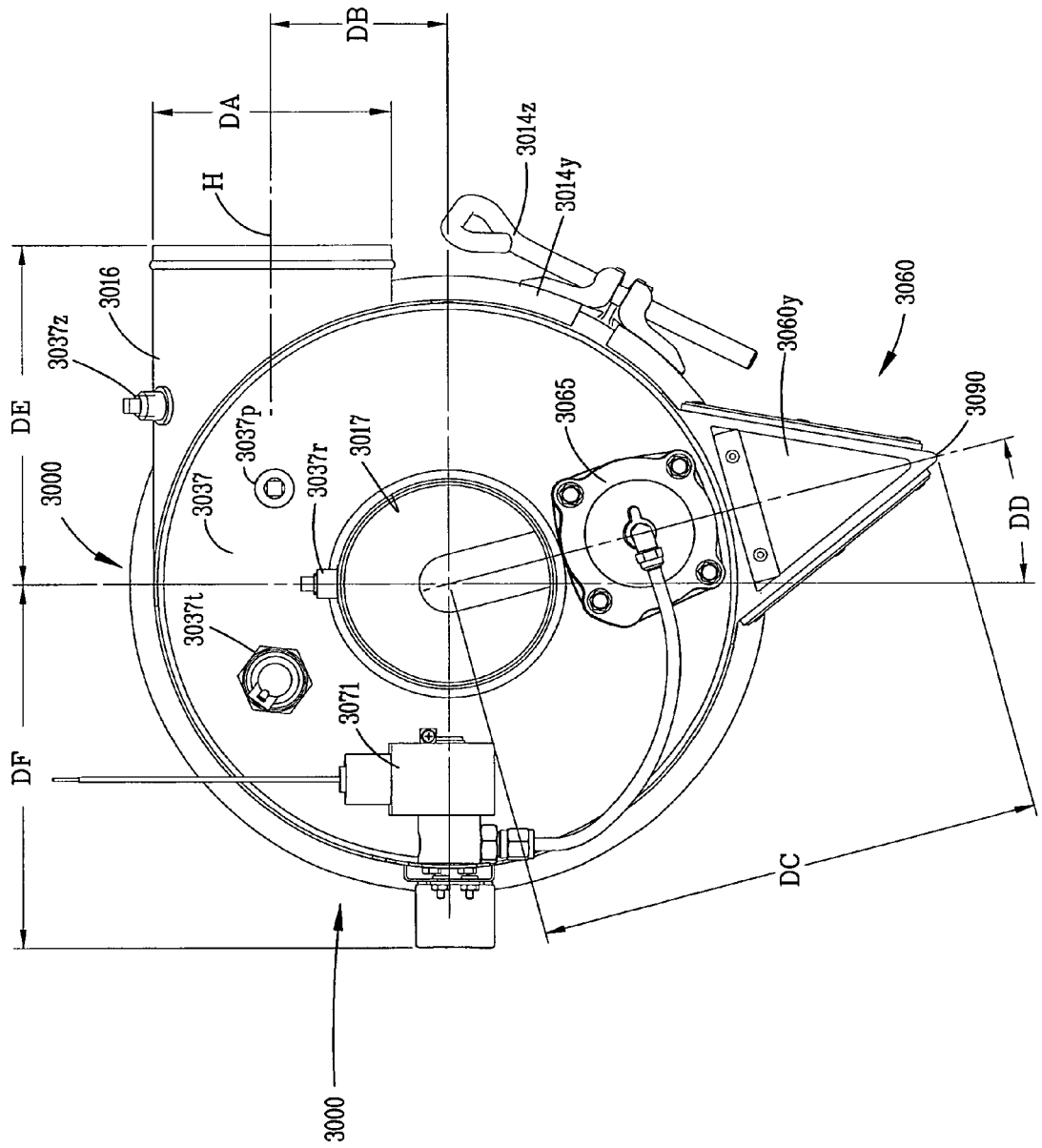
FIG. 30 is a schematic, outlet end, elevational view of the air cleaner assembly depicted in FIG. 26.

The housing 3003, FIG. 26, generally includes an air flow inlet arrangement 3016 and an air flow outlet arrangement 3017. The depicted air flow inlet arrangement 3016 is a tangential air flow inlet. Referring to FIG. 30, an end view directed to outlet 3017, tangential inlet 3016 is configured to direct air in a counter-clockwise direction, when the view is toward outlet 3017 (or a clockwise direction when the view is toward cover 3014x).

It is noted that a non-tangential inlet, for example axial inlet, can be utilized in some applications of the techniques described herein. Further, the inlet 3016 can be provided with an inlet valve arrangement, in accord with the various descriptions provided in connection with previous drawings, if desired.

It is expected the typically the inlet 3016 will be provided with an inlet flow valve arrangement generally in accord with the one depicted in FIGS. 24 and 25, i.e., a flap 2015 supported in place by a bar 2026. The inlet 3016 can also be fitted with a grid, for example cross bars therein, not shown, to inhibit the flexible flap member from being pushed outwardly through the inlet 3016, under the pressure of a jet pulse, in operation.

Referring to FIG. 27, as with other arrangements, the inlet (unfiltered) air from inlet 3016 is directed into air flow annulus 3018 around cartridge 4. A cyclonic pattern of air flow, due to the tangential inlet 3016, will help separate dust along an interior 3003a of sidewall 3003. The dust would eventually be directed toward an evacuation valve arrangement, discussed below.

During normal operation, the unfiltered air from annulus 3018 passes through the media pack 5 from outside in, with filtering occurring. The filtered air in interior 6 then passes into interior 3020 of outlet tube 3021. Eventually the air leaves the outlet tube 3021 through outlet 3017.

In general terms, the outlet tube 3021 has an outlet end portion 3017 and an inlet end portion 3021x. During normal operation, air from interior 6 passes into outlet tube 3021, to exit air cleaner 3000.

Referring to FIG. 27, it is noted that portion of the outlet tube 3021 is depicted in phantom, extending to end portion 3021x. The particular length of the outlet tube 3021 projecting into an interior 6 of cartridge 4 is a matter of choice, for various effects and advantages. Some applicable principles are previously described with respect to other embodiments, in connection with this variable. The extent to which the tube 3021 projects into the interior 6 is in part a function of the nature of the distributor arrangement used for distributing a pulse of compressed gas into interior 6.

For the example shown, the outlet tube 3021 includes an end 3021X having an outwardly directed flair or bell 3021y thereon.

The particular length of outlet tube 3021 depicted in phantom in FIG. 27, is expected to be a desirable size for the particular assembly shown schematically in FIG. 27.

The cartridge 4 is sealed within the housing 3003 by the housing seal arrangement 3030 on the cartridge 4. In the example shown, the housing seal arrangement 3030 is a radial seal engaging a seal support 3035, to form an inwardly directed radial seal 3031. Seal arrangement 3030 can comprise an integral portion of end cap 10.

In FIG. 27, the housing radial seal 3031 is depicted schematically, and is drawn with lines depicting an overlap with support 3035. In actual installation, seal region 3031 would be distorted (compressed) by support 3035. In FIG. 27, overlap depicted between the seal region 3031 and the support 3035 indicates expected compression.

Still referring to FIG. 27, the example housing 3003 depicted includes two separate compartments, cartridge receiving compartment or section 3003x and compressed gas (typically air) compartment, section or accumulator tank 3003y; the sections 3003x, 3003y being defined within housing 3000 as separate regions, both surrounded by side wall 3015.

In the example shown, the compartments 3003x, 3003y are separated by inner wall structure 3036. Compartment 3003y comprises a portion of a pulse jet air cleaner system, as characterized below.

Housing outer wall 3014 includes end 3037, FIG. 26, which closes the housing 3003a at end 3003f. End 3037 can be provided with a dome shape, and forms an end cover of the compressed air accumulator section 3003y, FIG. 27, with a portion of tube 3021 passing therethrough.

The example housing 3003 depicted, is a metal housing.

Referring to FIG. 26, the air cleaner assembly 3000 also includes evacuation or vac valve arrangement 3060. The evacuation or vac valve arrangement 3060 can be generally analogous to arrangement 60, discussed above in connection with FIGS. 13-17. Thus, the vac valve arrangement includes a rigid frame member 3060x with an aperture arrangement therethrough, and a flexible valve member arrangement 3060y. The flexible valve member arrangement can comprise one or a plurality of flap valve members, each operably positioned over a portion of the aperture arrangement in the rigid valve member. An interior of the vac valve arrangement 3060 (indicated generally at 3060i, FIG. 27), is mounted over, and is in communication with interior 3003a of housing 3003, by being positioned over aperture or dust ejector port arrangement 3061 through side wall 3014 of housing 3003.

In general, region 3003y is an accumulator tank 3051, generally analogous to tank 51, FIGS. 1 and 2. The valve arrangement is indicated at 3065, actuated by solenoid valve switch 3071. As appropriately directed by on board equipment, solenoid valve switch 3071 will control valve 3065 to selectively open, to allow pulse jet of compressed gases within accumulator tank 3051 to pass into distributor arrangement 3080 comprising pulse jet tube 3081 and diffuser nozzle 3082.

As the pulse jet of compressed gas exits diffuser 3082, it is distributed to cartridge 4 sufficiently to pulse dust off of media 5, such pulsed dust to be at least partially evacuated through dust ejector port 3061 and outwardly from vac valve arrangement 3060.

Herein, when it is said that a pulse jet of "compressed air" is directed into the cartridge 4, or similar terms are used, it is meant that a pulse of gas from a compressed source is used. Of course within the cartridge 4, i.e., within region 3003x of interior 3003, the pulse expands from a compressed state.

Attention is now directed to FIGS. 28 and 29, in which diffuser 3082 is depicted schematically, in greater detail. Diffuser 3082 comprise a conical diffusion member 3083 supported centrally over open end 3084 of tube 3081 by struts 3085. The conical diffuser 3083 is positioned with a point vertex, or apex 3086 directed toward, and centrally positioned relative to, exit end 3084. Although not shown, in some instances, a gas flow conduit can be provided through diffuser member 3083, for example by an opening at apex 3086. The conical diffusion member 3083 will typically comprise metal, for example a rolled sheet metal member, or a machined or cast metal part.

As a pulse of gas is exited at 3081 at inlet 3084, a pulse will be directed toward conical member 3083, and be diffused outwardly. This will facilitate operation of the pulse jet system.

Herein, the conical diffusion or diffuser member 3083 will sometimes be said to have an internal, vertex or apex, conical angle indicated generally at X, FIG. 28. The angle X will typically be at least 30°, usually not more than 65°, and often within the range of 30° to 65° (for example 55°-65°; i.e., 60°, for the example depicted).

It is noted that a pulse jet system with a conical diffuser is discussed in connection with a vertically oriented assembly, herein, in connection with FIGS. 21-23.

In FIG. 30, an end view of the assembly 3000 taken toward end 3037 is viewable. In FIG. 30, the following features are viewable: outlet 3017; pulse jet valve 3065, solenoid actuator valve 3071; port or tap 3037r for a restriction indicator, port 3037p for gas flow communication with interior compressed gas accumulator section 3003y (FIG. 27); and, pressure transducer 3037t. At 3037z connector on inlet 3016 is provided, for use in connection with other equipment on the vehicle.

Also referring to FIG. 30, it is noted that bottom apex 3090 and evacuation valve arrangement 3060 is not directed precisely downwardly, but rather at an angle DD from directed downwardly. This indicates that, for example, if the inlet 3016, for the vehicle involved, needs to be horizontal, i.e., have central axis H directed horizontally, the evacuator valve arrangement 3060 can be tipped from directed directly downwardly. Of course it is generally preferred, for operation of the evacuation valve assembly 3060, that it be directed downwardly when possible.

In FIGS. 26-30, example dimensions and angles are provided as follows: in FIG. 26, AA=9.7 inches (246 mm); AB=4 inches (102 mm); AC=11 inches (279 mm); AG=2.68 inches (68.1 mm); AF=2.35 inches (59.7 mm); AD=6.94 inches (176 mm); AE=13.55 inches (344.2 mm); and, AH=12.07 inches (306.6 mm). In FIG. 27, BA=5.41 inches (137.4 mm); BB=5.29 inches (134.4 mm). In FIG. 28, CA=0.97 inches (24.6 mm); CB=1.12 inches (28.4 mm); CC=1.15 inches (29.2 mm); and, angle X=60°. In FIG. 30, DA=4.5 inches (114.3 mm); DB=3.32 inches (84.3 mm); DD=15°; DC=9.61 inches (244 mm); DE=6.63 inches (168.4 mm); and, DF=7.11 inches (180.6 mm).

C. Further Regarding an Alternate Evacuation or Vac Valve Arrangement, FIGS. 31-33.

In the vertical arrangement of FIG. 21, an evacuation valve arrangement is shown schematically in outlet tube 1231, but is not depicted in detail. An example of the type of arrangement depicted in FIG. 21, is shown in enlarged, fragmentary view, in FIG. 31.

Referring to FIG. 31, evacuator tube 1231 is depicted, with evacuator valve arrangement 4000 operably mounted therein. The evacuator valve arrangement 4000 comprises flexible valve member 4001 and rigid valve frame arrangement 4002, secured together by central connector 4003.

Figure 32:
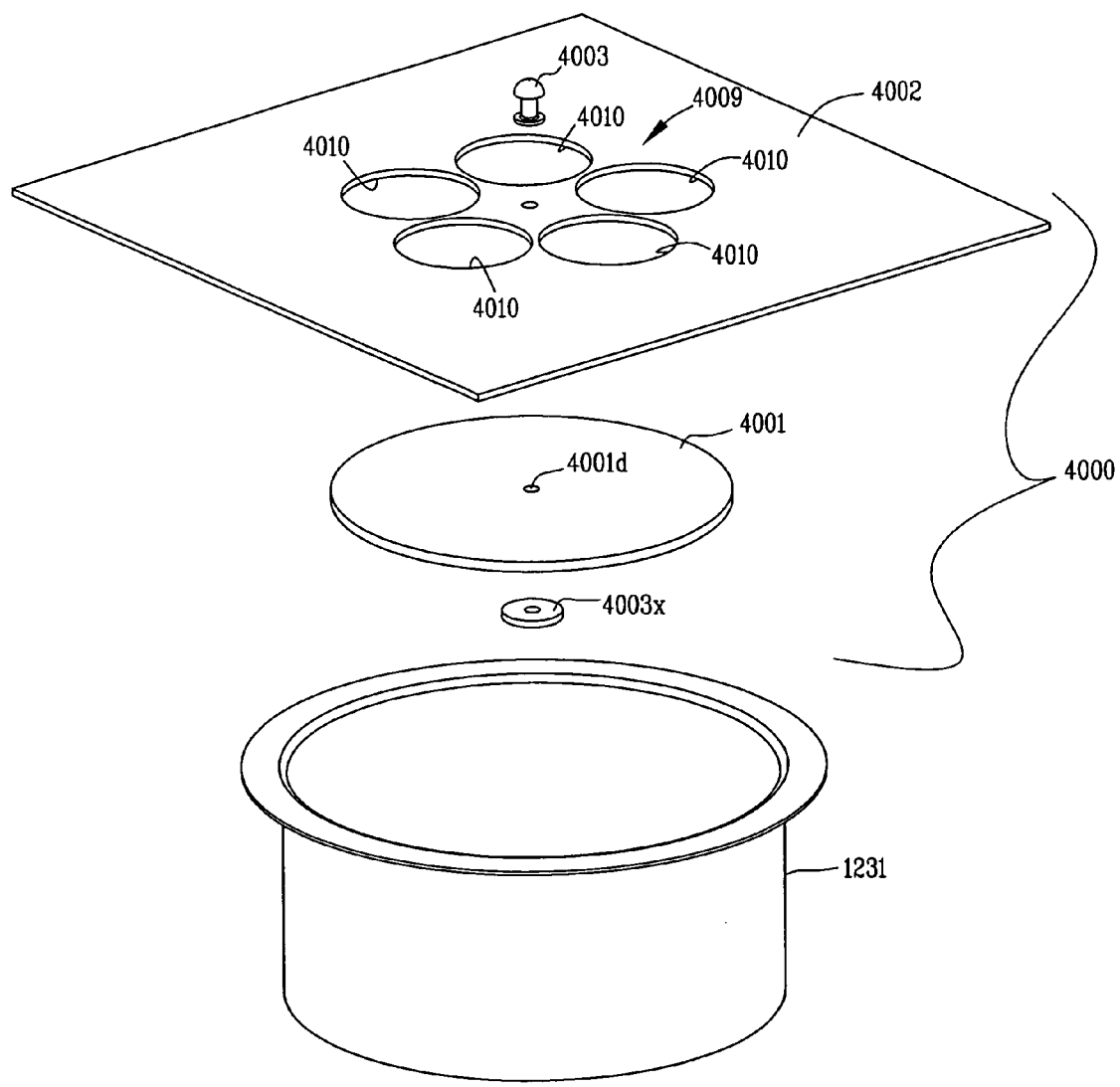
FIG. 32 is a schematic enlarged, exploded, view of the portion depicted in FIG. 31.

In FIG. 32, an enlarged, perspective, exploded view is depicted showing outlet tube 1231 and evacuation valve arrangement 4000. It can be seen that flexible valve member 4001 is secured to rigid frame arrangement 4002 at a location in covering arrangement to valve aperture arrangement 4009, in the example shown comprising apertures 4010. For the example shown, there are five (5) apertures 4010 positioned in a circular pattern, and valve member 4001 is circular. Connector 4003 is shown positionable to secure flexible valve member 4001 in place. The connector 4003 is not movable, i.e., it is a stationary connector that remains secured in place and does not move during use.

As with the flexible valve member(s) of evacuation valve arrangement 60 previously discussed, flexible valve member 4001 includes no open aperture arrangements therethrough, when in use. Central aperture 4001d through member 4001, would be closed by connector 4003 including washer 4003x, when installed. For the example shown, the connector 4003 is stationary in use, and the evacuation valve arrangement 4000 does not include a coiled spring biasing member therein.

In the example shown, apertures 4010 are each circular.

When a pulse jet of compressed gas is directed through a pulse jet arrangement for an assembly such as assembly FIG. 21, evacuation of dust is directed through evacuator valve 4000. In particular, the air pressure from the pulse goes through apertures 4010, carrying dust therewith. This will bias down a periphery of valve member 4001 away from plate 4002 allowing dust ejection through tube 1231 and from an interior of an associated air cleaner.

In FIGS. 31 and 33, example dimensions are as follows: EA=1.12 inches (28.4 mm); EB=2.0 inches (58.8 mm); FA=2.03 inches (51 6 mm); FB=3.25 inches (82.6 mm); and, FC=4.0 inches (101.6 mm).

It is again noted that as with the evacuation valve arrangement 60 previously discussed, evacuation valve arrangement 4000 does not include coiled spring biasing arrangement therein. Rather, pressure to open the valve arrangement is provided by compressed air in an interior of the associated air cleaner housing, and closing of the valve arrangement is provided by the flexible nature of the material selected for the flexible valve member(s) being such as to tend to return the valve member to the closed position, when pressure within interior of the housing is not raised over atmospheric, by a compressed pulse.

D. Further Comments Regarding Evacuator Valve Function, Operation and Features.

In order to obtain effective pulse jet cleaning of an installed cartridge, it is important to have both: an adequate pulse of air; and, an appropriate vac valve arrangement for allowing the increased pressure caused by the pulse, and movement of dust, to rapidly and effectively evacuate the interior of the housing. In general, the pulse jet air cleaning system will not perform properly, if the vac valve arrangement does not allow for a substantially high flow, in a rapid manner, of pulsed gas (air) therethrough. Further unless a rapid release of pressure within the air cleaner is accomplished, damage to the air cleaner can resolve from the resulting increased pressure in the air cleaner interior.

An example of useful arrangements for a variety of pulse jet cleaning assemblies, characteristics and principles distributable thereto, were described above in connection with FIGS. 1-25. More recently, further investigations have been made to further identify desirable principles of operation and construction for vac valve arrangements useable with pulse jet cleaning arrangements, in accord with the techniques described herein.

In general, it is desirable that the vac valve arrangement not comprise flexible, "duck bill" type member such as shown in FIG. 9 of U.S. Pat. No. 6,051,042, incorporated herein by reference. Such arrangements include a slit or similar structure in a rubber piece which deforms open, under internal pressure. An issue with such arrangements, is that the maximum possible opening diameter is often less than 1.0 inch for the valve member, which is sometimes insufficient to operate well with pulse jet systems.

Further it is desirable not to have vac valve arrangement comprise a flexible slit through a rubber or rubber-like material, that needs to open during a pulse. Thus, again, preferably the "duck bill" arrangement is not used, because the resistance of the rubber like material to opening widely, is not desirable for rapid pulse evacuation and pressure reduction, during pulsing.

Rather, the typical arrangement described herein comprises a flexible valve member positioned over an aperture arrangement and rigid frame member. Further, the flexible member preferably has no open air flow aperture(s) or slit(s) therethrough, but rather opens the aperture arrangement in the rigid frame member by flexing away from the rigid frame member in use.

Preferably the evacuation valve arrangement does not operate through use of a coiled spring biasing member.

Typically, the material of the flexible valve member, when used in arrangements generally described herein, should be selected to have appropriate characteristics over relatively wide temperature range, as the evacuator valve arrangement will need to operate under both cold and hot conditions. The material should be stiff enough to return to a relatively flat condition voluntarily. However it should deform readily under the pressure of a pulse jet, to open the aperture arrangement thereunder, to flow of gas pressure and dust therethrough. A typical material will be easily to form under hand pressure, and will not be subject to undesirable fatigue during operation of life. Typically the material have sufficient memory to return to a flat state or nearly flat state close to the surface of the apertures. When this is the case, internal pressure within the assembly will pull vac valve member in place over the apertures, closing the apertures.

An example useable material is a hypolon, useable for example up to temperatures of about 250° F. (121° C.) with air/oil resistance, good abrasion resistance, fair tear resistance, fair impact resistance, excellent weather resistance, good chemical resistance, good electrical resistance and fair flame resistance. An ozone resistance hypolon rubber is useable, with the durameter hardness of about 65 +/−5, Shore A; a utensil strength of about 1500 psi; a stretch limit percent 250, and density of 84 lbs/cu. ft. Such a material in 0.125 inch (3.2 mm) thickness is useable.

Advantageous arrangements, as for example depicted in connection with FIGS. 1-4, 7 and FIGS. 13-17 above, comprise: a rigid frame member (such as 219, FIG. 17; 3060x, FIG. 27, or 4002, FIG. 31) having an aperture arrangement therethrough, which is fixed in size and does not change during operation. Typically a total open aperture area for the rigid frame member of such arrangements is at least 1 sq. inch (6.5 sq. cm), typically at least 2 sq. inch (12.9 sq. cm), more preferably at least 4 sq. inches (25.8 sq. cm). In some instances it is at least 5 sq. inches (32.3 sq. cm). More often at least 8 sq. inches (51.6 sq. cm), and in some instances 9 sq. inches (58 sq. cm) or greater.

A variety of flexible valve flaps or arrangements are described, for example a rectangular valve flap secured along one perimeter edge, a triangular valve flap secured along one edge and a circular valve flap secured in the center. A characteristic of each is that flexible valve member is positioned over a portion of an aperture arrangement in a rigid valve member, for rapid flexing under gas flow, to allow for rapid release internal pressure and escape of dust through an aperture arrangement.

Also it is important to have a sufficiently large aperture on the side wall, in communication with vac valve arrangement, so as not to undesirably restrict rapid air flow to the vac valve arrangement. Typically the aperture underneath the vac valve arrangement, i.e., on the side wall, as indicated in FIG. 27 at 3061 and in FIG. 1 at 60x, will be at least 2 sq. inches (12.9 sq. cm), typically at least 4 sq. inches (25.8 sq. cm), often at least 8 sq. inches (51.6 sq. cm) and in many instances larger, for example 9 sq. inches (58 sq. cm) or more; i.e., as large as reasonably accommodatable by the vac valve arrangement applied.

VI. Some General Characterizations and Observations

From the above it will be understood that, in general, what is disclosed are example air cleaner assemblies comprising a housing including an outer wall defining: an air flow inlet; an air flow outlet; and, a filter cartridge receiving section. In examples shown, the housing also defines a compressed gas accumulator tank section, which is separate from the filter cartridge receiving section.

An access arrangement is provided for installation and receipt of a removable or serviceable filter cartridge, from an interior of the housing. In examples shown, the housing outer wall includes a side wall defining first and second ends, the second end being closed by an openable access cover. In an example depicted, a compressed gas accumulator tank section is provided positioned adjacent the first end of the housing.

The serviceable filter cartridge typically comprises filter media surrounding an open central interior and extending between first and second end caps. The filter cartridge would typically includes a housing seal arrangement thereon, for sealing the cartridge to a portion of the housing, once installed. In some examples, an inside radial seal is provided, as a portion of the first end cap, which is typically an open end cap. In other examples, an axial seal is provided, positioned on an outer end surface of the first end cap, which is an open end cap.

In the examples shown, the second end cap, opposite the first end cap, is typically a closed end cap. Example arrangements described for the second end cap include: one in which a unitary, molded-in-place, end cap is provided; and, a second in which a composite end cap includes a preformed central piece secured-in-place by a molded-in-place outer ring; and a third, in which a metal end cap is used.

In selected examples, the first end cap is a molded-in-place end cap. In others, the first end cap is a preformed (metal or plastic) end cap, with a seal gasket applied thereto.

In general terms, the air cleaner is configured to provide a first stage of dust separation, typically by directing the inlet air into a cyclonic pattern in an annulus around the filter cartridge, to provide cyclonic separation, with dust migration to a dust ejector port and eventually outwardly through an evacuator (evacuation) or vac valve arrangement.

The air cleaner assembly includes a pulse jet arrangement including a pulse distribution arrangement. In examples depicted, the air cleaner assembly further includes a pulse jet control valve arrangement. The pulse jet control valve arrangement is configured to selectively direct a pulse of compressed gas into the pulse distribution arrangement, for example from a compressed gas accumulator section. In example described variations, the pulse jet control valve arrangement can be mounted on an exterior of the compressed gas accumulator tank; or, the pulse jet control valve arrangement can be positioned in the inside of the compressed gas accumulator tank section.

The pulse distribution arrangement is configured to direct a pulse of compressed gas from a pulse jet control valve arrangement into an open central interior of the filter cartridge.

Variations are described, in which the assembly includes a single primary filter cartridge, or in which the assembly includes a primary filter cartridge surrounding a secondary safety filter cartridge.

In several examples shown, an air flow outlet tube arrangement is depicted which includes a first section directed into the open interior of the filter cartridge to a location surrounded by the media and a second section projecting outwardly from the outer wall through the first end of the housing. In some example assemblies, the compressed gas accumulator tank section is positioned surrounding the air flow outlet tube.

In certain of the examples depicted, the outlet tube has a first region which is generally cylindrical, with a tip interior of the filter cartridge that has an outwardly directed bell or flared end, to facilitate air flow.

Certain examples are shown in which the housing is configured for operation with a center line of the installed cartridge directed generally horizontally. However, other examples are shown in which the filter cartridge is oriented with a center line thereof directed generally vertically.

Access to an interior of the air cleaner, for servicing a filter cartridge, can be provided in a variety of ways. In selected examples shown, access covers are shown latched or otherwise secured in place, to be selectively moved from a closed orientation, to allow access to an interior of the air cleaner. The access cover can be mounted in a manner allowing for a complete removal during servicing, or merely pivoting out of the way.

A variety of air flow inlet arrangements are described. Certain ones include louver or vane arrangements, to facilitate distribution of air into the housing interior in a circular cyclonic or helical pattern, from an axial inlet. In others, tangential flow inlet arrangements are shown, providing for such a flow upon entry into the air cleaner.

Various inlet valve arrangements are described, to operate in a manner inhibiting ejection of dust through the inlet, during pulse jet operation. Flexible flap valve arrangements, using either single or multiple flaps, are shown and described. In addition a spring loaded valve arrangement is shown.

For use with flap valve arrangements, a flap support arrangement is shown.

A variety of nozzle arrangements for introduction of a pulse jet of compressed gas (air) into the cartridge are described. An example involving a cylindrical tube having a plurality of side outlet arrangements wherein each outlet arrangement includes an inwardly directed projection, to provide an air scoop for directing a portion of a jet extending down the nozzle outwardly to the side, is shown. In this example shown, each inner projection is associated with an adjacent upstream outer projection, to further facilitate the distribution flow of a pulse.

In another example nozzle arrangement, a conical flow distributor is positioned spaced from an outlet end of a distributor conduit, to cause an outward 360° expansion of the pulse, as it exits the pulse jet arrangement. In an example depicted, an internal vertex or conical angle of the conical flow distributor is within the range of 30°-65°, inclusive.

In described arrangements, selected features of the air cleaner are implemented in advantageous ways and combinations. For example, positioning of pulse jet valve arrangement inside of the air tank relates to a more compact air cleaner, and can be a lower cost arrangement. Air cleaner features described can be implemented in relatively simple manners, without the need for a scavenge air flow system. The air cleaner would still have a reasonable life, even if for some reason in the field, the pulse or cleaning mechanism were to become inoperable.

Also described herein is a method of operating the air cleaner assembly generally in accord with the descriptions. The described method (although alternatives are possible) comprises steps of: (a) charging the compressed gas accumulator tank section with compressed gas; (b) actuating the pulse jet control valve arrangement to direct a pulse of compressed gas from a gas accumulator tank section through the pulse distribution arrangement and into the central interior of the serviceable filter cartridge; (c) waiting a selected period of time; and, (d) after the selected period of time again actuating the pulse jet control valve arrangement to direct a pulse of compressed gas from the gas accumulator tank section through the pulse distribution arrangement and into the central interior of the serviceable filter cartridge.

It is noted that not all of the specific features and techniques characterized herein, need to be implemented against this application, for some advantage to be obtained.

In an alternate characterization of the techniques described herein, an air cleaner assembly is provided to comprise a housing including an outer wall defining an air flow inlet, an air flow outlet and an interior including a cartridge receiving section. The housing outer wall includes a side wall and the housing is openable for service access to an internally received serviceable filter cartridge. It is noted that in some examples, the housing further includes compressed gas accumulator section.

A serviceable filter cartridge is positioned in the filter cartridge receiving section of the housing. The filter cartridge is removable from the air cleaner housing and comprises a filter media surrounding an open, central, interior. The media can comprise pleated media, and in some instances can form part of a media pack that includes inner and outer liners.

Pulse jet distribution arrangements configured to direct a pulse of compressed gas into the open central interior of the filter cartridge. Also an evacuation valve arrangement is mounted to receive ejected dust from the filter cartridge. The evacuation valve arrangement includes a rigid frame arrangement and a flexible valve member arrangement. The rigid frame arrangement defines a dust exit aperture arrangement therethrough. In some examples a dust exit aperture arrangement can comprise an exit port of dust from the housing. In other instances, the dust exit aperture would be formed on a rigid frame arrangement that projects from the housing, the rigid frame arrangement being mounted over a dust exit port from the housing.

The flexible valve member arrangement comprises a (at least one) flexible valve member positioned over an associate portion of the dust exit aperture arrangement such that when a pulse of compressed gas is directed into the cartridge, the flexible valve member flexes to an open position allowing dust ejection through the associated portion of the dust exit aperture arrangement. Further, when the air cleaner assembly is operated without pulse jet distribution, the flexible member biases to a closed position over the dust exit aperture arrangement.

The arrangement may include more than one flexible valve member. The dust exit aperture arrangement may include more than one aperture.

In an example shown, the flexible valve member arrangement includes a single, circular, flexible valve member operably secured by a (stationary) connector arrangement (that does not move in use) extending through a center region of the circular flexible valve member. In an example shown with the circular flexible valve member, the dust exit aperture comprises a plurality of apertures, for the example shown each aperture being circular and the apertures being positioned in a circular pattern around a center. For an example of this depicted, the circular flexible valve member comprises a circular piece of material having a diameter of at least 2.5 inches (63. 5 mm), typically at least 3 inches (76.2 mm) and, for a specific example shown, within the range of 3-5 inches (76.2-127 mm).

In an alternate application of the principles, a first stage separator arrangement includes a dust ejection port in the housing and the evacuation valve arrangement is mounted to receive dust passed through the dust ejection port. In this example, a rigid frame defines first and second wall sections each having a dust exit aperture arrangement therethrough, and the flexible valve member arrangement typically comprises a plurality of flexible valve flaps. In an example shown, the valve flaps are either rectangular or triangular, depending on which side of the frame arrangement they are positioned on. The flexible valve flaps depicted, each have a perimeter edge, with a section along which that valve flap is secured to the frame arrangement.

The dust exit aperture arrangement in the rigid frame arrangement typically has a total opening of at least 1 sq. inch (6.5 sq. cm), usually at least 2 sq. inches (12.9 sq. cm), and often at least 4 sq. inches (25.8 sq. cm). In certain examples of the described techniques it is at least 5 sq. inches (32.3 sq. cm), typically at least 8 sq. inches (51.6 sq. cm) and sometimes 9 sq. inches (58 sq. cm) or larger.

Typically the evacuation valve arrangement includes no coiled spring biasing member therein. Rather flexing open and biasing closed relies upon the nature of the material from which the valve member is selected.

In yet another characterization of the techniques disclosed herein, an air cleaner assembly is provided that comprises a housing including an outer wall defining an air flow inlet, an air flow outlet, and an interior including a filter cartridge receiving section. The housing outer wall includes a side wall and a housing as an openable or service access to an internally received serviceable filter cartridge. The serviceable filter cartridge is positioned in the filter cartridge receiving section of the housing and is removable therefrom. The cartridge includes filter media surrounding an open central interior. A pulse jet distribution arrangement is configured to direct a pulse compressed gas into the open central interior of the filter cartridge. An evacuation valve arrangement is mounted to receive ejected dust from the filter cartridge. The evacuation valve arrangement includes a rigid frame arrangement and a valve member arrangement. The rigid frame arrangement finds a dust exit aperture arrangement therethrough. The dust exit aperture arrangement preferably has a total dust exit aperture open area of at least 4 sq. inches (25.8 sq. cm). In one example the dust exit aperture arrangement can be a dust exit port between an interior of the housing and the valve member arrangement. In another example, both the rigid frame arrangement and the valve member arrangement are in an evacuation valve arrangement that is mounted over a dust exit port in the housing.

The valve member arrangement comprises a (at least one) flat valve member with no openable dust exit aperture therethrough positioned over an associated portion of the dust exit aperture arrangement to operate as a flap valve. In certain applications, the total dust exit aperture open area is at least 4 sq. inches (25. 8 sq. cm), typically at least 5 sq. inch (32.3 sq. cm), and in some instances at least 8 sq. inches (51.6 sq. cm). Again, preferably the evacuation valve arrangement includes no coiled spring biasing member therein. The housing can be positioned with the center line of the filter cartridge directed vertically or horizontally. The housing can optionally include a compressed gas accumulator tank section therein. The air flow outlet tube can be provided with first end section directed to the open interior of the filter cartridge to a location surrounded by the filter media and a second end section thereof projecting outwardly from the housing. In an example filter cartridge has an axial length X and a first section of the outlet tube projections to the open central interior of the filter cartridge is corresponding to at least 35% of X. The pulse jet distribution arrangement can comprise a conical distribution member, in an example shown having a conical vertex angle within the range of 30°-65°. The conical distribution member can include an air conduit an aperture therethrough, or can be devoid when an air conduit aperture extending therethrough.

Another characterization of the principles described, an air cleaner assembly is provided which includes a housing a serviceable filter cartridge and a pulse jet distribution arrangement with a conical distributor member, and an evacuation valve arrangement oriented to receive ejected dust from the filter cartridge and to direct received ejected dust out of the air cleaner housing.

The air cleaner assembly, including the cartridge, is generally constructed to be able to withstand substantial pulses of a pulse jet cleaning operation. Often the air cleaner housing is assembled from metal, with welds to provide secure joints. An example preferred clamp arrangement is a metal band with a bolt, to secure an access cover onto the housing, again to withstand pressures of pulse jet operation. Other advantageous features, for pulse jet operation, are understandable from the description and a review of the figures.

What is claimed is:

1. An air cleaner assembly comprising:
(a) a housing including an outer wall defining an air flow inlet, an air flow outlet and an interior defining: a compressed gas accumulator tank section; and, a filter cartridge receiving section;
 (i) the housing outer wall including a side wall with first and second ends;
  (A) the compressed gas accumulator tank section configured for storage therein of compressed gas and being positioned adjacent the first end of the housing; and,
  (B) the housing being openable for service access to an internally received serviceable filter cartridge;
(b) a serviceable filter cartridge positioned in the filter cartridge receiving section of the housing;
 (i) the filter cartridge being removable from the air cleaner housing; and,
 (ii) the filter cartridge comprising filter media surrounding an open central interior and extending between first and second end caps;
(c) a first stage separator arrangement including a dust ejection port in the housing; and,
(d) a pulse jet arrangement including a pulse jet control valve arrangement and a pulse distribution arrangement;
 (i) the pulse jet control valve arrangement being configured to selectively direct a pulse of compressed gas from the compressed gas accumulator tank section into the pulse distribution arrangement; and,
 (ii) the pulse distribution arrangement being configured to direct the pulse of compressed gas from the pulse jet control valve arrangement into the open central interior of the filter cartridge.

2. An air cleaner assembly according to claim 1 including:
(a) an air flow outlet tube arrangement provided with:
 (i) a first end section thereof directed into the open central interior of the filter cartridge to a location surrounded by the filter media; and,
 (ii) a second end section thereof projecting outwardly from the housing;
  (A) the compressed gas accumulator tank section surrounding the air flow outlet tube.

3. An air cleaner assembly according to claim 2 wherein:
(a) the first section of the outlet tube arrangement includes a first region with an inner tip remote from the pulse jet control valve arrangement; and
(b) the pulse distribution arrangement includes a nozzle with a pulse exit end;
   (i) the pulse exit end being positioned inside the outlet tube arrangement.

4. An air cleaner assembly according to claim 1 wherein:
(a) the pulse jet control valve arrangement includes a valve assembly positioned inside of the compressed air accumulator tank section of the housing.

5. An air cleaner assembly according to claim 3 wherein:
(a) the pulse exit end of the nozzle is positioned axially outside of the filter cartridge.

6. An air cleaner assembly according to claim 1 including:
(a) an inlet valve arrangement positioned to bias between a first open inflow position; and, a second closed position;
   (i) when in the first open inflow position, the inlet valve arrangement allowing inlet flow through the air flow inlet into the housing; and,
   (ii) when in the second closed position, the inlet valve arrangement being positioned to inhibit pulse flow out the air flow inlet.

7. An air cleaner assembly according to claim 6 wherein:
(a) the inlet valve arrangement comprises a single flexible valve member mounted inside the housing in a position permitting flex of the single flexible valve member between a second position over the air flow aperture arrangement; and, a first position away from the air flow aperture arrangement.

8. An air cleaner assembly according to claim 1 including:
(a) an evacuation valve arrangement mounted to receive dust passed through the dust ejector port;
   (i) the evacuation valve arrangement including a frame arrangement and a flexible valve member arrangement;
      (A) the frame arrangement defining at least first and second wall sections with dust exit aperture arrangements therein; and,
      (B) the flexible valve member arrangement comprising at least one flexible valve member positioned on each of the first and second wall sections of the frame arrangement; each flexible valve member being positioned over an associated dust exit aperture arrangement such that:
         (1) when a pulse of compressed air is directed from the compressed air accumulator tank into the pulse distribution arrangement and then into the cartridge, each flexible valve member in the evacuation valve arrangement flexes to an open position, allowing dust ejection from the evacuation valve arrangement; and
         (2) when the air cleaner assembly is operated without pulse jet distribution, the flexible valve members can bias to closed positions.

9. An air cleaner assembly according to claim 1 wherein:
(a) the pulse distribution arrangement includes a nozzle having a circular outer side wall with an open end and at least one side distribution member;
   (i) the side distribution member includes a downstream projection extending into the nozzle to form an air scoop.

10. An air cleaner assembly according to claim 1 wherein:
(a) the pulse distribution arrangement includes a conical splitter member.

11. An air cleaner assembly according to claim 1 including:
(a) an evacuation valve arrangement mounted to receive dust passed through the dust ejector port.

12. An air cleaner assembly according to claim 11 wherein:
(a) the dust exit aperture arrangements in the frame arrangement of the evacuation valve arrangement provides a total open area of at least 1 sq. in.

13. An air cleaner assembly according to claim 12 wherein:
(a) the dust exit aperture arrangements in the evacuation valve arrangement provides a total open area of at least 4 sq. in.

14. An air cleaner assembly according to claim 11 wherein:
(a) the dust ejector port in the housing has a total open area of at least 2 sq. in.

15. An air cleaner assembly according to claim 11 wherein:
(a) the evacuation valve arrangement includes a frame arrangement and a flexible valve member arrangement;
   (i) the frame arrangement defining at least a first wall section with a dust exit aperture arrangement therein; and,
   (ii) the flexible valve member arrangement comprises at least one flexible member positioned on the first wall section of the frame arrangement positioned over an associated dust exit aperture arrangement such that:
      (A) when a pulse of compressed air is directed from the compressed air accumulator tank into the pulse distribution arrangement and then into the cartridge, the flexible valve member arrangement of the evacuation valve arrangement flexes to an open position, allowing dust ejection from the evacuation valve; and,
      (B) when the air cleaner assembly is operated without pulse jet distribution, the flexible valve member arrangement can bias to a closed position.

16. An air cleaner assembly according to claim 11 wherein:
(a) the frame arrangement of the evacuation valve arrangement includes an end wall closed to the passage of ejected dust therethrough; and,
(b) the end wall closed to the passage of ejected dust therethrough is directed toward the airflow inlet.

17. An air cleaner assembly according to any one of claim 11 wherein:
(a) the pulse distribution arrangement includes a nozzle having a circular outer side wall with an open end and at least one side distribution member;
   (i) the side distribution member includes a downstream projection extending into the nozzle to form an air scoop.

18. An air cleaner assembly comprising:
(a) a housing including an outer wall defining an air flow inlet, an air flow outlet and an interior defining a filter cartridge receiving section;
   (i) the housing outer wall including a side wall; and,
   (ii) the housing being openable for service access to an internally received serviceable filter cartridge;
(b) a serviceable filter cartridge positioned in the filter cartridge receiving section of the housing;
   (i) the filter cartridge being removable from the air cleaner housing; and,
   (ii) the filter cartridge comprising filter media surrounding an open, central, interior;
(c) a pulse jet distribution arrangement, including a conical distributor member, configured to direct a pulse of compressed gas into the open, central, interior of the filter cartridge; and, (d) an evacuation valve arrangement mounted to receive ejected dust from the filter cartridge and to direct received ejected dust out of the air cleaner housing.

19. A method of operating an air cleaner assembly; the method comprising the steps of:
   (a) charging a compressed gas accumulator tank section of an air cleaner assembly with compressed gas; the air cleaner assembly comprising:
   a housing including an outer wall defining an air flow inlet, an air flow outlet and an interior defining: a compressed gas accumulator tank section; and, a filter cartridge receiving section;
      (A) the housing outer wall including a side wall with first and second ends;
         (1) the compressed gas accumulator tank section configured for storage therein of compressed gas and being positioned adjacent the first end of the housing; and,
         (2) the housing being openable for service access to an internally received serviceable filter cartridge;
      (ii) a serviceable filter cartridge positioned in the filter cartridge receiving section of the housing;
         (A) the filter cartridge being removable from the air cleaner housing; and,
         (B) the filter cartridge comprising filter media surrounding an open central interior and extending between first and second end caps;
      iii) a first stage separator arrangement including a dust ejection port in the housing; and,
      (iv) a pulse jet arrangement including a pulse jet control valve arrangement and a pulse distribution arrangement
         (A) the pulse jet control valve arrangement being configured to selectively direct a pulse of compressed gas from the compressed gas accumulator tank section into the pulse distribution arrangement and,
         (B) the pulse distribution arrangement being configured to direct the pulse of compressed gas from the pulse jet control valve arrangement into the open central interior of the filter cartridge;
   (b) actuating the pulse jet control valve arrangement to direct a pulse of compressed gas from the gas accumulator tank section through the pulse distribution arrangement and into the central interior of the serviceable filter cartridge;
   (c) waiting a selected period of time; and,
   (d) after the selected period of time again actuating the pulse jet control valve arrangement to direct a pulse of compressed gas from the gas accumulator tank section through the pulse distribution arrangement and into the central interior of the serviceable filter cartridge;
      (1) before the step of again actuating the pulse jet control valve arrangement, a step of recharging the compressed gas accumulator tank section with compressed gas being conducted.

* * * * *